US012080250B2

(12) United States Patent
Koide

(10) Patent No.: US 12,080,250 B2
(45) Date of Patent: Sep. 3, 2024

(54) DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 28 days.

(21) Appl. No.: 17/980,672

(22) Filed: Nov. 4, 2022

(65) Prior Publication Data

US 2023/0147567 A1 May 11, 2023

(30) Foreign Application Priority Data

Nov. 8, 2021 (JP) ................................ 2021-182121

(51) Int. Cl.
*G09G 3/34* (2006.01)

(52) U.S. Cl.
CPC ....... *G09G 3/34* (2013.01); *G09G 2300/0823* (2013.01); *G09G 2310/0294* (2013.01); *G09G 2310/08* (2013.01); *G09G 2330/021* (2013.01); *G09G 2330/08* (2013.01)

(58) Field of Classification Search
CPC ............ G09G 3/34; G09G 2300/0823; G09G 2310/0294; G09G 2310/08; G09G 2330/021; G09G 2330/08
USPC .......................................................... 345/204
See application file for complete search history.

(56) References Cited

U.S. PATENT DOCUMENTS 11,227,876 B2 1/2022 Ogawa
2019/0123072 A1* 4/2019 Li ........................ G09G 3/3648

FOREIGN PATENT DOCUMENTS

JP 2019-086544 A 6/2019

* cited by examiner

*Primary Examiner* — Mark Edwards
(74) *Attorney, Agent, or Firm* — K&L Gates LLP

(57) ABSTRACT

A display device has a write period of charging a holding capacitor included in each of pixels arranged in a first direction and a second direction different from the first direction in a display region, and has a hold period of holding capacitance of the holding capacitor charged during the write period. The display device comprises a potential maintenance circuit configured to maintain, during the hold period, one of three potential values of a positive-polarity potential, a ground (GND) potential, and a negative-polarity potential having charged the holding capacitor during the write period.

7 Claims, 52 Drawing Sheets

DISPLAY DEVICE

CROSS-REFERENCE TO RELATED APPLICATION

This application claims the benefit of priority from Japanese Patent Application No. 2021-182121 filed on Nov. 8, 2021, the entire contents of which are incorporated herein by reference.

BACKGROUND

1. Technical Field

The present disclosure relates to a display device.

2. Description of the Related Art

Recent years have seen a growing demand for display devices for use in mobile electronic apparatuses, such as mobile phones and electronic paper displays. For example, in electrophoretic displays (EPDs) used in the electronic paper displays, a pixel has a memory property to hold a potential at the time of rewriting, and holds the potential at the time of the rewriting until the rewriting is performed for the next frame after the rewriting is performed once for each frame. As a result, the EPDs can perform low power consumption driving. For example, a technology is disclosed to achieve the low power consumption by configuring a pixel transistor to have a complementary metal-oxide semiconductor (CMOS) configuration obtained by combining a p-channel transistor with an n-channel transistor (for example, Japanese Patent Application Laid-open Publication No. 2019-086544).

In a configuration where the potential of a holding capacitor is rewritten by turning on the pixel transistor and the potential is held by turning off the pixel transistor, the potential varies due to feedthrough or leakage of the holding capacitor that occurs when the pixel transistor is turned off, which may lead to reduction in display quality.

It is an object of the present disclosure to provide a display device capable of restraining the reduction in display quality caused by the potential variation.

SUMMARY

A display device according to an embodiment of the present disclosure has a write period of charging a holding capacitor included in each of pixels arranged in a first direction and a second direction different from the first direction in a display region, and has a hold period of holding capacitance of the holding capacitor charged during the write period. The display device comprises a potential maintenance circuit configured to maintain, during the hold period, one of three potential values of a positive-polarity potential, a ground (GND) potential, and a negative-polarity potential having charged the holding capacitor during the write period.

DETAILED DESCRIPTION

Figure 1:
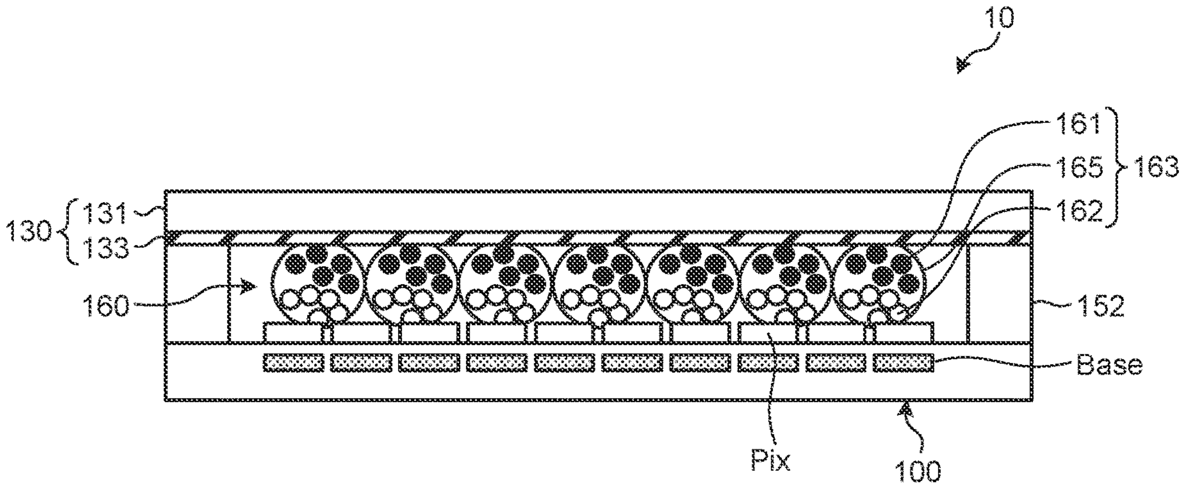
FIG. 1 is a sectional view illustrating a configuration example of a display device according to an embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. Moreover, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present specification and the drawings, and detailed description thereof may not be repeated where appropriate.

First, a structure of a display device 10 according to an embodiment will be described. FIG. 1 is a sectional view illustrating a configuration example of the display device according to the embodiment.

In the example illustrated in FIG. 1, the display device 10 is, for example, an electrophoretic device (electrophoretic display (EPD)) provided with an electrophoretic display panel having an electrophoretic layer. As illustrated in FIG. 1, the display device 10 according to the embodiment includes a thin-film transistor (TFT) substrate 100, a counter substrate 130 disposed so as to face the TFT substrate 100, an electrophoretic layer (functional layer) 160 disposed between the TFT substrate 100 and the counter substrate 130, and a sealing part 152.

The TFT substrate 100 is provided with pixel electrodes Pix and holding electrodes Base. In a comparative example described later, the holding electrodes Base are supplied with a common potential VCOM.

The counter substrate 130 includes a base material 131 and a counter electrode 133. The base material 131 is a light-transmitting glass substrate, a light-transmitting resin substrate, or a light-transmitting resin film. The counter electrode 133 is provided on a surface side of the base material 131 facing the TFT substrate 100. The counter electrode 133 is formed of indium tin oxide (ITO) serving as a light-transmitting conductive film. The counter electrode 133 faces the pixel electrodes Pix with the electrophoretic layer 160 interposed therebetween. The counter electrode 133 is supplied with the common potential VCOM.

The sealing part 152 is provided between the TFT substrate 100 and the counter substrate 130. The electrophoretic layer 160 is sealed in an internal space surrounded by the TFT substrate 100, the counter substrate 130, and the sealing part 152.

The electrophoretic layer 160 includes a plurality of microcapsules 163. Each of the microcapsules 163 encapsulates a plurality of black particles 161, a plurality of white particles 162, and a dispersion liquid 165. The black particles 161 and the white particles 162 are dispersed in the dispersion liquid 165. The dispersion liquid 165 is a light-transmitting liquid, such as silicone oil. The black particles 161 are electrophoretic particles made using, for example, negatively charged graphite. The white particles 162 are electrophoretic particles made using, for example, positively charged titanium dioxide ($TiO_2$).

An electric field generated between each of the pixel electrodes Pix and the counter electrode 133 changes the dispersion state of the black particles 161 and the white particles 162. The state of light transmission through the electrophoretic layer 160 changes according to the dispersion state of the black and the white particles 161 and 162. Thus, an image is displayed on a display surface. For example, when the common potential VCOM (at, for example, a ground (GND) potential) is supplied to the counter electrode 133 and a negative potential is supplied to the pixel electrode Pix, the negatively charged black particles 161 move toward the counter substrate 130, and the positively charged white particles 162 move toward the TFT substrate 100. As a result, when the TFT substrate 100 is viewed from the counter substrate 130 side, an area (pixels) overlapping the pixel electrodes Pix in a plan view is displayed in black.

The display device 10 may be a monochrome display device, or may be a color display device using, for example, color filters in a plurality of colors. The display device 10 may employ a light-reflecting material as the pixel electrodes of pixels PX, or may have a configuration in which light-transmitting pixel electrodes are combined with a reflective film of, for example, a metal, and the reflective film reflects light. The display device 10 may be a flexible display such as a sheet display. In the present embodiment, the electrophoretic device (electrophoretic display (EPD)) provided with the electrophoretic display panel having the electrophoretic layer has been exemplified as the display device 10. However, the present disclosure is also applicable to a case where the display device 10 is, for example, a liquid crystal display device (liquid crystal display) provided with a liquid crystal display panel having a liquid crystal layer.

Figure 2:
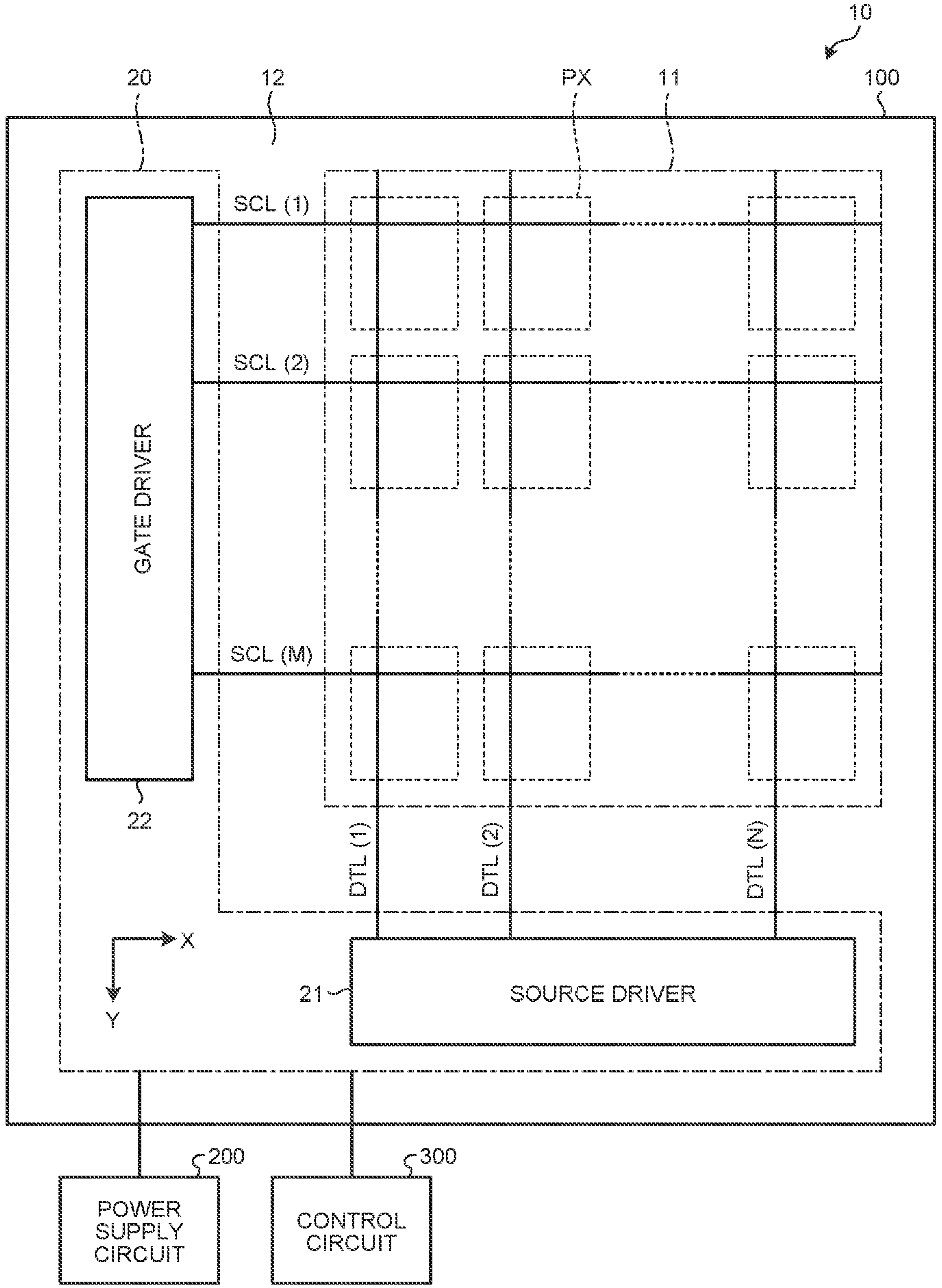
FIG. 2 is a block diagram illustrating a configuration example of the display device according to a comparative example.

Before describing a configuration of the display device 10 according to the embodiment, a configuration of the display device according to a comparative example will be described. FIG. 2 is a block diagram illustrating a configuration example of the display device according to the comparative example.

The display device 10 is mounted on, for example, an electronic apparatus (not illustrated). The display device 10 receives various power supply voltages applied from, for example, a power supply circuit 200 of the electronic apparatus and displays images based on signals output from, for example, a control circuit 300 serving as a host processor of the electronic apparatus. Examples of the electronic apparatus on which the display device 10 is mounted include electronic paper display devices.

As illustrated in FIG. 2, the display device 10 is provided with a display region 11 and a display panel driver 20 on the TFT substrate 100. In the display region 11, the pixels PX are arranged in a two-dimensional matrix having a row-column configuration in a first direction (X-direction in FIG. 2) and a second direction (Y-direction in FIG. 2) orthogonal to the first direction. Hereafter, the first direction (X-direction in FIG. 2) is also called a row direction, and the second direction (Y-direction in FIG. 2) is also called a column direction. A row in which the pixels PX are arranged in the row direction is also called a pixel row, and a column in which the pixels PX are arranged in the column direction is also called a pixel column. FIG. 1 illustrates an example in which N×M (N in the row direction and M in the column direction) of the pixels PX are arranged in a matrix.

The power supply circuit 200 is a power source generator that generates the various power supply voltages to be supplied to components of the display device 10 according to the present embodiment. The power supply circuit 200 is coupled to the display panel driver 20. The various power supply voltages are supplied from the power supply circuit 200 to the display panel driver 20.

The control circuit 300 is an arithmetic processor that controls operations of the display device 10 according to the present embodiment. The control circuit 300 is coupled to the display panel driver 20. The control circuit 300 is constituted by a control integrated circuit (IC), for example. A video signal and various control signals are supplied from the control IC to the display panel driver 20.

The display panel driver 20 includes a source driver 21 and a gate driver 22.

The display panel driver 20 causes the source driver 21 to hold the video signal. The source driver 21 is electrically coupled to each of the pixels PX arranged in the Y-direction in the display region 11 through a source bus line (signal line) DTL(n) (where n is an integer from 1 to N), and transmits a source drive signal (pixel signal) SIG(n) to the source bus line (signal line) DTL(n) (refer to FIG. 3). The source drive signal (pixel signal) SIG(n) is supplied to each of the pixels PX arranged in the Y-direction.

The display panel driver 20 causes the gate driver 22 to sequentially select the pixels PX arranged in the Y-direction in the display region 11. Hereinafter, a period in one frame period in which the gate driver 22 selects the pixels PX arranged in the X-direction in the display region 11 is also called "write period (Write)". In addition, a period except the write period in one frame period in which the gate driver 22 selects the pixels PX arranged in the X-direction in the display region 11 is also called "hold period (Hold)".

Figure 3:
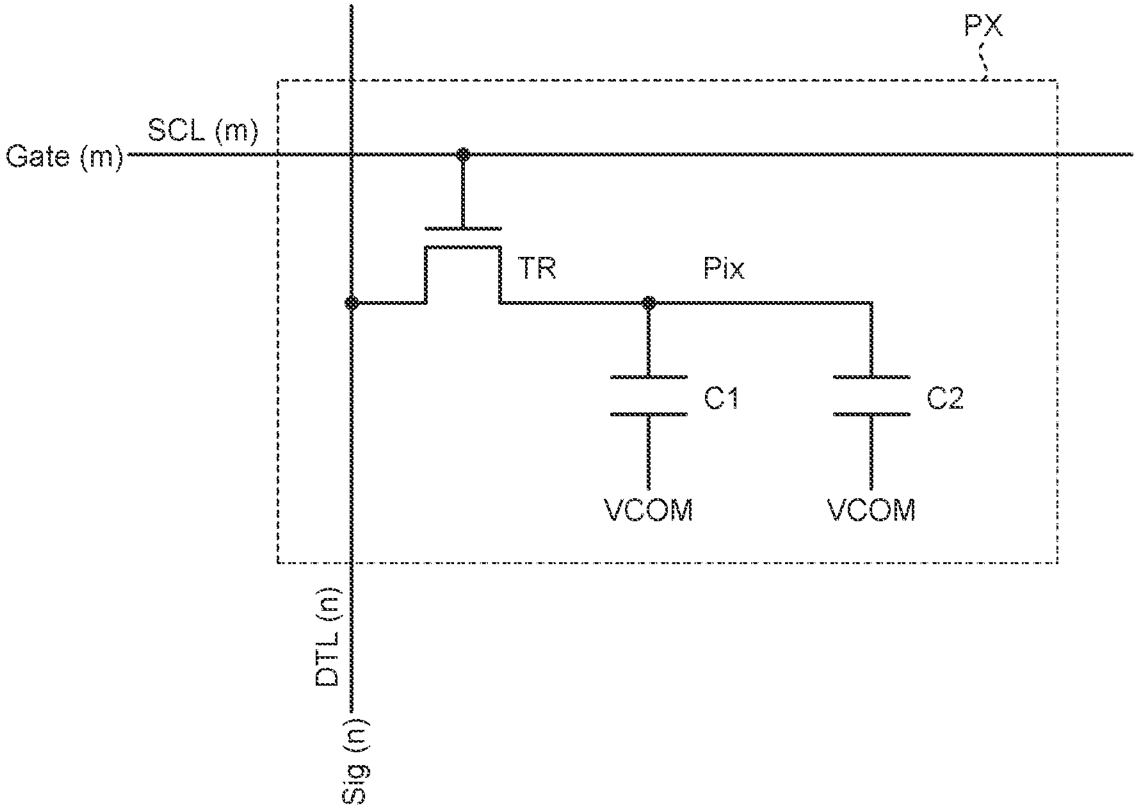
FIG. 3 is a circuit diagram illustrating a configuration example of one pixel of the display device according to the comparative example.

The gate driver 22 is electrically coupled to each of the pixels PX arranged in the X-direction (first direction) in the display region 11 through a gate bus line (scan line) SCL(m) (where m is an integer from 1 to M), and sequentially selects each of the gate bus lines (scan lines) SCL(m) arranged in the Y-direction (second direction) to transmit thereto a gate drive signal (scan signal) Gate(m) (refer to FIG. 3). The gate drive signal (scan signal) Gate(m) is supplied to each of the pixels PX coupled to the selected gate drive signal (scan signal) Gate(m).

The source driver 21 and the gate driver 22 may be provided on the TFT substrate 100 or on the counter substrate 130 (refer to FIG. 1). The source driver 21 and the gate driver 22 may be mounted on a display IC mounted on another circuit board (such as a flexible substrate) coupled to the TFT substrate 100.

FIG. 3 is a circuit diagram illustrating a configuration example of one pixel of the display device according to the comparative example.

As illustrated in FIG. 3, in the display device 10 according to the comparative example, each of the pixels PX of the TFT substrate 100 includes a pixel transistor TR. In the display device 10 according to the comparative example, the pixel transistor TR is an n-channel metal oxide semiconductor (NMOS) transistor. The gate of the pixel transistor TR is coupled to the gate bus line (scan line) SCL(m). The source of the pixel transistor TR is coupled to the source bus line (signal line) DTL(n). The drain of the pixel transistor TR is provided with the pixel electrode Pix.

Each of the pixels PX of the TFT substrate 100 includes a first holding capacitor C1 and a second holding capacitor C2. The first holding capacitor C1 is a capacitor generated between the pixel electrode Pix and each of the holding electrodes Base (refer to FIG. 1). The second holding capacitor C2 is a capacitor generated between the counter electrode 133 of the counter substrate 130 (refer to FIG. 1) and the pixel electrode Pix. The first holding capacitor C1 has capacitance of approximately 1 pF, for example. The second holding capacitor C2 has capacitance of, for example, approximately 1/10 that of the first holding capacitor C1.

The pixel electrode Pix is supplied with the source drive signal (pixel signal) from the source bus line (signal line) DTL(n) through the pixel transistor TR. In the display device 10 according to the comparative example, the holding electrodes Base and the counter electrode 133 are supplied with the common potential VCOM. The potential of the source drive signal (pixel signal) supplied to the pixel electrode Pix is held by the first holding capacitor C1 and the second holding capacitor C2.

Figure 4A:
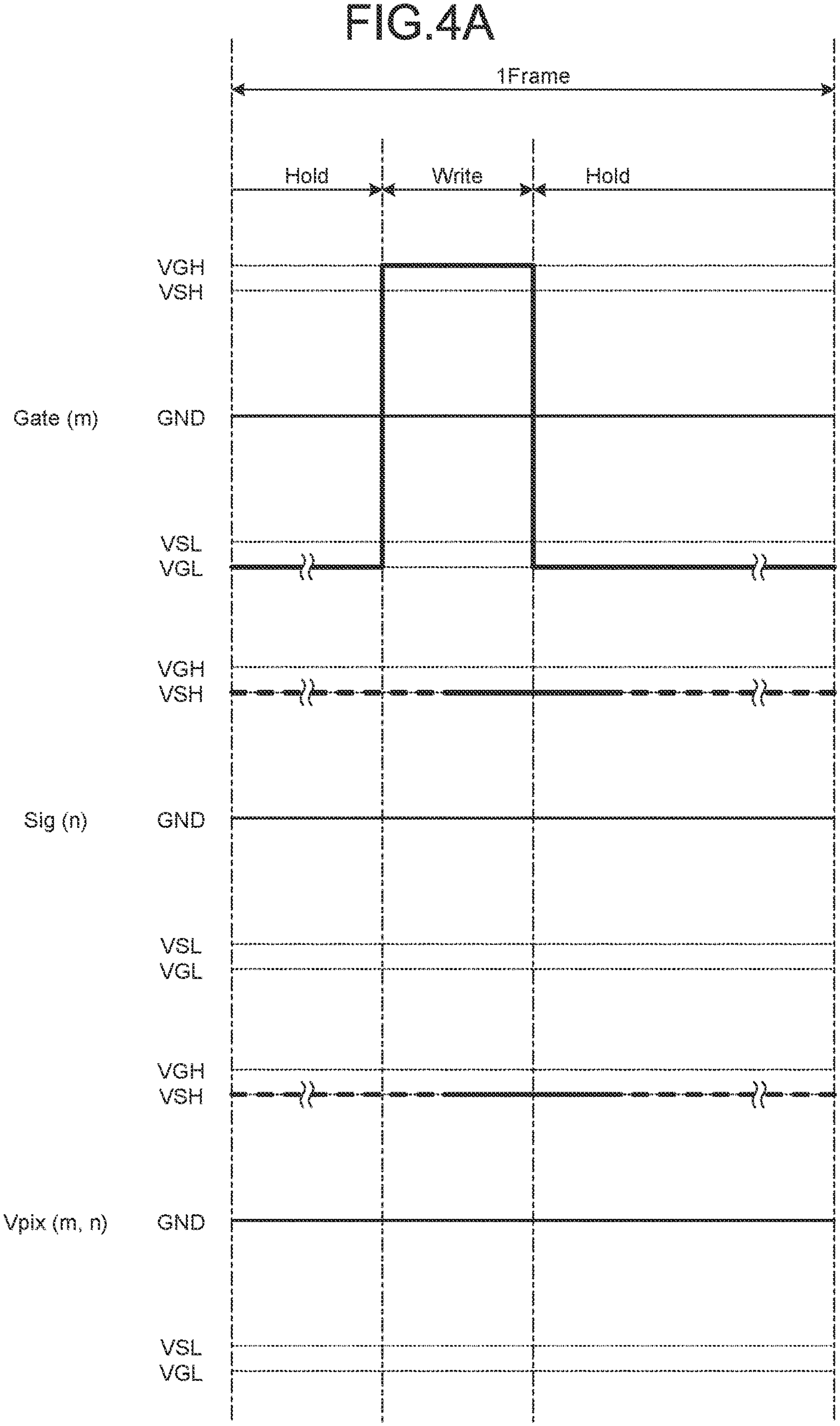
FIG. 4A is a timing diagram for explaining an operation in the comparative example.
Figure 4B:
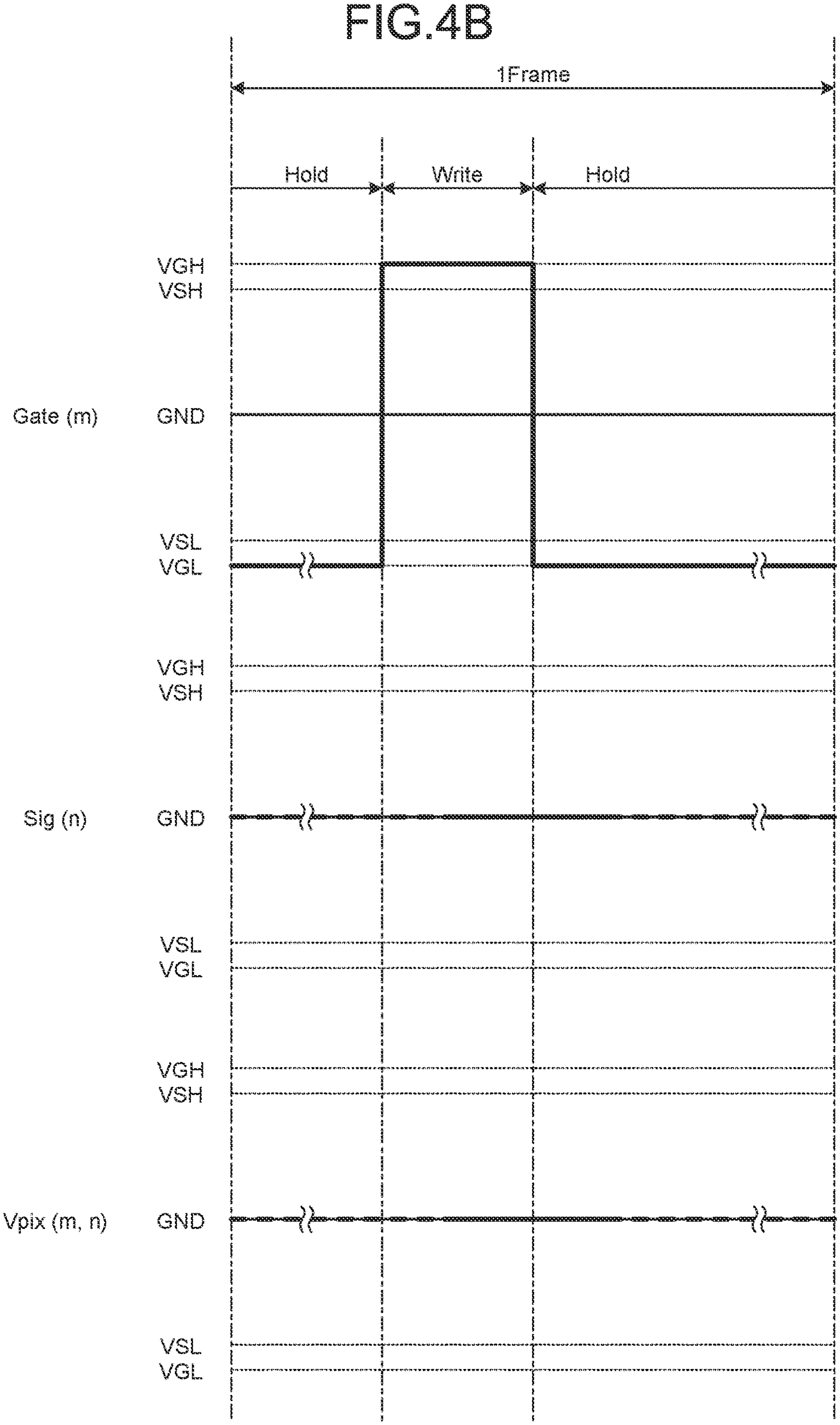
FIG. 4B is a timing diagram for explaining another operation in the comparative example.
Figure 4C:
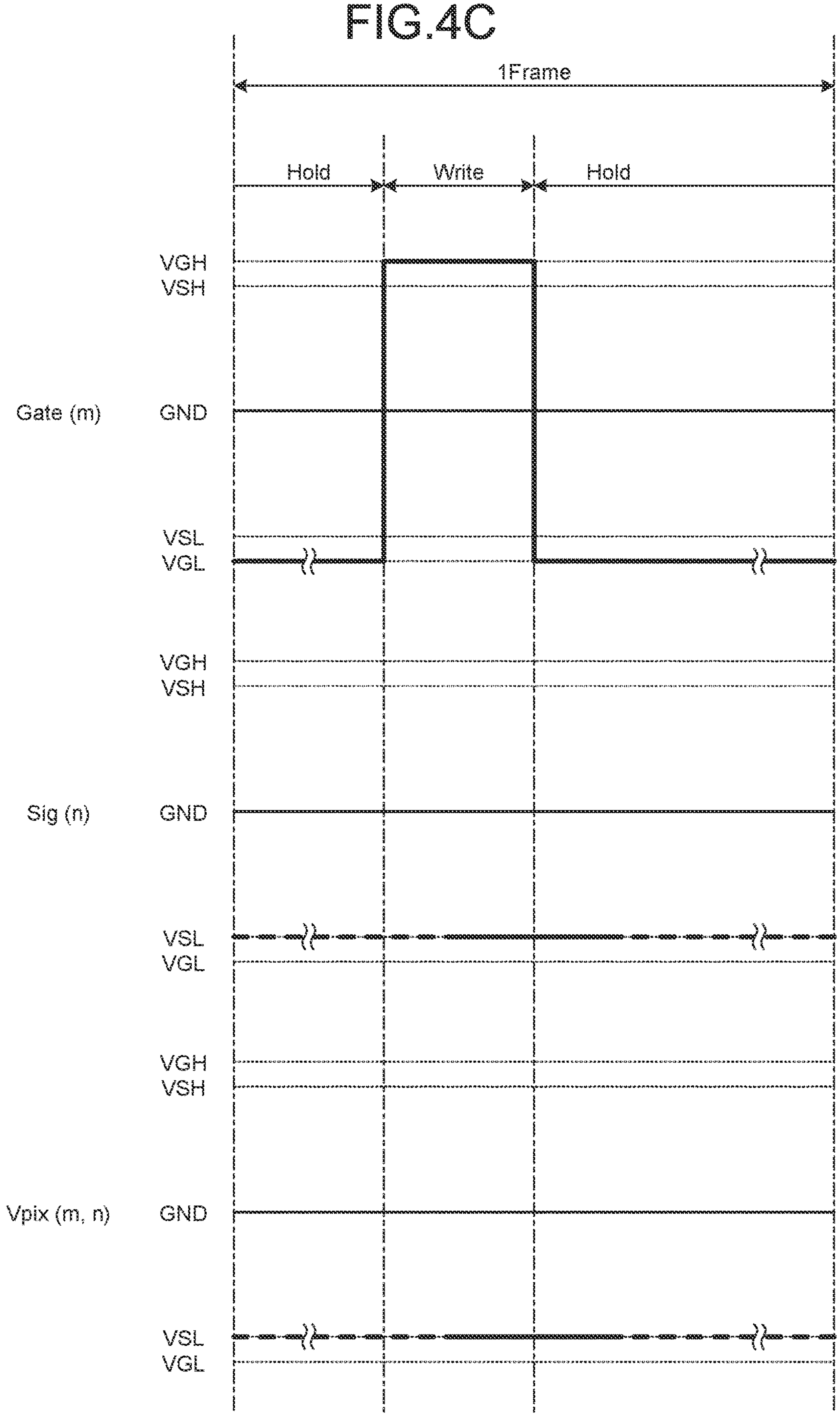
FIG. 4C is a timing diagram for explaining still another operation in the comparative example.

FIGS. 4A, 4B, and 4C are timing diagrams for explaining operations in the comparative example.

As illustrated in FIGS. 4A, 4B, and 4C, the gate driver 22 supplies a positive-polarity gate potential VGH to the gate bus line (scan line) SCL(m) during the write period of each of the pixels PX in the mth row. The gate driver 22 supplies a negative-polarity gate potential VGL to the gate bus line (scan line) SCL(m) during the hold period except the write period.

As illustrated in FIG. 4A, when the source bus line (signal line) DTL(n) is supplied with a positive-polarity source potential VSH that is a lower potential than the positive-polarity gate potential VGH, that is, when the source drive signal (pixel signal) SIG(n) is set to the positive-polarity source potential VSH, supplying the positive-polarity gate potential VGH to the gate bus line (scan line) SCL(m) during the write period of the pixels PX in the mth row controls to turn on the pixel transistor TR of the pixel PX in the mth row (refer to FIG. 3) to apply the positive-polarity source potential VSH as a potential Vpix(m, n) of the pixel electrode Pix of the pixel PX in the mth row and the nth column. During the hold period following the write period, the potential Vpix(m, n) of the pixel electrode Pix of the pixel PX in the mth row and the nth column is held at the positive-polarity source potential VSH by the first holding capacitor C1 and the second holding capacitor C2.

As illustrated in FIG. 4B, when the source bus line (signal line) DTL(n) is supplied with the GND potential, that is, when the source drive signal (pixel signal) SIG(n) is set to the GND potential, supplying the GND potential to the gate bus line (scan line) SCL(m) during the write period of the pixels PX in the mth row controls to turn on the pixel transistor TR of the pixel PX in the mth row (refer to FIG. 3) to apply the GND potential as the potential Vpix(m, n) of the pixel electrode Pix of the pixel PX in the mth row and the nth column. During the hold period following the write period, the potential Vpix(m, n) of the pixel electrode Pix of the pixel PX in the mth row and the nth column is held at the GND potential by the first holding capacitor C1 and the second holding capacitor C2.

As illustrated in FIG. 4C, when the source bus line (signal line) DTL(n) is supplied with a negative-polarity source potential VSL that is a higher potential than the negative-polarity gate potential VGL, that is, when the source drive signal (pixel signal) SIG(n) is set to the negative-polarity source potential VSL, supplying the negative-polarity gate potential VGL to the gate bus line (scan line) SCL(m) during the write period of the pixels PX in the mth row controls to turn on the pixel transistor TR of the pixel PX in the mth row (refer to FIG. 3) to apply the negative-polarity source potential VSL as the potential Vpix(m, n) of the pixel electrode Pix of the pixel PX in the mth row and the nth column. During the hold period following the write period, the potential Vpix(m, n) of the pixel electrode Pix of the pixel PX in the mth row and the nth column is held at the negative-polarity source potential VSL by the first holding capacitor C1 and the second holding capacitor C2.

Specifically, in the pixel configuration illustrated in FIG. 3, the positive-polarity source potential VSH is set to +15 V, for example, and the negative-polarity source potential VSL is set to −15 V, for example. In order to control to turn on the pixel transistor TR (refer to FIG. 3) during the write period, the positive-polarity gate potential VGH is set to, for example, +20 V that is a higher potential than the positive-polarity source potential VSH, and the negative-polarity gate potential VGL is set to, for example, −20 V that is a lower potential than the negative-polarity source potential VSL.

In the configuration of the comparative example described above, the potential Vpix(m, n) of the pixel electrode Pix is rewritten by controlling to turn on the pixel transistor TR in the write period, and the pixel transistor TR is controlled to be turned off in the hold period to cause the first holding capacitor C1 and the second holding capacitor C2 to hold the potential Vpix(m, n) of the pixel electrode Pix. However, with such a configuration, due to feedthrough or leakage of the first holding capacitor C1 and the second holding capacitor C2 that occurs when the pixel transistor TR is turned off, the potential Vpix(m, n) of the pixel electrode Pix may vary to cause reduction in display quality.

In the present disclosure, a potential maintenance circuit is provided to statically maintain, during the hold period, one of the three potential values of the positive-polarity source potential VSH, the GND potential, and the negative-polarity source potential VSL having charged the holding capacitors during the write period. This configuration reduces the potential variation of the potential Vpix(m, n) of the pixel electrode Pix to restrain the reduction in display quality associated with the potential variation of the potential Vpix(m, n) of the pixel electrode Pix. The following describes in detail a configuration including the potential maintenance circuit according to the embodiment.

First Embodiment

Figure 5:
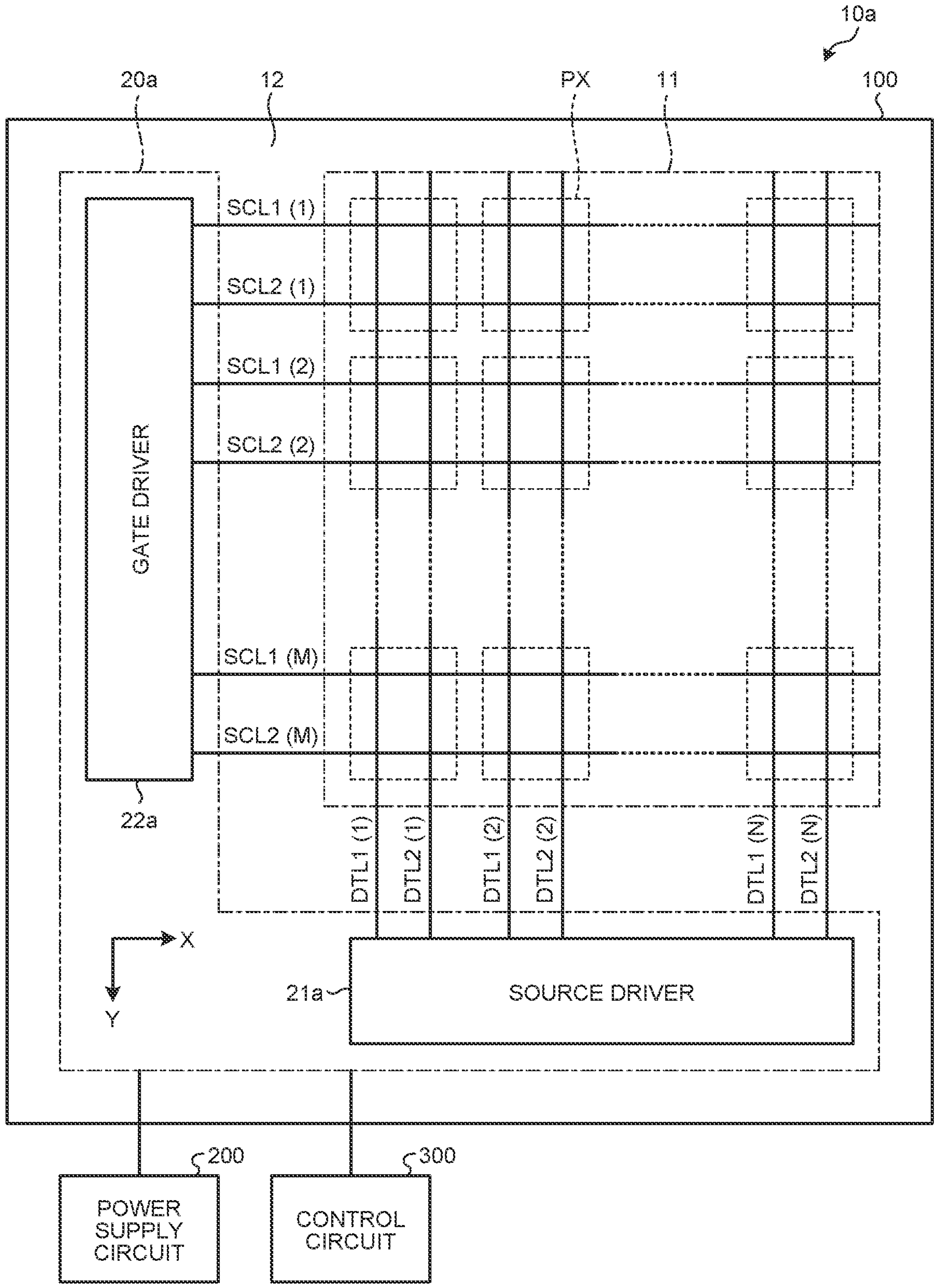
FIG. 5 is a block diagram illustrating a configuration example of a display device according to a first embodiment of the present disclosure.
Figure 6:
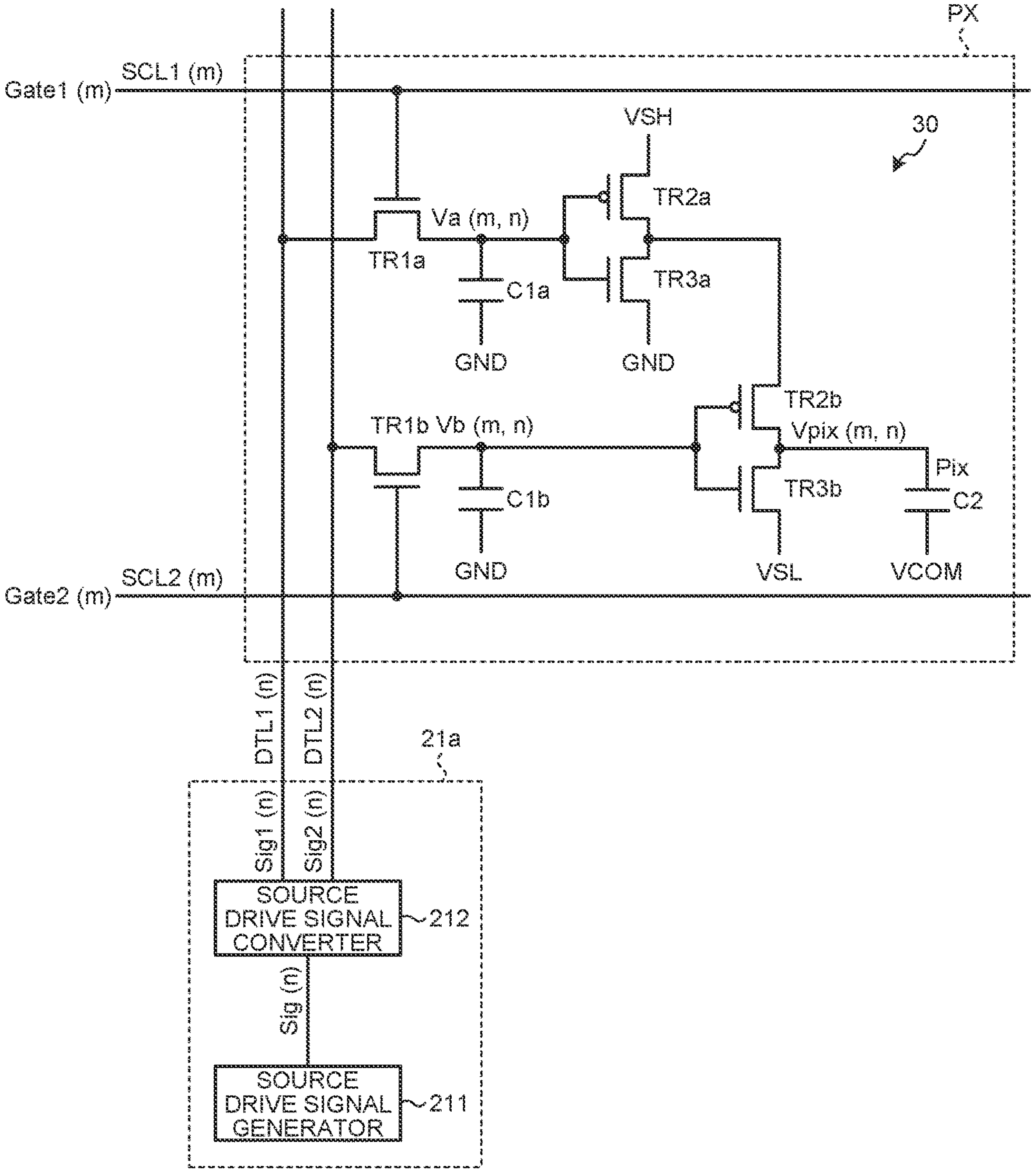
FIG. 6 is a diagram illustrating an exemplary configuration of one pixel and an exemplary internal configuration of a source driver in the display device according to the first embodiment.

FIG. 5 is a block diagram illustrating a configuration example of a display device according to a first embodiment of the present disclosure. FIG. 6 is a diagram illustrating an exemplary configuration of one pixel and an exemplary internal configuration of a source driver in the display device according to the first embodiment.

As illustrated in FIG. 6, in a display device 10*a* according to the first embodiment, a source driver 21*a* of a display panel driver 20*a* includes a source drive signal generator 211 and a source drive signal converter 212. The source drive signal generator 211 and the source drive signal converter 212 are provided for each of the pixel columns. The source drive signal generator 211 is mounted on the display IC, for example. The source drive signal converter 212 is, for example, a thin-film transistor (TFT) circuit formed in a frame region 12 on the TFT substrate 100.

According to the video signal supplied from the control circuit 300, the source drive signal generator 211 generates a signal SIG(n) that can take the three values of the positive-polarity source potential VSH, the GND potential, and the negative-polarity source potential VSL. In the present embodiment, the positive-polarity source potential VSH is set to +15 V, for example. In the present embodiment, the negative-polarity source potential VSL is set to −15 V, for example.

The source drive signal converter 212 supplies a first source drive signal (first pixel signal) SIG1(*n*) obtained by converting the three-valued source drive signal (pixel signal) SIG(n) output from the source drive signal generator 211 to a first source bus line (first signal line) DTL1(*n*). The source drive signal converter 212 supplies a second source drive signal (second pixel signal) SIG2(*n*) obtained by converting the three-valued source drive signal SIG(n) output from the source drive signal generator 211 to a second source bus line (second signal line) DTL2(*n*). The following describes operations of the source drive signal converter 212 with reference to FIGS. 7, 8A, 8B, and 8C.

Figure 7:
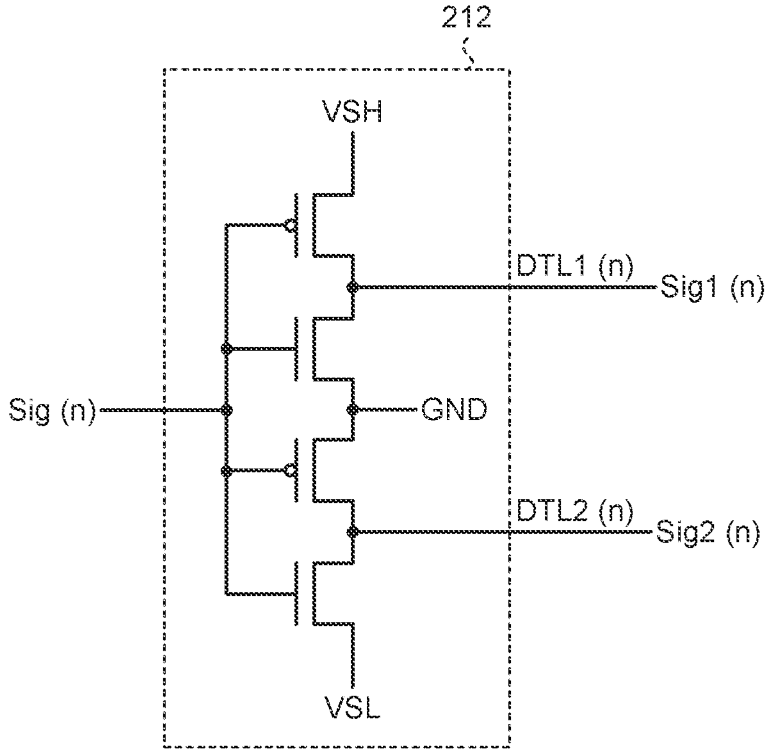
FIG. 7 is a block diagram illustrating an exemplary circuit configuration of a source drive signal converter.
Figure 8A:
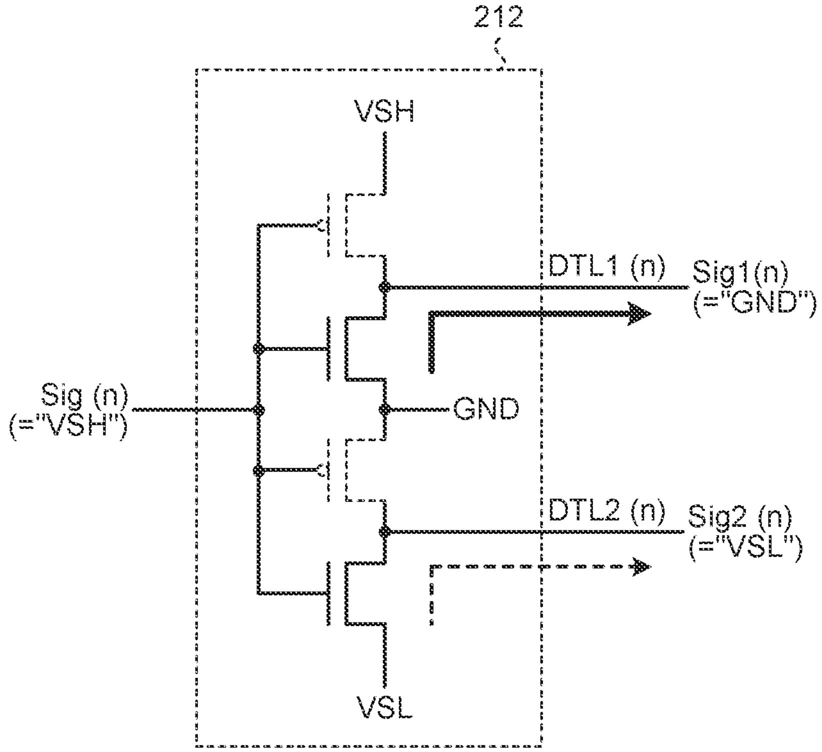
FIG. 8A is a conceptual diagram illustrating a specific example of an operation of the source drive signal converter.
Figure 8B:
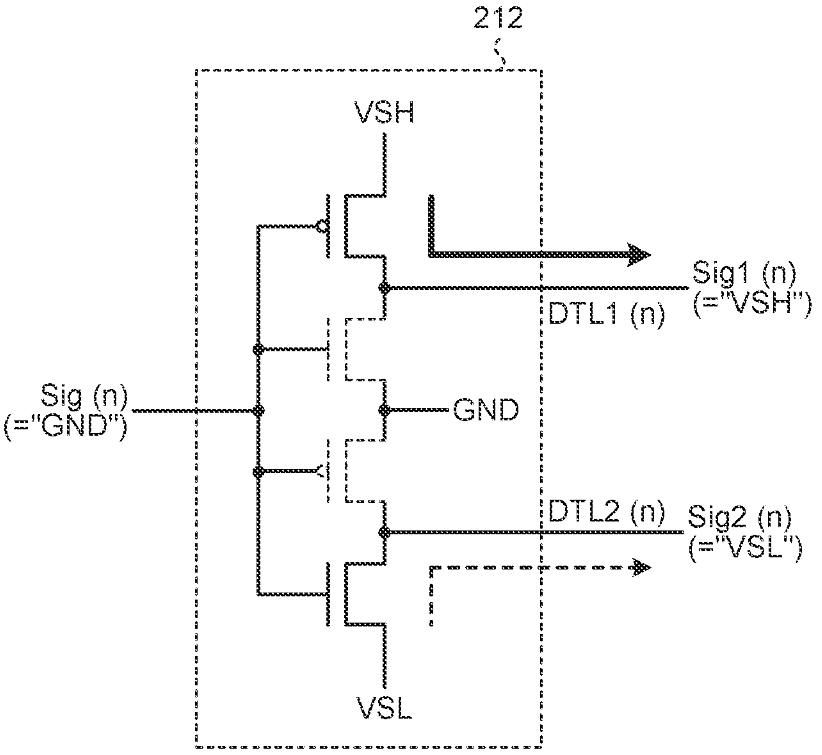
FIG. 8B is a conceptual diagram illustrating another specific example of the operation of the source drive signal converter.
Figure 8C:
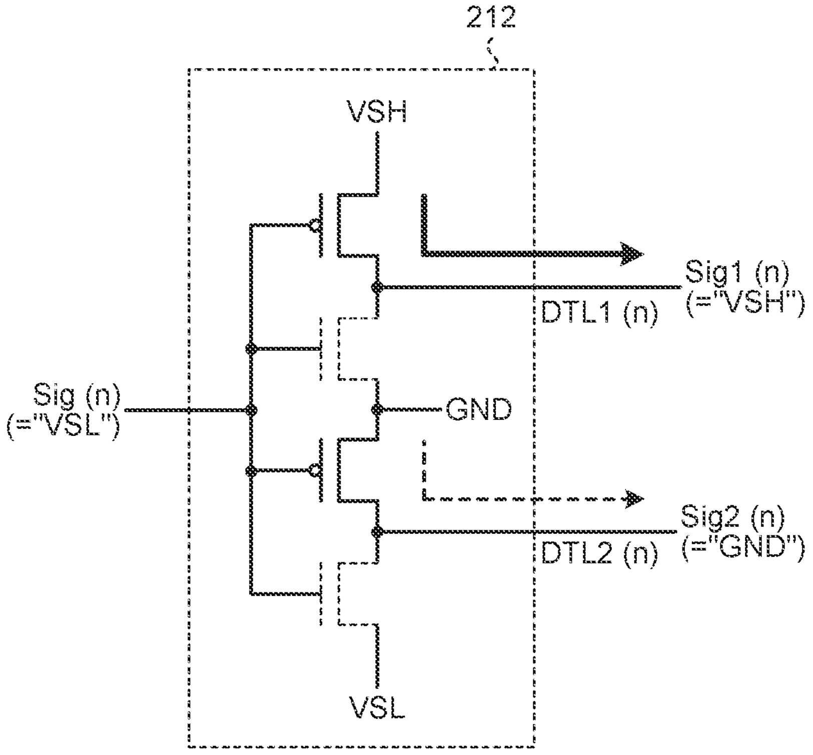
FIG. 8C is a conceptual diagram illustrating still another specific example of the operation of the source drive signal converter.

FIG. 7 is a block diagram illustrating an exemplary circuit configuration of the source drive signal converter. FIGS. 8A, 8B, and 8C are conceptual diagrams illustrating specific examples of the operations of the source drive signal converter.

As illustrated in FIG. 8A, when the source drive signal (pixel signal) SIG(n) is set to the positive-polarity source potential VSH, the source drive signal converter 212 controls to turn off each of the transistors illustrated with dashed lines to output the GND potential as the first source drive signal SIG1(*n*) to the first source bus line DTL1(*n*) through a path indicated by a solid arrow, and output the negative-polarity source potential VSL as the second source drive signal SIG2(*n*) to the second source bus line DTL2(*n*) through a path indicated by a dashed arrow.

As illustrated in FIG. 8B, when the source drive signal (pixel signal) SIG(n) is set to the GND potential, the source drive signal converter 212 controls to turn off each of the transistors illustrated with dashed lines to output the GND potential as the first source drive signal SIG1(*n*) to the first source bus line DTL1(*n*) through a path indicated by a solid arrow, and output the negative-polarity source potential VSL as the second source drive signal SIG2(*n*) to the second source bus line DTL2(*n*) through a path indicated by a dashed arrow.

As illustrated in FIG. 8C, when the source drive signal (pixel signal) SIG(n) is set to the negative-polarity source potential VSL, the source drive signal converter 212 controls to turn off each of the transistors illustrated with dashed lines to output the positive-polarity source potential VSH as the first source drive signal SIG1(*n*) to the first source bus line DTL1(*n*) through a path indicated by a solid arrow, and output the GND potential as the second source drive signal SIG2(*n*) to the second source bus line DTL2(*n*) through a path indicated by a dashed arrow.

The configurations and the operations of the source drive signal converter 212 illustrated in FIGS. 7, 8A, 8B, and 8C are merely examples, and are not limited to the examples illustrated in FIGS. 7, 8A, 8B, and 8C.

In the display device 10*a* according to the first embodiment, a gate driver 22*a* is electrically coupled to the pixels PX arranged in the X-direction in the display region 11 through a first gate bus line (first scan line) SCL1(*m*), and transmits a first gate drive signal (first scan signal) Gate1(*m*) to the first gate bus line (first scan line) SCL1(*m*). The gate driver 22*a* supplies a first positive-polarity gate potential VGH1 to the first gate bus line (first scan line) SCL1(*m*) during the write period. The gate driver 22*a* supplies a first negative-polarity gate potential VGL1 to the first gate bus line (first scan line) SCL1(*m*) during the hold period. In the present embodiment, the first positive-polarity gate potential VGH1 is set to +20 V, for example. In the present embodiment, the first negative-polarity gate potential VGL1 is set to −5 V, for example.

The gate driver 22*a* is also electrically coupled to the pixels PX arranged in the X-direction in the display region 11 through a second gate bus line (second scan line) SCL2 (*m*), and transmits a second gate drive signal (second scan signal) Gate2(*m*) to the second gate bus line (second scan line) SCL2(*m*). The gate driver 22*a* supplies a second positive-polarity gate potential VGH2 to the second gate bus line (second scan line) SCL2(*m*) during the write period. The gate driver 22*a* supplies a second negative-polarity gate potential VGL2 to the second gate bus line (second scan line) SCL2(*m*) during the hold period. In the present embodiment, the second positive-polarity gate potential VGH2 is set to +5 V, for example. In the present embodiment, the second negative-polarity gate potential VGL2 is set to −20 V, for example.

As illustrated in FIG. 6, a potential maintenance circuit 30 according to the first embodiment includes a high-potential-side first pixel transistor TR1*a*, a high-potential-side second pixel transistor TR2*a*, a high-potential-side third pixel transistor TR3*a*, a low-potential-side first pixel transistor TR1*b*, a low-potential-side second pixel transistor TR2*b*, and a low-potential-side third pixel transistor TR3*b*.

In the present embodiment, the high-potential-side first pixel transistor TR1*a* and the low-potential-side first pixel transistor TR1*b* are each an NMOS transistor corresponding to the pixel transistor TR in the comparative example described above. In the present embodiment, a high-potential-side first holding capacitor C1*a* is coupled to the first source bus line (first signal line) DTL1(*n*) through the high-potential-side first pixel transistor TR1*a*. In the present embodiment, a low-potential-side first holding capacitor C1*b* is coupled to the second source bus line (second signal line) DTL2(*n*) through the low-potential-side first pixel transistor TR1*b*.

The gate of the high-potential-side first pixel transistor TR1*a* is coupled to the first gate bus line (first scan line) SCL1(*m*). With this configuration, when the first gate drive signal (first scan signal) Gate1(*m*) supplied to the first gate bus line (first scan line) SCL1(*m*) is set to the first positive-polarity gate potential VGH1, the high-potential-side first holding capacitor C1*a* is coupled to the first source bus line (first signal line) DTL1(*n*) through the high-potential-side first pixel transistor TR1*a*.

The gate of the low-potential-side first pixel transistor TR1*b* is coupled to the second gate bus line (second scan line) SCL2(*m*). With this configuration, when the second gate drive signal (second scan signal) Gate2(*m*) supplied to the second gate bus line (second scan line) SCL2(*m*) is set to the second positive-polarity gate potential VGH2, the low-potential-side first holding capacitor C1*b* is coupled to the second source bus line (second signal line) DTL2(*n*) through the low-potential-side first pixel transistor TR1*b*.

The high-potential-side second pixel transistor TR2*a* is a p-channel metal oxide semiconductor (PMOS) transistor, for example. The high-potential-side third pixel transistor TR3*a* is an NMOS transistor, for example. The high-potential-side second pixel transistor TR2*a* and the high-potential-side third pixel transistor TR3*a* are coupled in series between the positive-polarity source potential VSH and the GND potential. The gates of the high-potential-side second pixel transistor TR2*a* and the high-potential-side third pixel transistor TR3*a* are supplied with a potential Va(m, n) of the high-potential-side first holding capacitor C1*a*.

The low-potential-side second pixel transistor TR2*b* is a PMOS transistor, for example. The low-potential-side third pixel transistor TR3*b* is an NMOS transistor, for example. The low-potential-side second pixel transistor TR2*b* and the low-potential-side third pixel transistor TR3*b* are coupled in series between a coupling point of the high-potential-side second pixel transistor TR2*a* to the high-potential-side third pixel transistor TR3*a* and the negative-polarity source potential VSL. The gates of the low-potential-side second pixel transistor TR2*b* and the low-potential-side third pixel transistor TR3*b* are supplied with a potential Vb(m, n) of the low-potential-side first holding capacitor C1*b*. In the present embodiment, the second holding capacitor C2 is coupled to a coupling point of the low-potential-side second pixel transistor TR2*b* to the low-potential-side third pixel transistor TR3*b*.

FIGS. 9A, 9B, 9C, 9D, 9E, and 9F are timing diagrams for explaining operations in the first embodiment. FIGS. 10A, 10B, 10C, 10D, 10E, and 10F are conceptual diagrams illustrating specific examples of operations of the potential maintenance circuit according to the first embodiment.

Figure 9A:
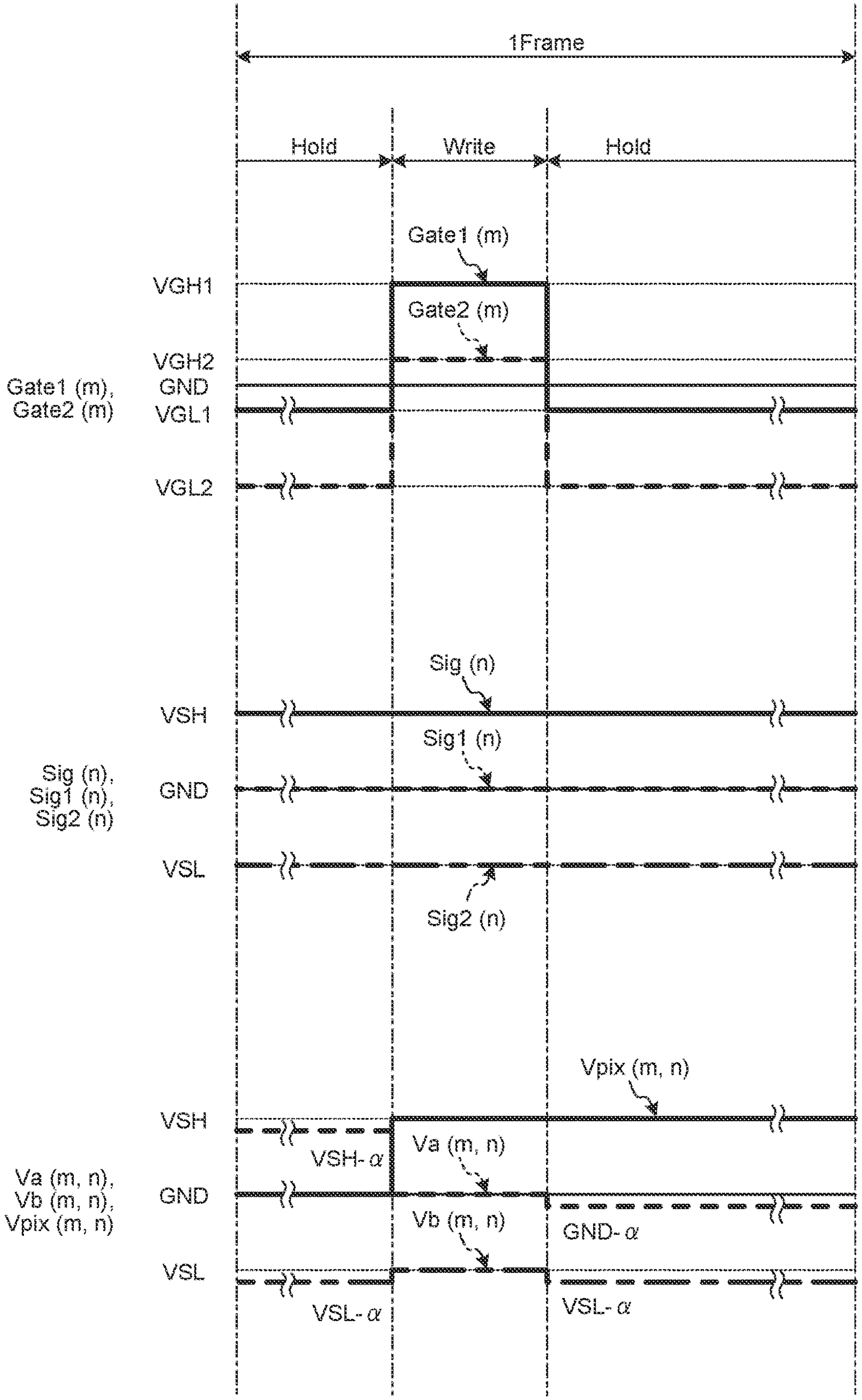
FIG. 9A is a timing diagram for explaining an operation in the first embodiment.
Figure 9B:
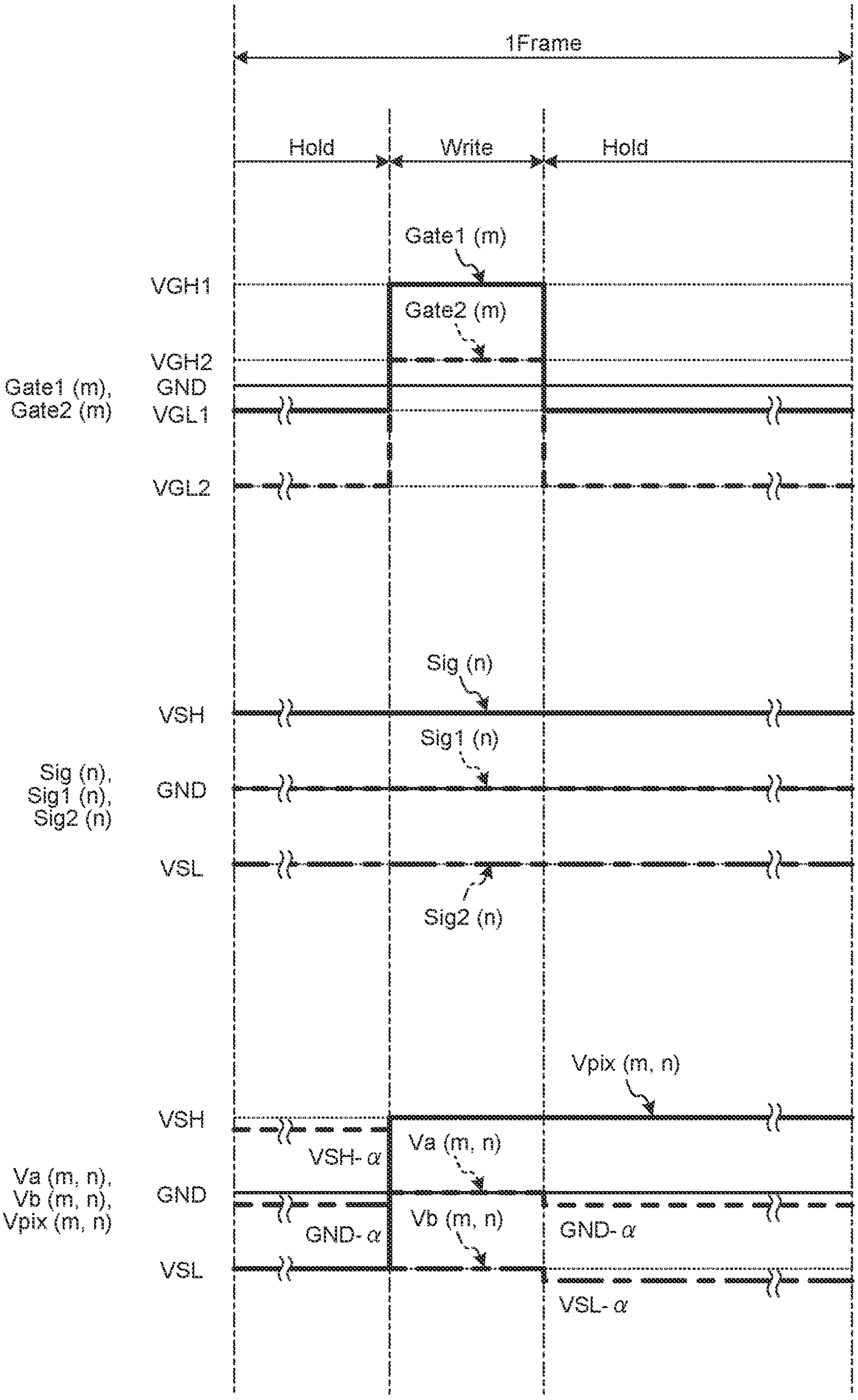
FIG. 9B is a timing diagram for explaining another operation in the first embodiment.
Figure 10A:
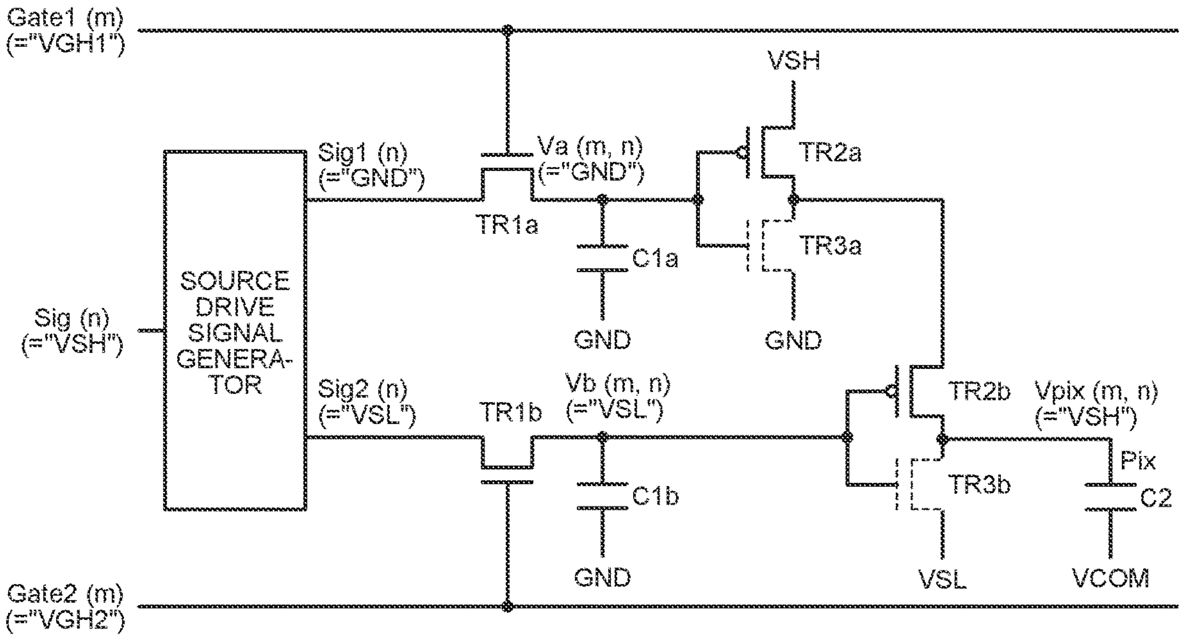
FIG. 10A is a conceptual diagram illustrating a specific example of an operation of a potential maintenance circuit according to the first embodiment.
Figure 10B:
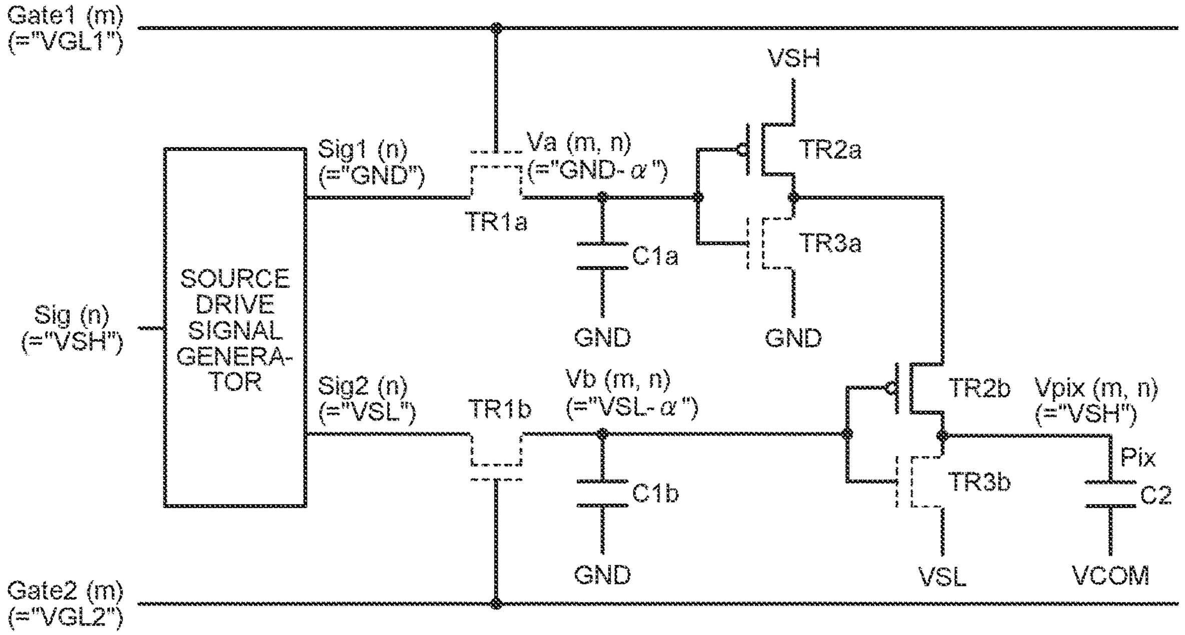
FIG. 10B is a conceptual diagram illustrating another specific example of the operation of the potential maintenance circuit in the first embodiment.

FIG. 9A illustrates a timing diagram when the potential of the source drive signal (pixel signal) SIG(n) has changed from the GND potential in the previous frame to the positive-polarity source potential VSH (at +15 V, for example). FIG. 9B illustrates a timing diagram when the potential of the source drive signal (pixel signal) SIG(n) has changed from the negative-polarity source potential VSL (at −15 V, for example) in the previous frame to the positive-polarity source potential VSH (at +15 V, for example). FIG. 10A illustrates an operation example of the potential maintenance circuit 30 during the write period when the source drive signal (pixel signal) SIG(n) is set to the positive-polarity source potential VSH (at +15 V, for example). FIG. 10B illustrates an operation example of the potential maintenance circuit 30 during the hold period when the source drive signal (pixel signal) SIG(n) is set to the positive-polarity source potential VSH (at +15 V, for example).

Figure 9C:
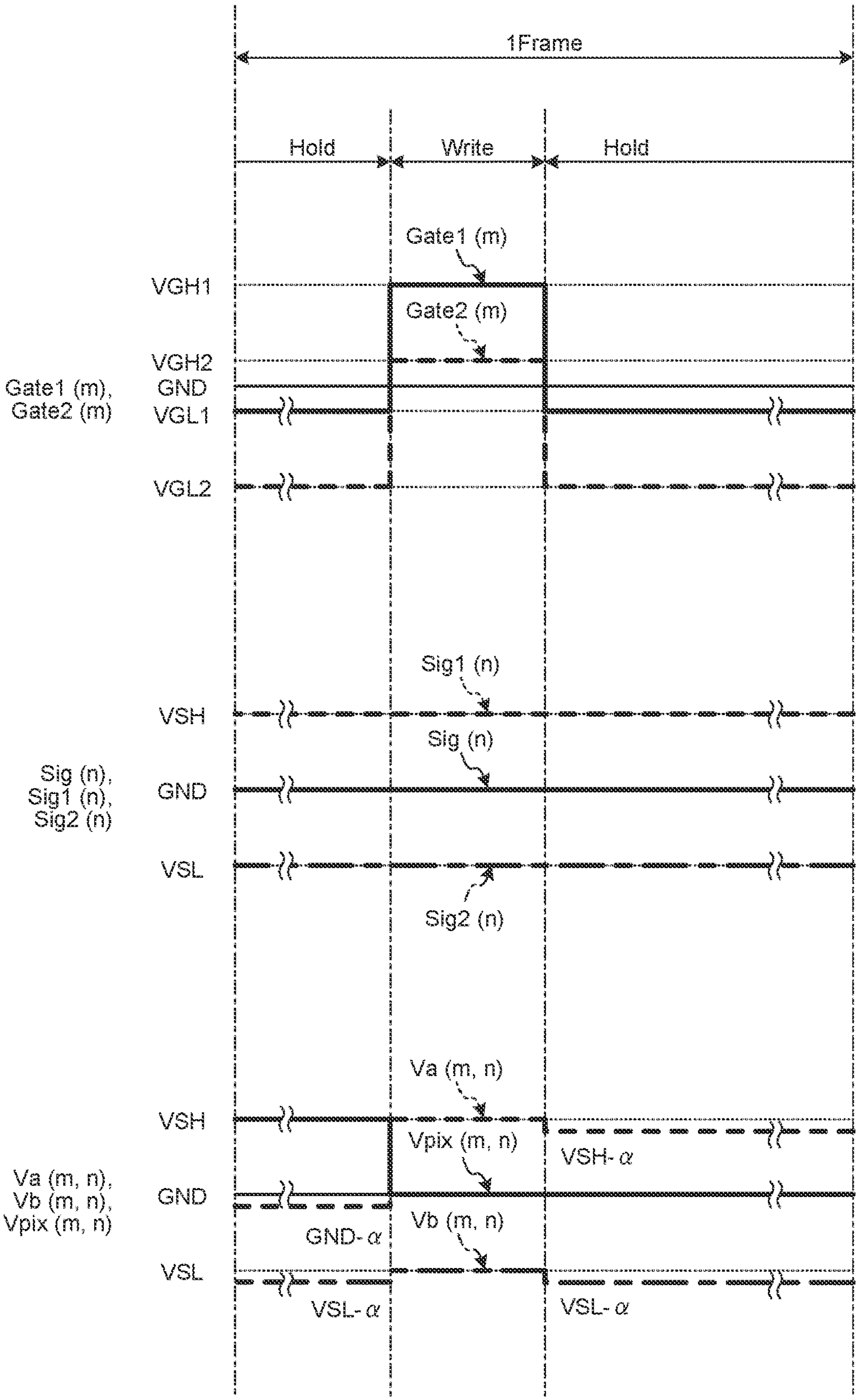
FIG. 9C is a timing diagram for explaining still another operation in the first embodiment.
Figure 9D:
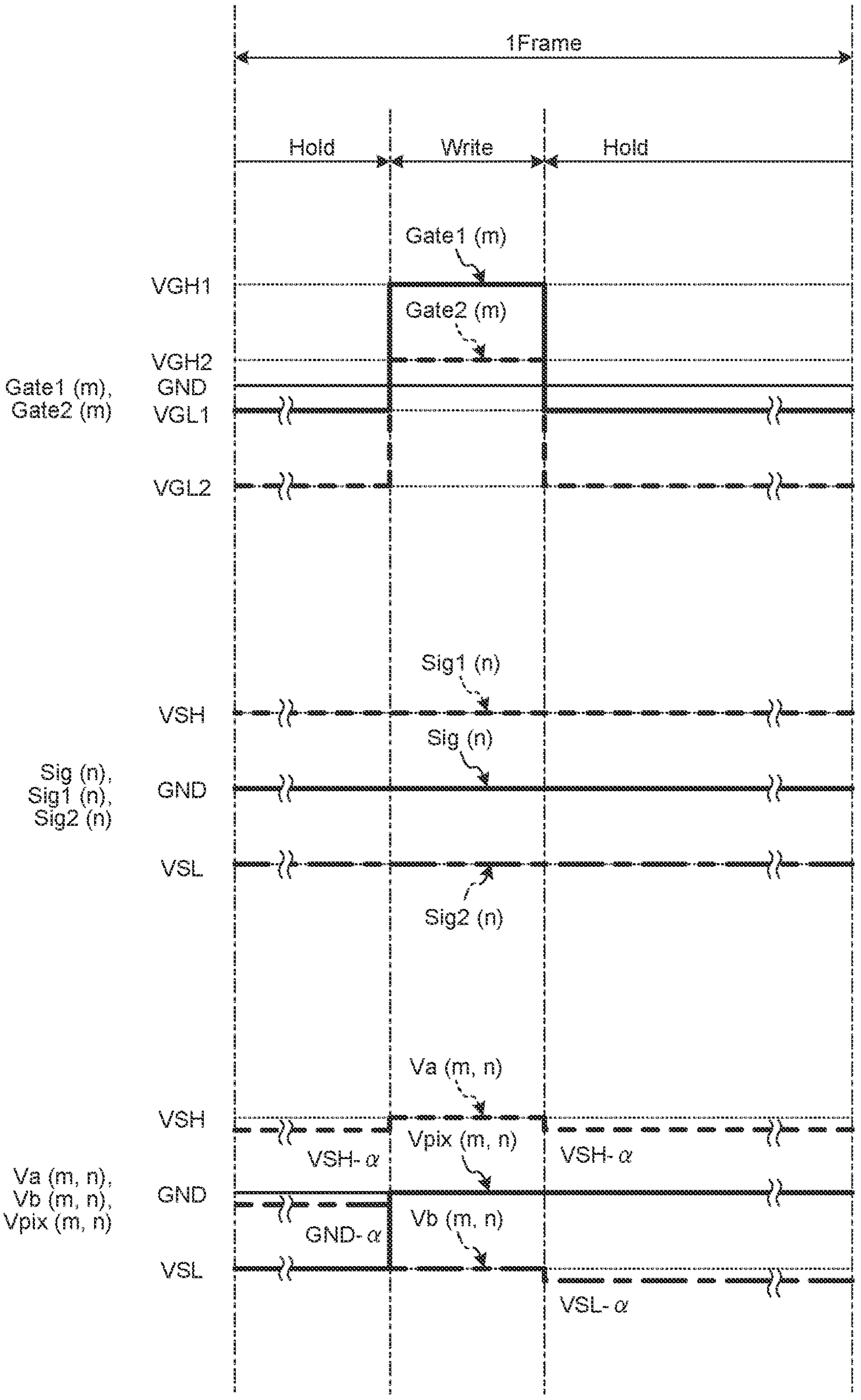
FIG. 9D is a timing diagram for explaining still another operation in the first embodiment.
Figure 10C:
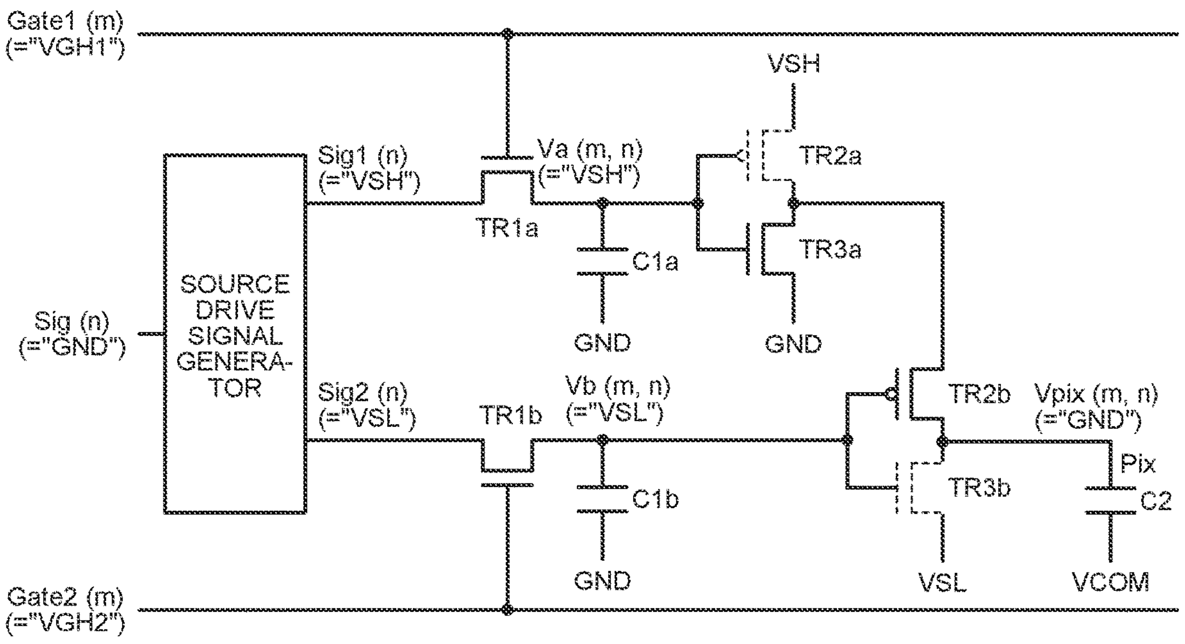
FIG. 10C is a conceptual diagram illustrating still another specific example of the operation of the potential maintenance circuit according to the first embodiment.
Figure 10D:
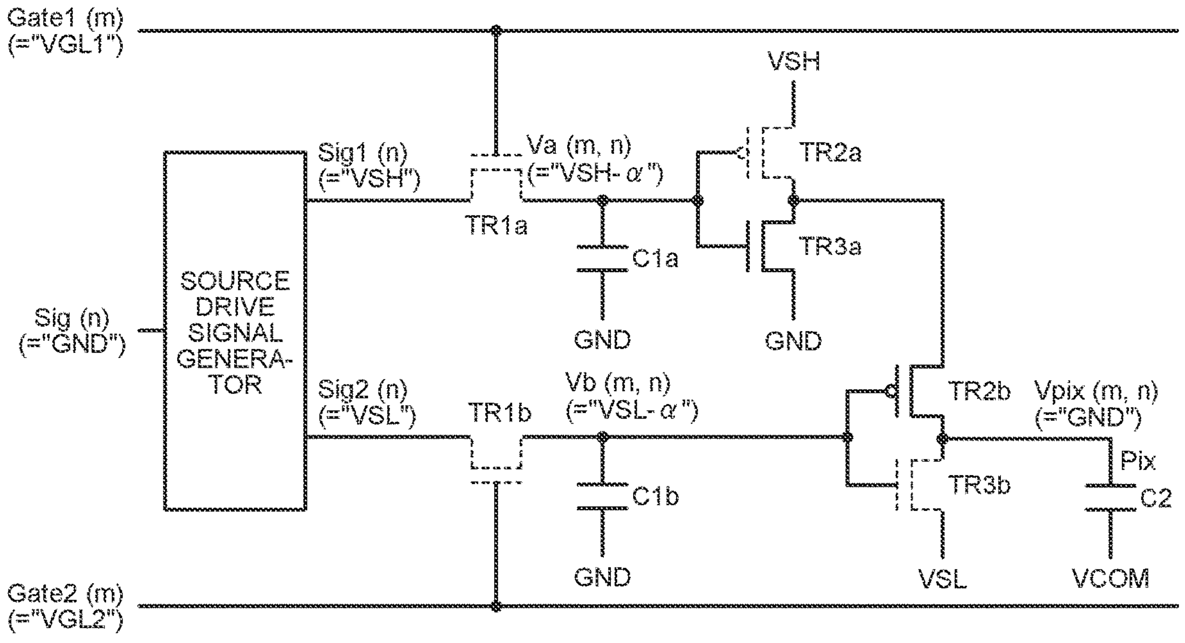
FIG. 10D is a conceptual diagram illustrating still another specific example of the operation of the potential maintenance circuit according to the first embodiment.

FIG. 9C illustrates a timing diagram when the potential of the source drive signal (pixel signal) SIG(n) has changed from the positive-polarity source potential VSH (at +15 V, for example) in the previous frame to the GND potential. FIG. 9D illustrates a timing diagram when the potential of the source drive signal (pixel signal) SIG(n) has changed from the negative-polarity source potential VSL (at −15 V, for example) in the previous frame to the GND potential. FIG. 10C illustrates an operation example of the potential maintenance circuit 30 during the write period when the source drive signal (pixel signal) SIG(n) is set to the GND potential. FIG. 10D illustrates an operation example of the potential maintenance circuit 30 during the hold period when the source drive signal (pixel signal) SIG(n) is set to the GND potential.

Figure 9E:
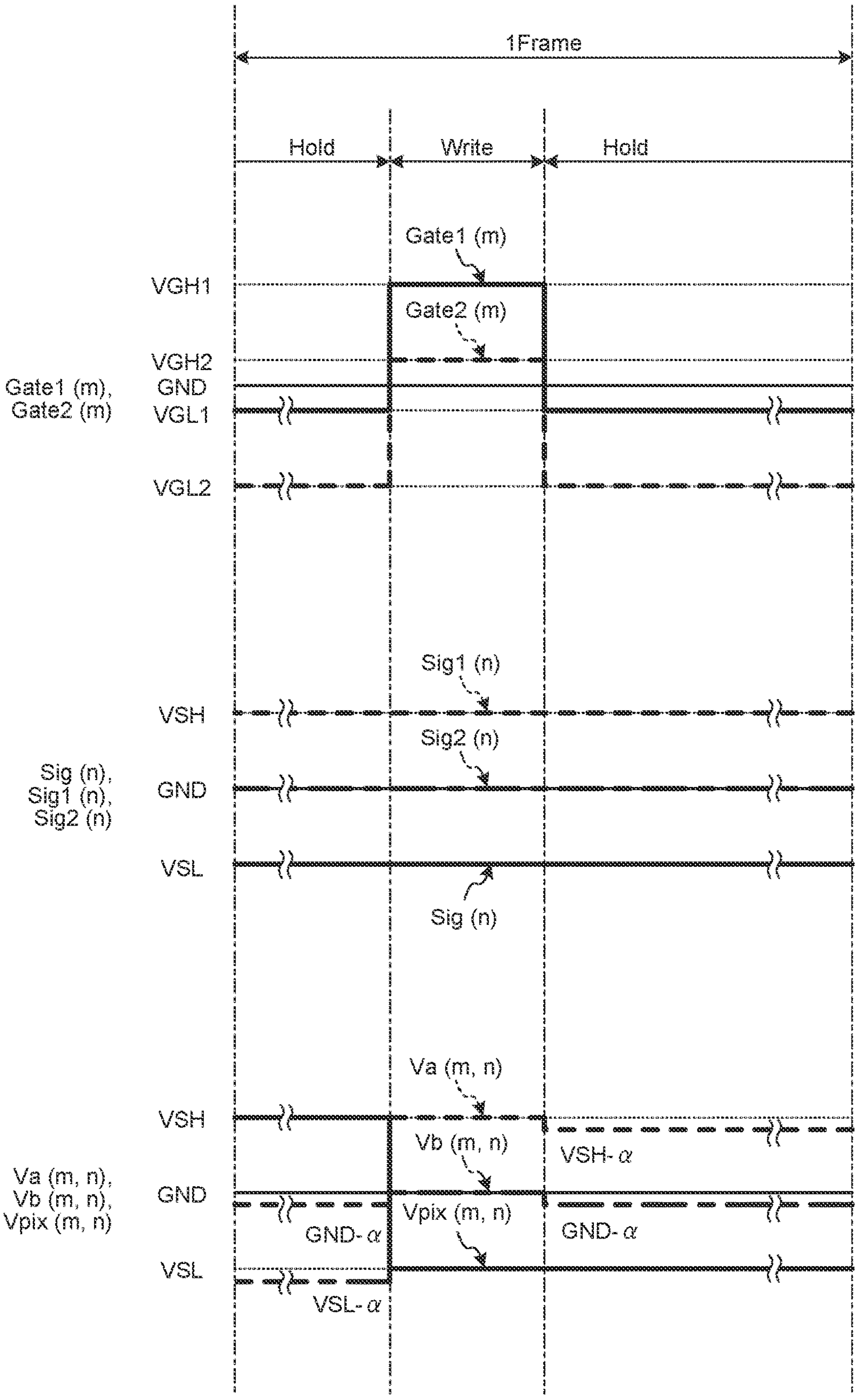
FIG. 9E is a timing diagram for explaining still another operation in the first embodiment.
Figure 9F:
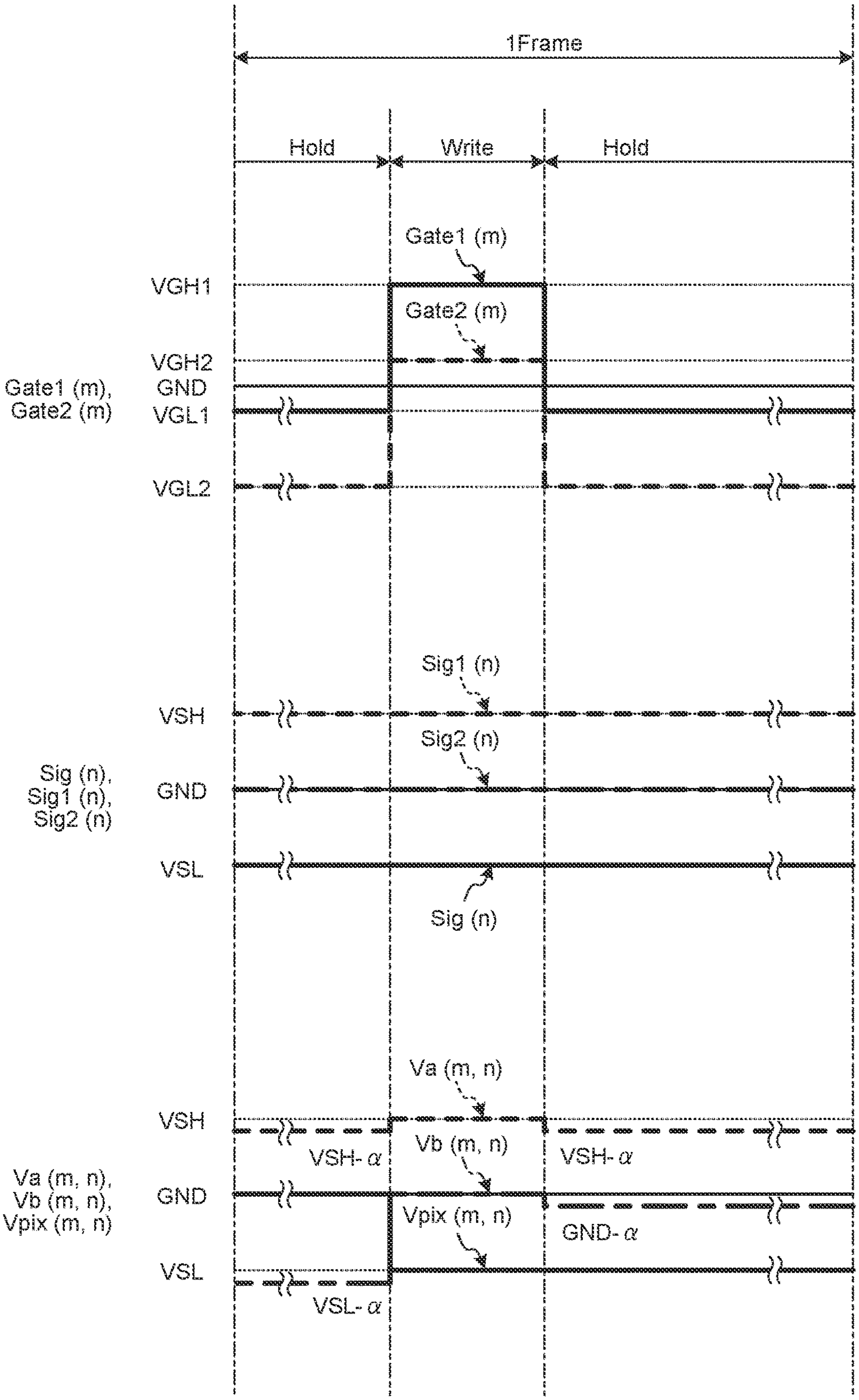
FIG. 9F is a timing diagram for explaining still another operation in the first embodiment.
Figure 10E:
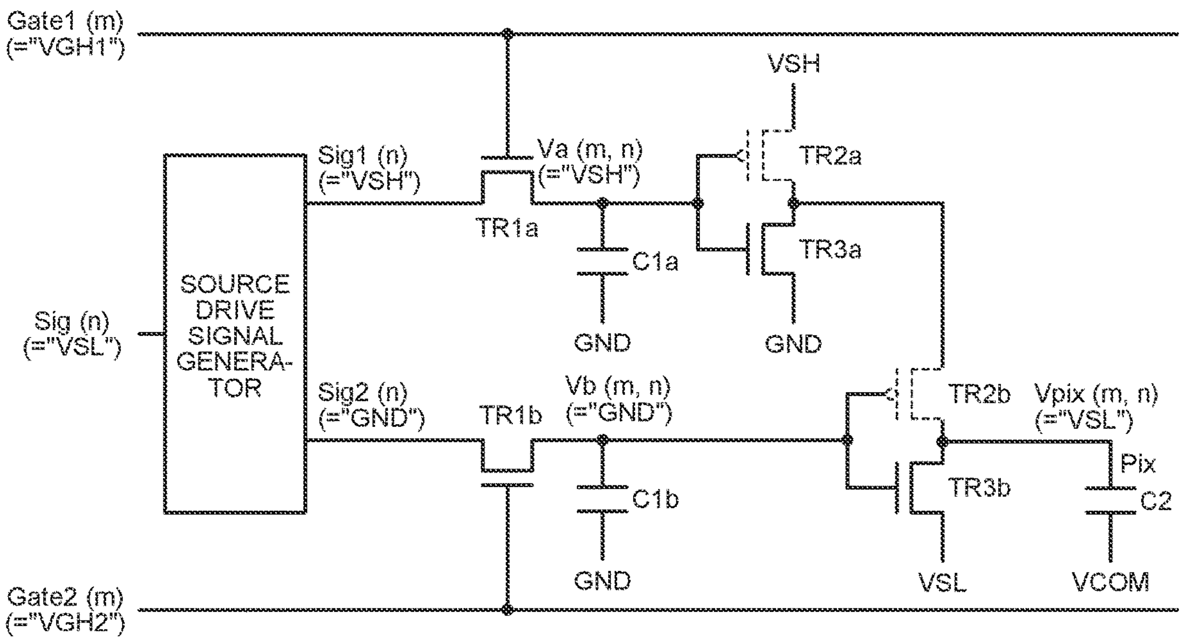
FIG. 10E is a conceptual diagram illustrating still another specific example of the operation of the potential maintenance circuit in the first embodiment.
Figure 10F:
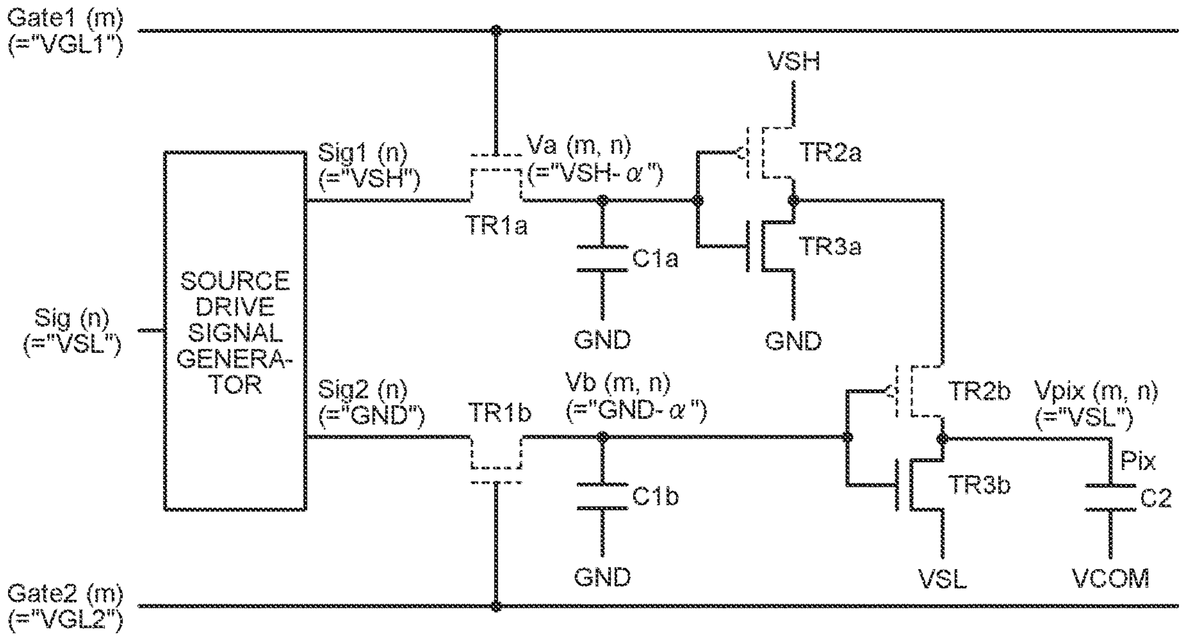
FIG. 10F is a conceptual diagram illustrating still another specific example of the operation of the potential maintenance circuit according to the first embodiment.

FIG. 9E illustrates a timing diagram when the potential of the source drive signal (pixel signal) SIG(n) has changed from the positive-polarity source potential VSH (at +15 V, for example) in the previous frame to the negative-polarity source potential VSL (at −15 V, for example). FIG. 9F illustrates a timing diagram when the potential of the source drive signal (pixel signal) SIG(n) has changed from the GND potential in the previous frame to the negative-polarity source potential VSL (at −15 V, for example). FIG. 10E illustrates an operation example of the potential maintenance circuit 30 during the write period when the source drive signal (pixel signal) SIG(n) is set to the negative-polarity source potential VSL (at −15 V, for example). FIG. 10F illustrates an operation example of the potential maintenance circuit 30 during the hold period when the source drive signal (pixel signal) SIG(n) is set to the negative-polarity source potential VSL (at −15 V, for example).

As illustrated in FIGS. 9A, 9B, 9C, 9D, 9E, and 9F, during the write period of each of the pixels PX in the mth row, the gate driver 22*a* supplies the first positive-polarity gate potential VGH1 to the first gate bus line (first scan line) SCL1(*m*), and supplies the second positive-polarity gate potential VGH2 to the second gate bus line (second scan line) SCL2(*m*). During the hold period except the write period, the gate driver 22*a* supplies the first negative-polarity gate potential VGL1 to the first gate bus line (first scan line) SCL1(*m*), and supplies the second negative-polarity gate potential VGL2 to the second gate bus line (second scan line) SCL2(*m*).

As illustrated in FIGS. 9A and 9B, when the source drive signal (pixel signal) SIG(n) is set to the positive-polarity source potential VSH (at +15 V, for example), the GND potential is supplied to the first source bus line (first signal line) DTL1(*n*), and the negative-polarity source potential VSL (at −15 V, for example) is supplied to the second source bus line (second signal line) DTL2(*n*). That is, the first source drive signal (first pixel signal) SIG1(*n*) is set to the GND potential, and the second source drive signal (second pixel signal) SIG2(*n*) is set to the negative-polarity source potential VSL.

When the first positive-polarity gate potential VGH1 (at +20 V, for example) is supplied to the first gate bus line (first scan line) SCL1(*m*) during the write period, the high-potential-side first pixel transistor TR1*a* is controlled to be turned on, and the potential Va(m, n) of the high-potential-side first holding capacitor C1*a* is charged with the GND potential as illustrated in FIG. 10A. As a result, the high-potential-side second transistor TR2*a* is controlled to be turned on, and the high-potential-side third transistor TR3*a* is controlled to be turned off.

When the second positive-polarity gate potential VGH2 (at +5 V, for example) is supplied to the second gate bus line (second scan line) SCL2(*m*) during the write period, the low-potential-side first pixel transistor TR1*b* is controlled to be turned on, and the potential Vb(m, n) of the low-potential-side first holding capacitor C1*b* is charged with the negative-polarity source potential VSL (at −15 V, for example) as illustrated in FIG. 10A. As a result, the low-potential-side second transistor TR2*b* is controlled to be turned on, and the low-potential-side third transistor TR3*b* is controlled to be turned off.

As a result, as illustrated in FIG. 10A, the potential of the second holding capacitor C2, that is, the potential Vpix(m, n) of the pixel electrode Pix is charged with the positive-polarity source potential VSH (at +15 V, for example).

In the hold period following the write period, when the first negative-polarity gate potential VGL1 (at −5 V, for example) is supplied to the first gate bus line (first scan line) SCL1(*m*) and the high-potential-side first pixel transistor TR1*a* is controlled to be turned off, the on-control state of the high-potential-side second transistor TR2*a* and the off-control state of the high-potential-side third transistor TR3*a* are maintained by a potential (GND−α) obtained by subtracting a potential drop α caused by the feedthrough generated when the high-potential-side first pixel transistor TR1*a* is turned off from the GND potential that has charged the high-potential-side first holding capacitor C1*a* to the potential Va(m, n), as illustrated in FIG. 10B.

In the hold period, when the second negative-polarity gate potential VGL2 (at −15 V, for example) is supplied to the second gate bus line (second scan line) SCL2(*m*) and the low-potential-side first pixel transistor TR1*b* is controlled to be turned off, the on-control state of the low-potential-side second transistor TR2*b* and the off-control state of the low-potential-side third transistor TR3*b* are maintained by a potential (VSL−α) obtained by subtracting the potential drop α caused by the feedthrough generated when the low-potential-side first pixel transistor TR1*b* is turned off from the negative-polarity source potential VSL (at −15 V, for example) that has charged the low-potential-side first holding capacitor C1*b* to the potential Vb(m, n), as illustrated in FIG. 10B.

As a result, as illustrated in FIG. 10B, the potential of the second holding capacitor C2, that is, the potential Vpix(m, n) of the pixel electrode Pix is statically held in the state of being supplied with the positive-polarity source potential VSH (at +15 V, for example).

When the source drive signal (pixel signal) SIG1(*n*) is set to the GND potential as illustrated in FIGS. 9C and 9D, the positive-polarity source potential VSH (at +15 V, for example) is supplied to the first source bus line (first signal line) DTL1(*n*), and the negative-polarity source potential VSL (at −15 V, for example) is supplied to the second source bus line (second signal line) DTL2(*n*). That is, the first source drive signal (first pixel signal) SIG1(*n*) is set to the positive-polarity source potential VSH, and the second source drive signal (second pixel signal) SIG2(*n*) is set to the negative-polarity source potential VSL.

When the first positive-polarity gate potential VGH1 (at +20 V, for example) is supplied to the first gate bus line (first scan line) SCL1(*m*) during the write period, the high-potential-side first pixel transistor TR1*a* is controlled to be turned on, and the potential Va(m, n) of the high-potential-side first holding capacitor C1*a* is charged with the positive-polarity source potential VSH as illustrated in FIG. 10C. As a result, the high-potential-side second transistor TR2*a* is controlled to be turned off, and the high-potential-side third transistor TR3*a* is controlled to be turned on.

When the second positive-polarity gate potential VGH2 (at +5 V, for example) is supplied to the second gate bus line (second scan line) SCL2(*m*) during the write period, the low-potential-side first pixel transistor TR1*b* is controlled to be turned on, and the potential Vb(m, n) of the low-potential-side first holding capacitor C1*b* is charged with the negative-polarity source potential VSL (at −15 V, for example) as illustrated in FIG. 10C. As a result, the low-potential-side second transistor TR2*b* is controlled to be turned on, and the low-potential-side third transistor TR3*b* is controlled to be turned off.

As a result, as illustrated in FIG. 10C, the potential of the second holding capacitor C2, that is, the potential Vpix(m, n) of the pixel electrode Pix is charged with the GND potential.

In the hold period following the write period, when the first negative-polarity gate potential VGL1 (at −5 V, for example) is supplied to the first gate bus line (first scan line) SCL1(*m*) and the high-potential-side first pixel transistor TR1*a* is controlled to be turned off, the off-control state of the high-potential-side second transistor TR2*a* and the on-control state of the high-potential-side third transistor TR3*a* are maintained by a potential (VSH−α) obtained by subtracting the potential drop α caused by the feedthrough generated when the high-potential-side first pixel transistor TR1*a* is turned off from the positive-polarity source potential VSH (at +15 V, for example) that has charged the high-potential-side first holding capacitor C1*a* to the potential Va(m, n), as illustrated in FIG. 10D.

In the hold period, when the second negative-polarity gate potential VGL2 (at −15 V, for example) is supplied to the second gate bus line (second scan line) SCL2(*m*) and the low-potential-side first pixel transistor TR1*b* is controlled to be turned off, the on-control state of the low-potential-side second transistor TR2*b* and the off-control state of the low-potential-side third transistor TR3*b* are maintained by the potential (VSL−α) obtained by subtracting the potential drop α caused by the feedthrough generated when the low-potential-side first pixel transistor TR1*b* is turned off from the negative-polarity source potential VSL (at −15 V, for example) that has charged the low-potential-side first holding capacitor C1*b* to the potential Vb(m, n), as illustrated in FIG. 10D.

As a result, as illustrated in FIG. 10D, the potential of the second holding capacitor C2, that is, the potential Vpix(m, n) of the pixel electrode Pix is statically held in the state of being supplied with the GND potential.

When the source drive signal (pixel signal) SIG(n) is set to the negative-polarity source potential VSL as illustrated in FIGS. 9E and 9F, the positive-polarity source potential VSH (at +15 V, for example) is supplied to the first source bus line (first signal line) DTL1(*n*), and the GND potential is supplied to the second source bus line (second signal line) DTL2(*n*). That is, the first source drive signal (first pixel signal) SIG1(*n*) is set to the positive-polarity source potential VSH, and the second source drive signal (second pixel signal) SIG2(*n*) is set to the GND potential.

When the first positive-polarity gate potential VGH1 (at +20 V, for example) is supplied to the first gate bus line (first scan line) SCL1(*m*) during the write period, the high-potential-side first pixel transistor TR1*a* is controlled to be turned on, and the potential Va(m, n) of the high-potential-side first holding capacitor C1*a* is charged with the positive-polarity source potential VSH (at +15 V, for example) as illustrated in FIG. 10E. As a result, the high-potential-side second transistor TR2*a* is controlled to be turned off, and the high-potential-side third transistor TR3*a* is controlled to be turned on.

When the second positive-polarity gate potential VGH2 (at +5 V, for example) is supplied to the second gate bus line (second scan line) SCL2(*m*) during the write period, the low-potential-side first pixel transistor TR1*b* is controlled to be turned on, and the potential Vb(m, n) of the low-potential-side first holding capacitor C1*b* is charged with the GND potential as illustrated in FIG. 10E. As a result, the low-potential-side second transistor TR2*b* is controlled to be turned off, and the low-potential-side third transistor TR3*b* is controlled to be turned on.

As a result, as illustrated in FIG. 10E, the potential of the second holding capacitor C2, that is, the potential Vpix(m, n) of the pixel electrode Pix is charged with the negative-polarity source potential VSL (at −15 V, for example).

In the hold period following the write period, when the first negative-polarity gate potential VGL1 (at −5 V, for example) is supplied to the first gate bus line (first scan line) SCL1(*m*) and the high-potential-side first pixel transistor TR1*a* is controlled to be turned off, the off-control state of the high-potential-side second transistor TR2*a* and the on-control state of the high-potential-side third transistor TR3*a* are maintained by the potential (VSH−α) obtained by subtracting the potential drop α caused by the feedthrough generated when the high-potential-side first pixel transistor TR1*a* is turned off from the positive-polarity source potential VSH (at +15 V, for example) that has charged the high-potential-side first holding capacitor C1*a* to the potential Va(m, n), as illustrated in FIG. 10F.

In the hold period, when the second negative-polarity gate potential VGL2 (at −15 V, for example) is supplied to the second gate bus line (second scan line) SCL2(*m*) and the low-potential-side first pixel transistor TR1*b* is controlled to be turned off, the off-control state of the low-potential-side second transistor TR2*b* and the on-control state of the low-potential-side third transistor TR3*b* are maintained by the potential (GND−α) obtained by subtracting the potential drop α caused by the feedthrough generated when the low-potential-side first pixel transistor TR1*b* is turned off from the GND potential that has charged the low-potential-side first holding capacitor C1*b* to the potential Vb(m, n), as illustrated in FIG. 10F.

As a result, as illustrated in FIG. 10F, the potential of the second holding capacitor C2, that is, the potential Vpix(m, n) of the pixel electrode Pix is statically held in the state of being supplied with the negative-polarity source potential VSL (at −15 V, for example).

In the present embodiment, the high-potential-side first holding capacitor C1*a* only needs to have capacitance required to maintain the control states of the high-potential-side second transistor TR2*a* and the high-potential-side third transistor TR3*a* during the hold period. The low-potential-side first holding capacitor C1*b* also only needs to have capacitance required to maintain the control states of the low-potential-side second transistor TR2*b* and the low-potential-side third transistor TR3*b* during the hold period. Specifically, the high-potential-side first holding capacitor C1*a* and the low-potential-side first holding capacitor C1*b* have capacitance of approximately 0.1 pF, for example. This capacitance can reduce the potential drop α caused by the feedthrough that occurs when the high-potential-side first pixel transistor TR1*a* is turned off and when the low-potential-side first pixel transistor TR1*b* is turned off.

The potential of the second holding capacitor C2, that is, the potential Vpix(m, n) of the pixel electrode Pix is statically held in the state of being supplied with the positive-polarity source potential VSH (at +15 V, for example), the GND potential, or the negative-polarity source potential VSL (at −15 V, for example) during the hold period. This operation can restrain the reduction in display quality caused by the potential variation.

Each of the positive-polarity source potential VSH, the GND potential, and the negative-polarity source potential VSL supplied to the pixel PX may be a value obtained by adding the potential drop α caused by the feedthrough that occurs when the high-potential-side first pixel transistor TR1*a* is turned off and when the low-potential-side first pixel transistor TR1*b* is turned off. This addition can offset the potential drop α caused by the feedthrough that occurs when the high-potential-side first pixel transistor TR1*a* is turned off and when the low-potential-side first pixel transistor TR1*b* is turned off.

Thus, with the configuration of the first embodiment, the potential of the pixel electrode Pix is statically held in the state of being supplied with any one of the three potential values supplied to the pixel PX. This operation reduces the potential variation of the pixel electrode Pix, and thus, can restrain the reduction in display quality.

With the configuration of the present embodiment, when the source drive signal (pixel signal) SIG(n) is set to the positive-polarity source potential VSH (at +15 V, for example), a high potential of VSH−VSL (for example, +15 V−(−15 V)=30 V) is applied to the low-potential-side third transistor TR3*b* interposed between the positive-polarity source potential VSH (at +15 V, for example) and the negative-polarity source potential VSL (at −15 V, for example) during the write period and the hold period, as illustrated in FIGS. 10A and 10B. For this reason, for example, the low-potential-side third transistor TR3*b* preferably has a double-gate configuration. Alternatively, in an aspect of the present disclosure, the low-potential-side third transistor TR3*b* may have a larger L-length than that of the other transistors.

Second Embodiment

Figure 11:
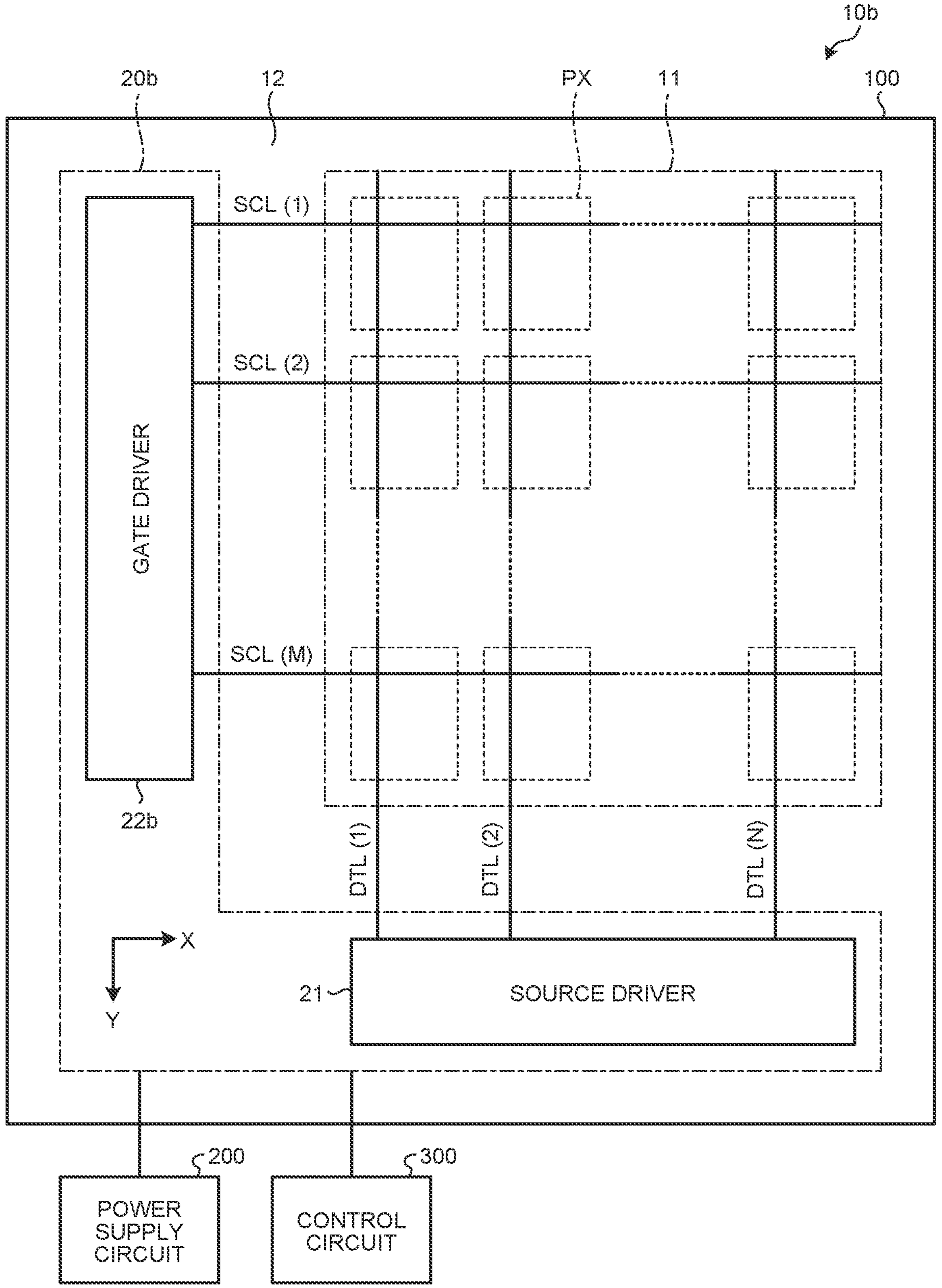
FIG. 11 is a block diagram illustrating a configuration example of a display device according to a second embodiment of the present disclosure.
Figure 12:
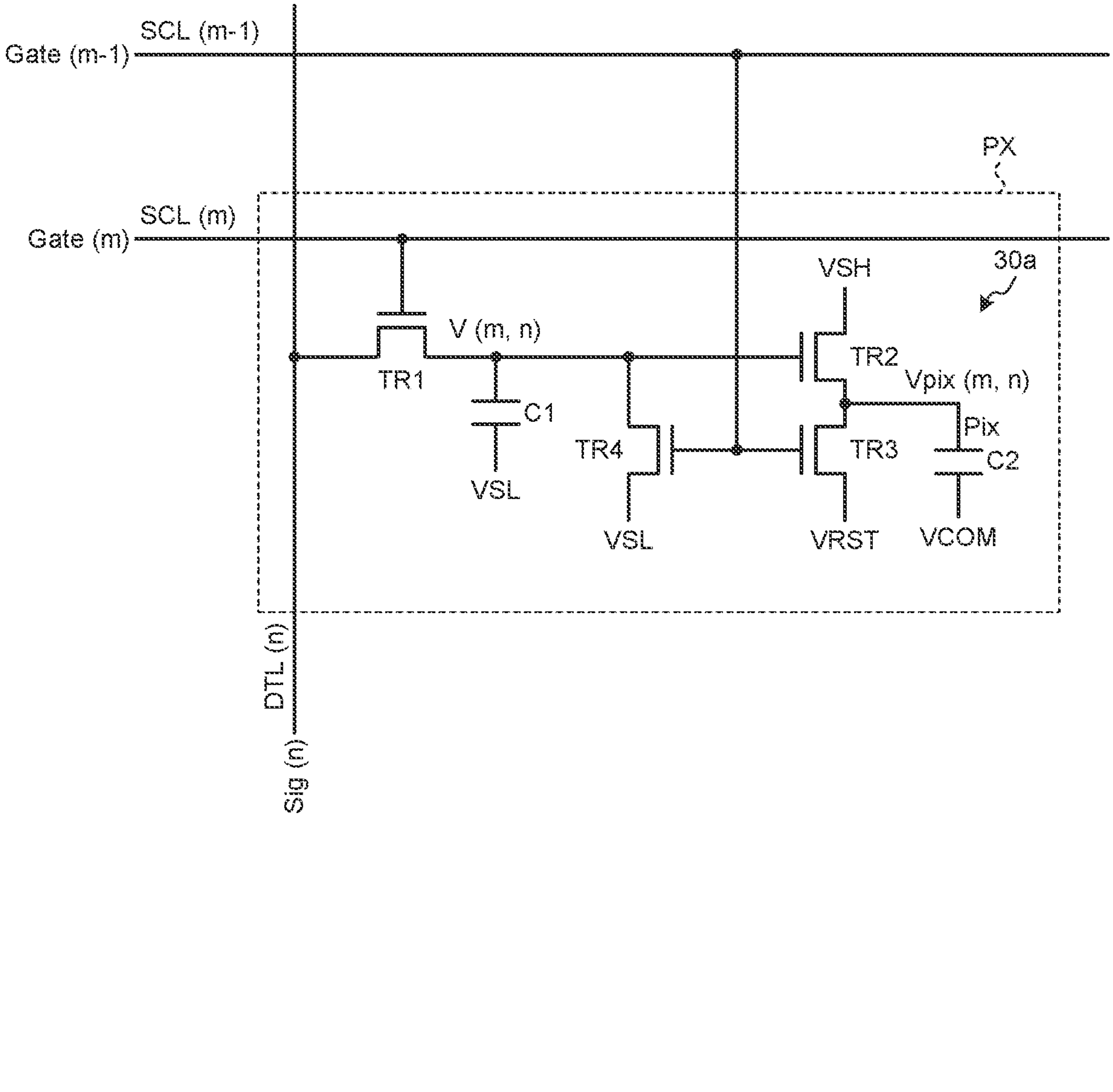
FIG. 12 is a diagram illustrating an exemplary configuration of one pixel of the display device according to the second embodiment.

FIG. 11 is a block diagram illustrating a configuration example of a display device according to a second embodiment of the present disclosure. FIG. 12 is a diagram illustrating an exemplary configuration of one pixel of the display device according to the second embodiment. FIGS. 13A, 13B, 13C, 13D, 13E, and 13F are timing diagrams for explaining operations in the second embodiment. FIGS. 14A, 14B, and 14C are conceptual diagrams illustrating specific examples of operations of a potential maintenance circuit according to the second embodiment. In the following description, the same components as those described in the first embodiment above will be denoted by the same reference numerals without being described again, and only differences from the first embodiment will be described.

In a display device 10*b* according to the second embodiment, the source driver 21 (first driver) of a display panel driver 20*b* corresponds to the source driver 21 of the comparative example described above. A gate driver 22*b* (second driver) corresponds to the gate driver 22 of the comparative example described above. In the present embodiment, the positive-polarity gate potential VGH is set to +19 V, for example. In the present embodiment, the negative-polarity gate potential VGL is set to −17 V, for example.

As illustrated in FIG. 12, a potential maintenance circuit 30*a* according to the second embodiment includes a first pixel transistor TR1, a second pixel transistor TR2, a third pixel transistor TR3, and a fourth pixel transistor TR4.

In the present embodiment, the first pixel transistor TR1 is an NMOS transistor corresponding to the pixel transistor TR of the comparative example described above. In the present embodiment, one end of the first holding capacitor C1 is coupled to the source bus line (signal line) DTL(n) through the first pixel transistor TR1. In the present embodiment, the negative-polarity source potential VSL is applied to the other end of the first holding capacitor C1.

The second pixel transistor TR2 is an NMOS transistor, for example. The third pixel transistor TR3 is an NMOS transistor, for example. The second and the third pixel transistors TR2 and TR3 are coupled in series between the positive-polarity source potential VSH and a reset potential VRST. The reset potential VRST is set to −18 V, for example.

The second holding capacitor C2 is coupled to a coupling point of the second pixel transistor TR2 to the third pixel transistor TR3. The gate of the second pixel transistor TR2 is supplied with a potential V(m, n) of the first holding capacitor C1. The gate of the third pixel transistor TR3 is coupled to a gate bus line (scan line) SCL(m-1) coupled to the pixels PX in the (m-1)th row, that is, in a row before the mth row. This configuration resets the potential Vpix(m, n)

of the second holding capacitor C2 in each of the pixels PX in the mth row during the write period of each of the pixels PX in the (m-1)th row.

The fourth pixel transistor TR4 is an NMOS transistor, for example. The fourth pixel transistor TR4 is coupled between the second pixel transistor TR2 and the negative-polarity source potential VSL. That is, the fourth pixel transistor TR4 is coupled between both ends of the first holding capacitor C1. The gate of the fourth pixel transistor TR4 is coupled to the gate bus line (scan line) SCL(m-1) coupled to each of the pixels PX in the (m-1)th row. This configuration resets the potential V(m, n) of the first holding capacitor C1 in each of the pixels PX in the mth row during the write period of each of the pixels PX in the (m-1)th row.

That is, with the configuration of the second embodiment, a reset period of the first and the second holding capacitors C1 and C2 is provided before the write period of each of the pixels PX in the mth row. In the present embodiment, the reset period of each of the pixels PX in the mth row is defined as a period corresponding to the write period of each of the pixel PX in the (m-1)th row immediately before the write period of each of the pixels PX in the mth row.

Figure 13A:
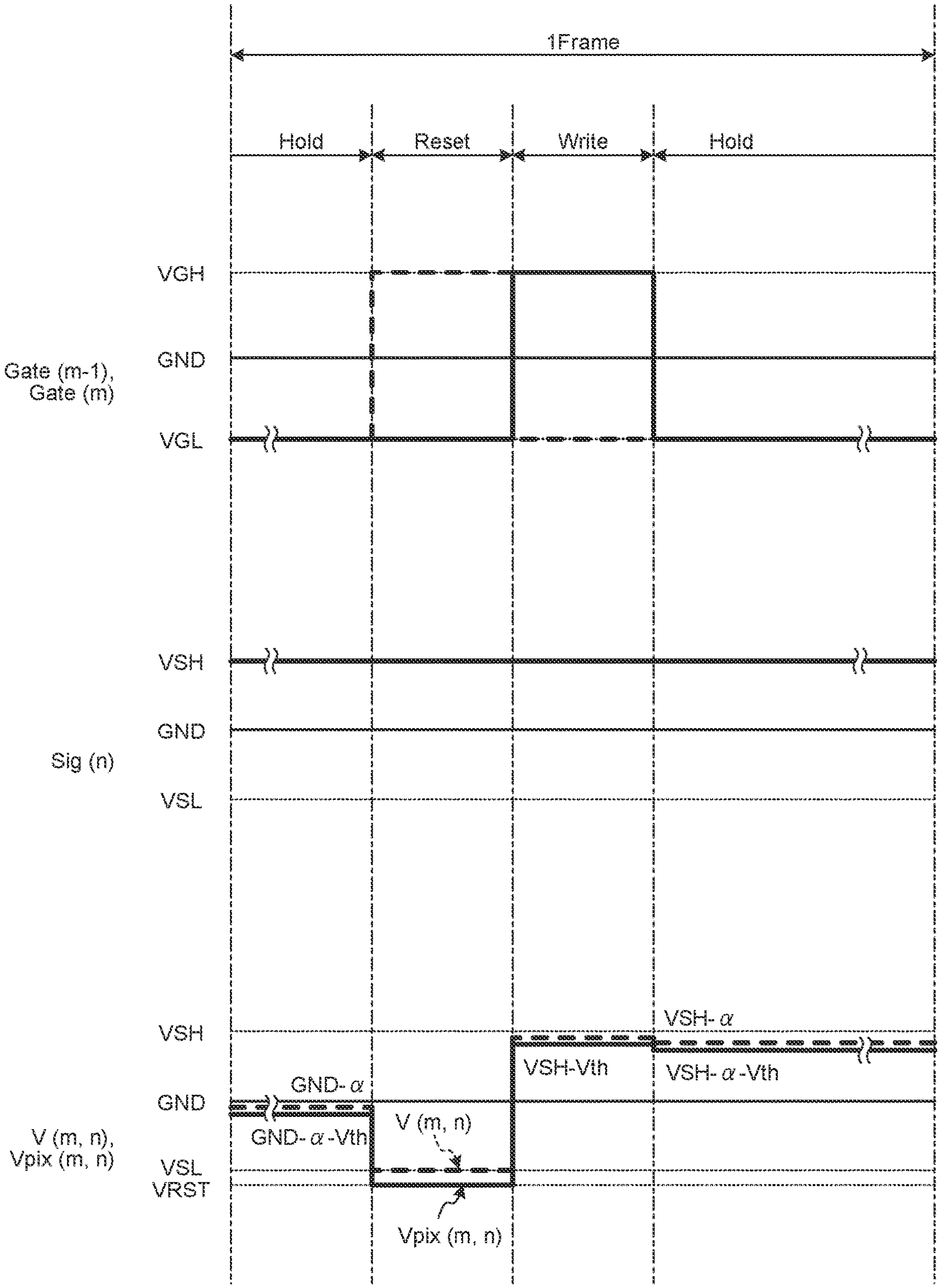
FIG. 13A is a timing diagram for explaining an operation in the second embodiment.
Figure 13B:
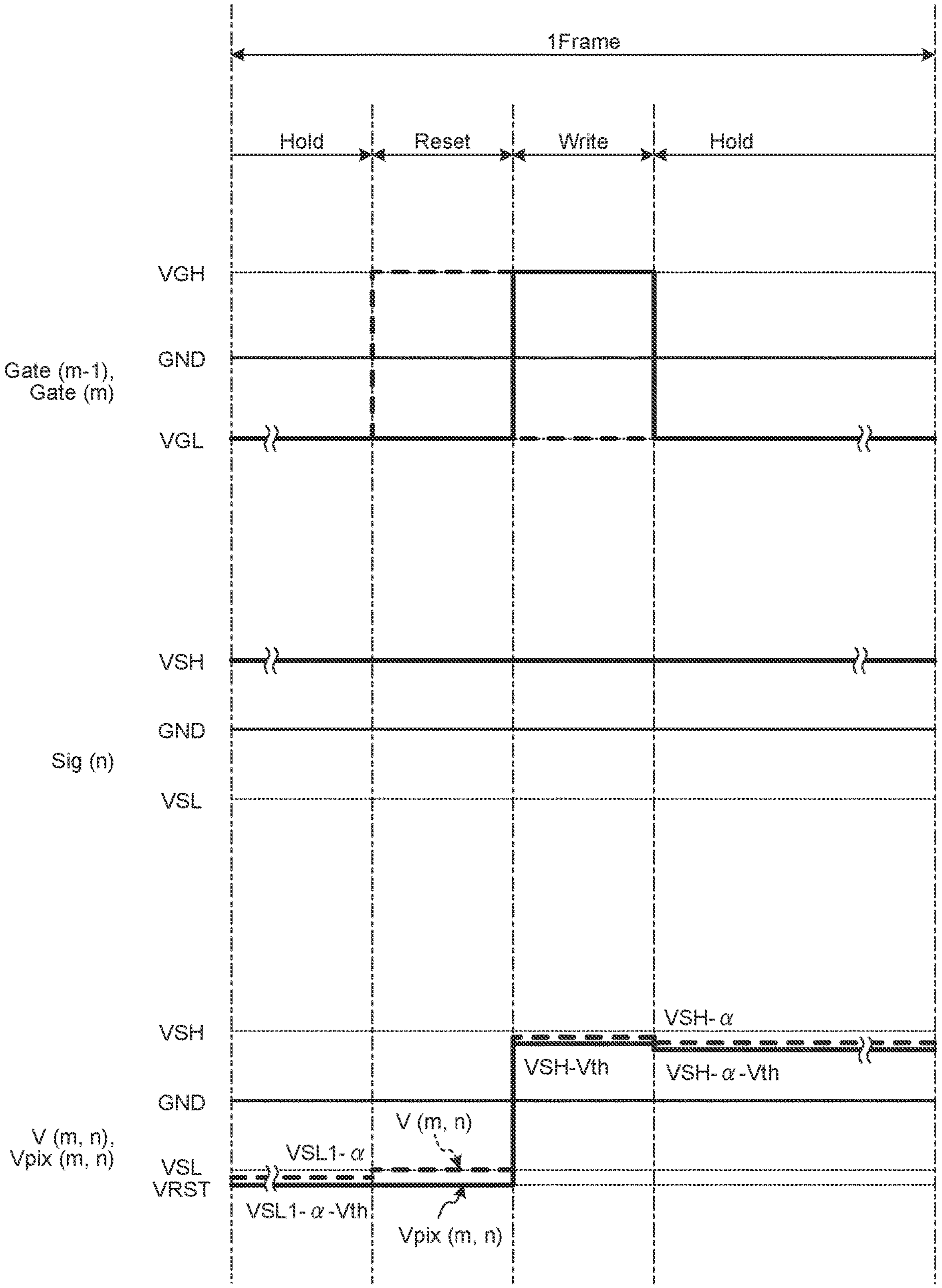
FIG. 13B is a timing diagram for explaining another operation in the second embodiment.
Figure 14A:
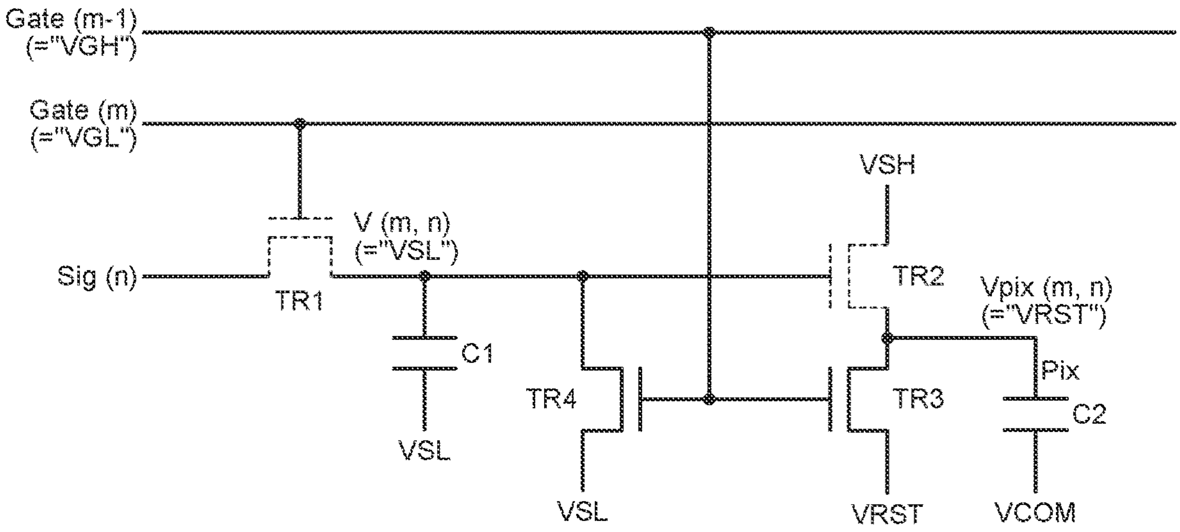
FIG. 14A is a conceptual diagram illustrating a specific example of an operation of a potential maintenance circuit according to the second embodiment.
Figure 14B:
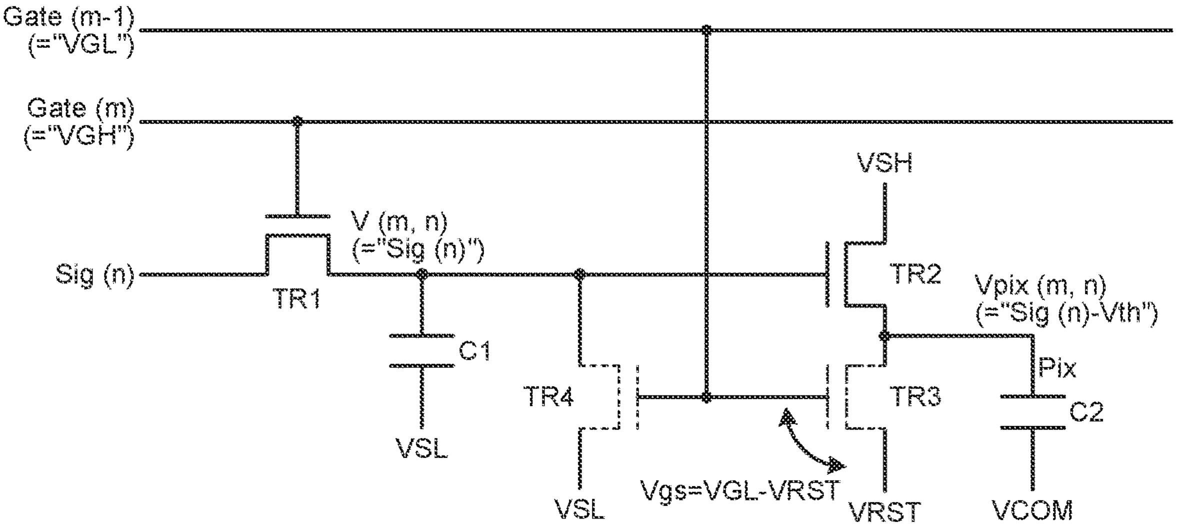
FIG. 14B is a conceptual diagram illustrating another specific example of the operation of the potential maintenance circuit according to the second embodiment.
Figure 14C:
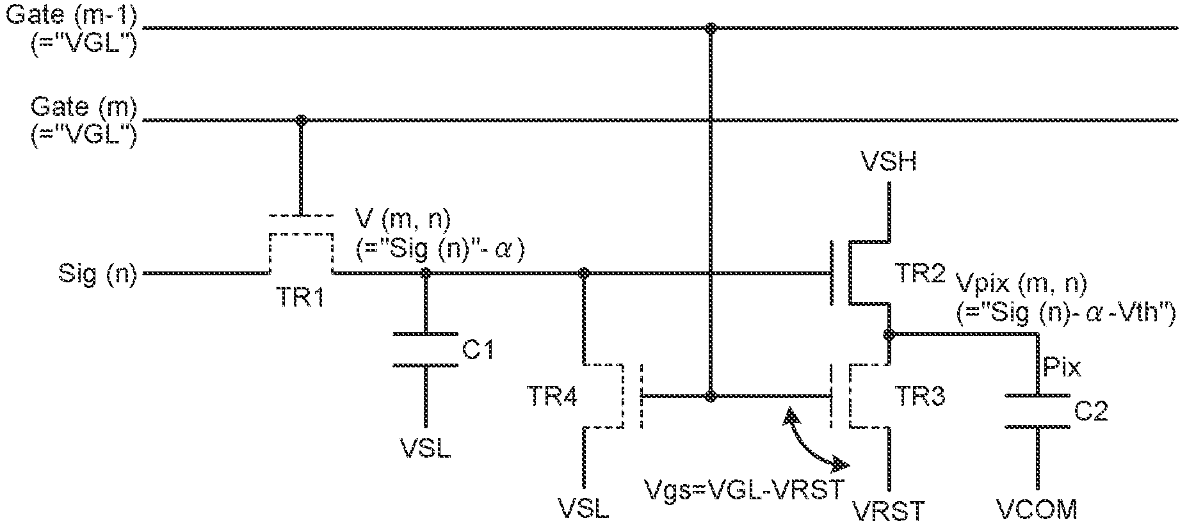
FIG. 14C is a conceptual diagram illustrating still another specific example of the operation of the potential maintenance circuit according to the second embodiment.

FIG. 13A illustrates a timing diagram when the potential of the source drive signal (pixel signal) SIG(n) has changed from the GND potential in the previous frame to the positive-polarity source potential VSH (at +15 V, for example). FIG. 13B illustrates a timing diagram when the potential of the source drive signal (pixel signal) SIG(n) has changed from the negative-polarity source potential VSL (at −15 V, for example) in the previous frame to the positive-polarity source potential VSH (at +15 V, for example).

Figure 13C:
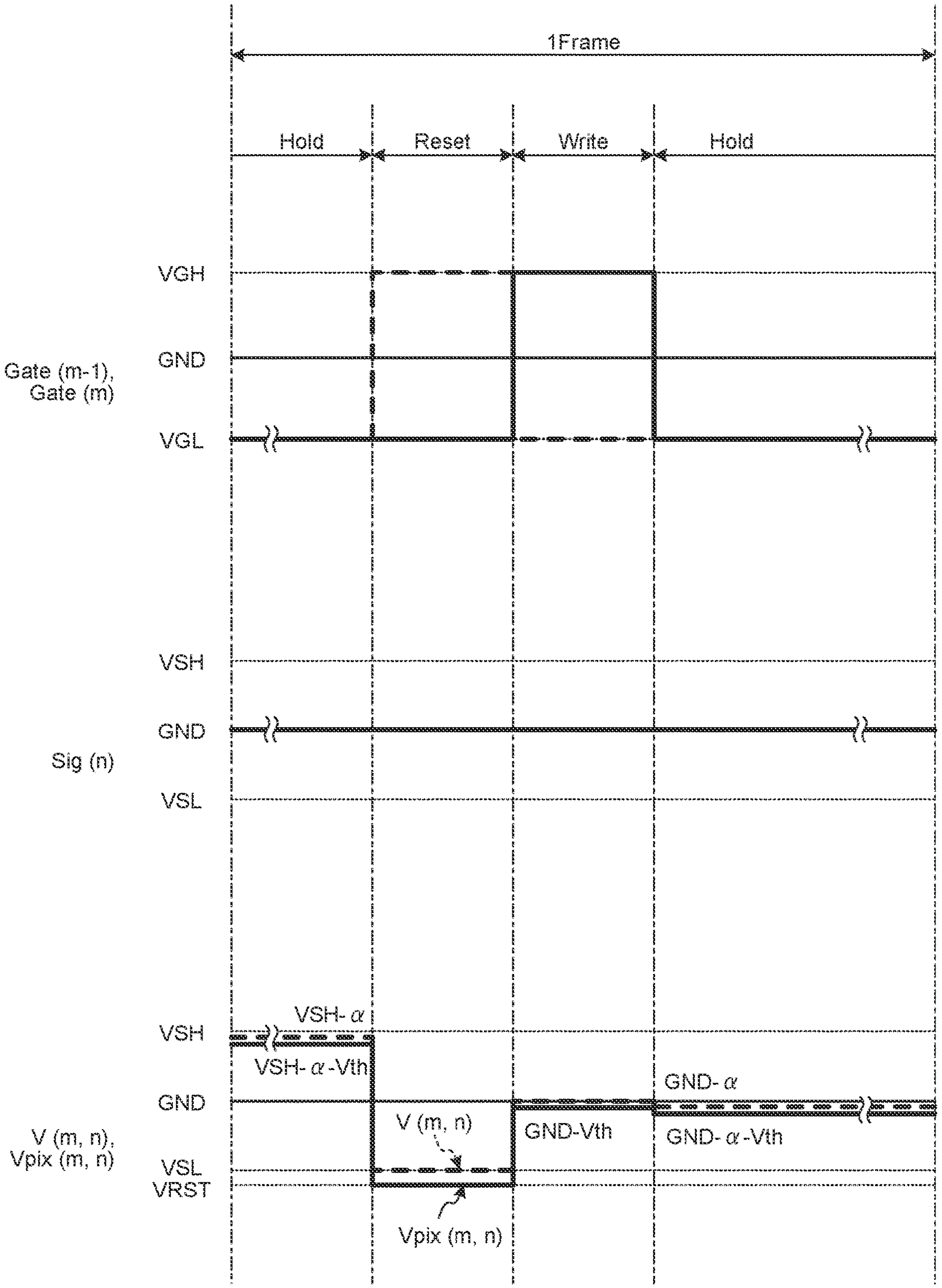
FIG. 13C is a timing diagram for explaining still another operation in the second embodiment.
Figure 13D:
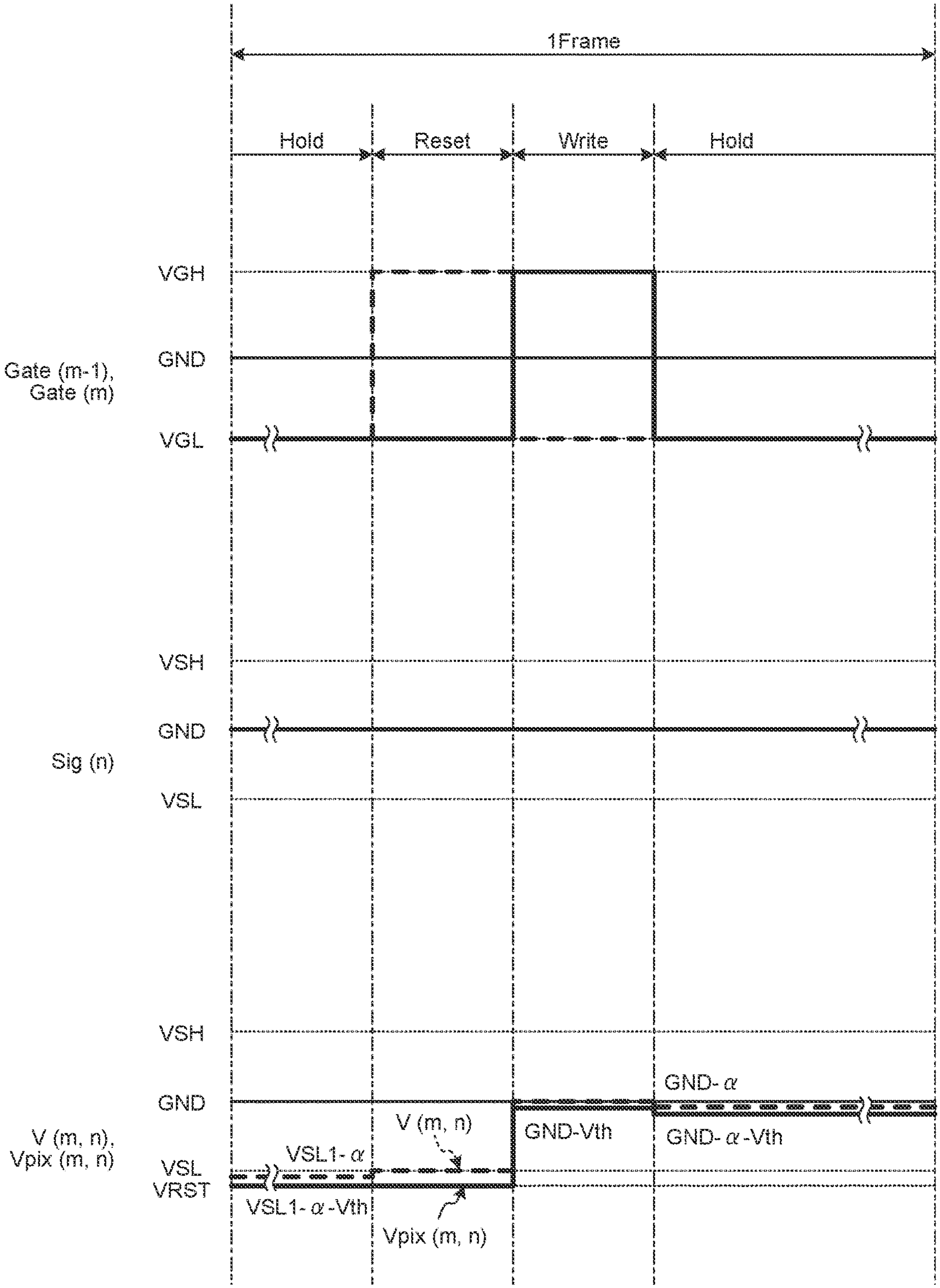
FIG. 13D is a timing diagram for explaining still another operation in the second embodiment.

FIG. 13C illustrates a timing diagram when the potential of the source drive signal (pixel signal) SIG(n) has changed from the positive-polarity source potential VSH (at +15 V, for example) in the previous frame to the GND potential. FIG. 13D illustrates a timing diagram when the potential of the source drive signal (pixel signal) SIG(n) has changed from the negative-polarity source potential VSL (at −15 V, for example) in the previous frame to the GND potential.

Figure 13E:
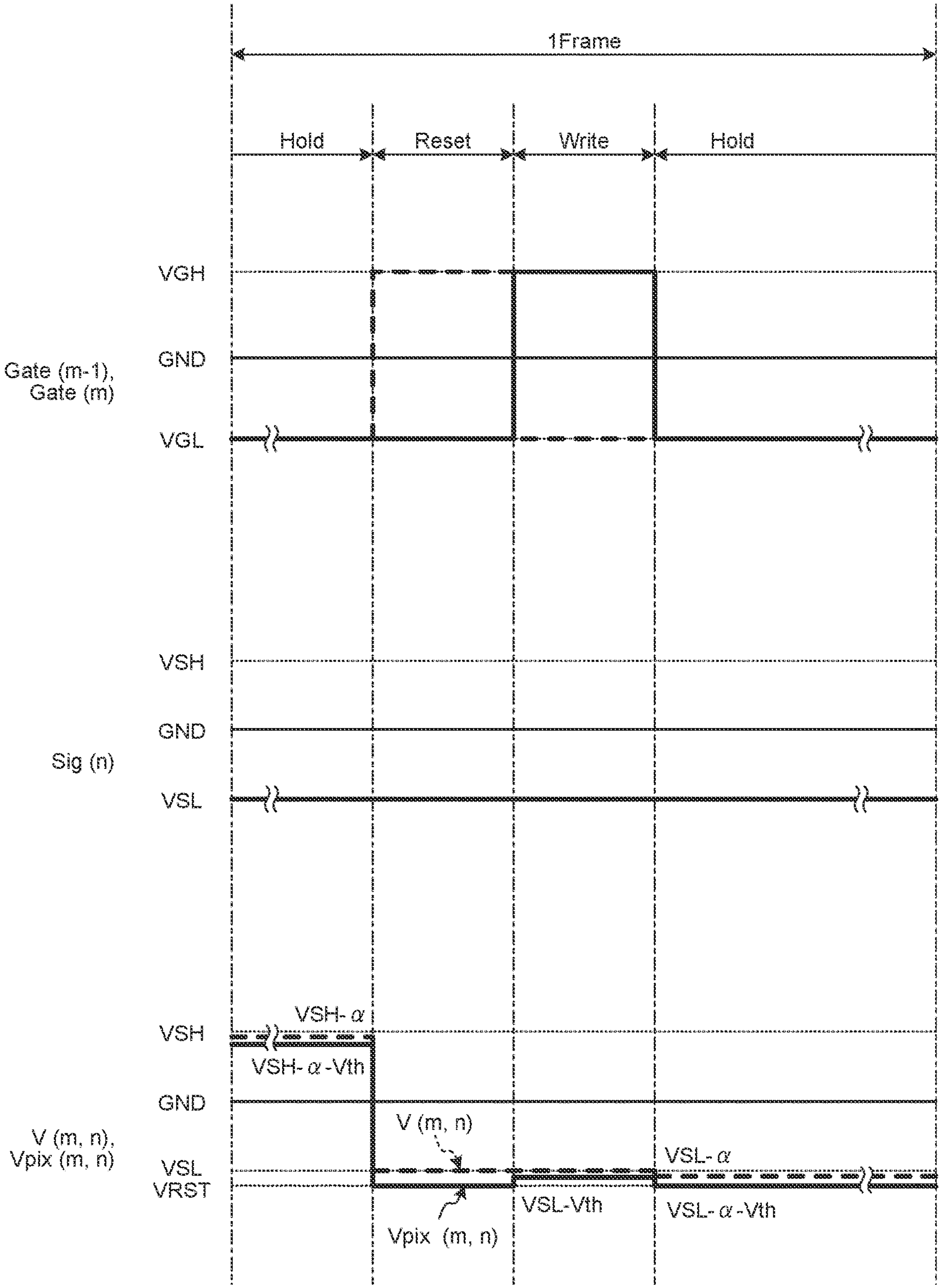
FIG. 13E is a timing diagram for explaining still another operation in the second embodiment.
Figure 13F:
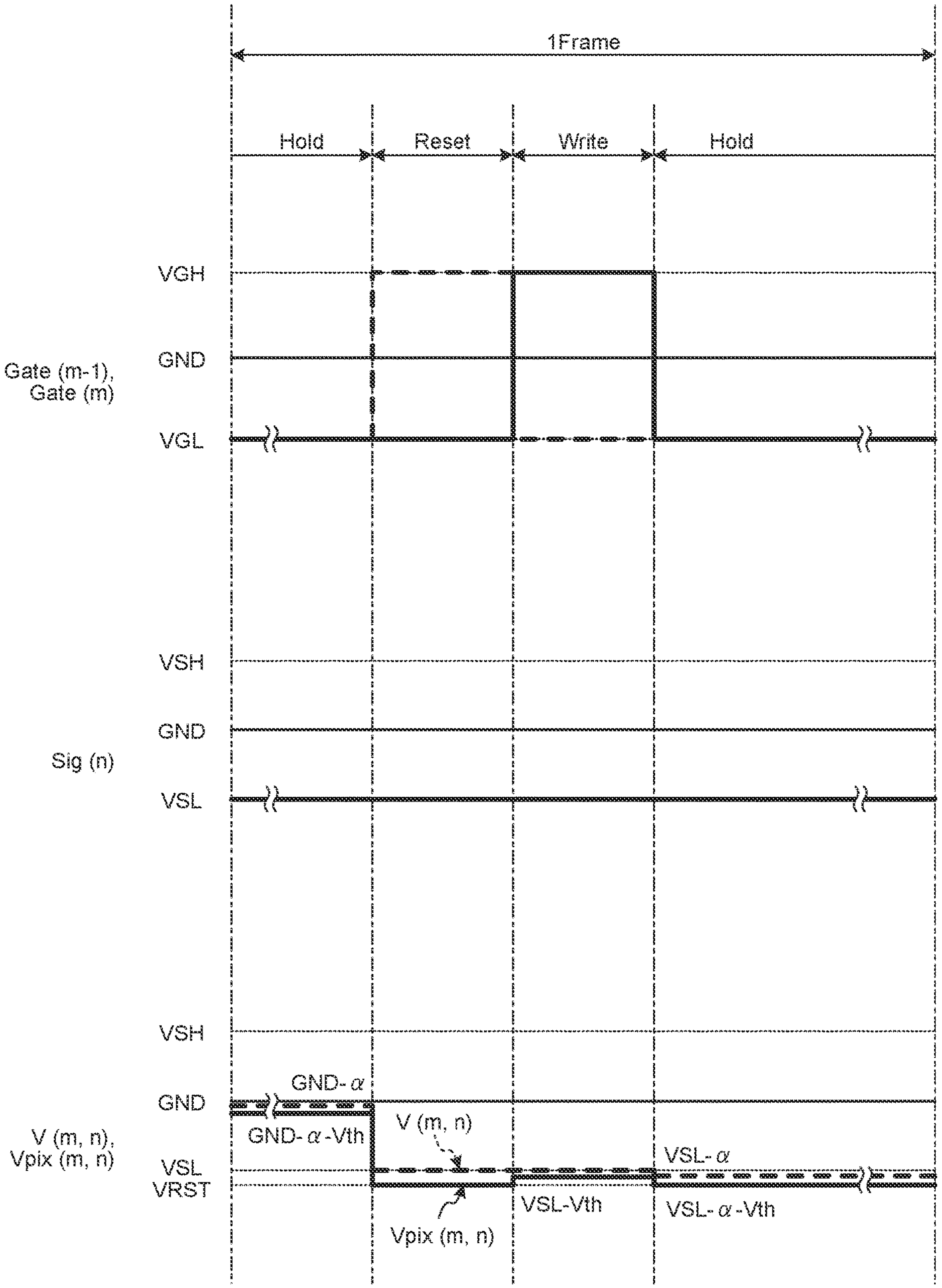
FIG. 13F is a timing diagram for explaining still another operation in the second embodiment.

FIG. 13E illustrates a timing diagram when the potential of the source drive signal (pixel signal) SIG(n) has changed from the positive-polarity source potential VSH (at +15 V, for example) in the previous frame to the negative-polarity source potential VSL (at −15 V, for example). FIG. 13F illustrates a timing diagram when the potential of the source drive signal (pixel signal) SIG(n) has changed from the GND potential in the previous frame to the negative-polarity source potential VSL (at −15 V, for example).

FIG. 14A illustrates an operation example of the potential maintenance circuit 30*a* during the reset period. FIG. 14B illustrates an operation example of the potential maintenance circuit 30*a* during the write period. FIG. 14C illustrates an operation example of the potential maintenance circuit 30*a* during the hold period.

As illustrated in FIGS. 13A, 13B, 13C, 13D, 13E, and 13F, the gate driver 22*b* supplies the positive-polarity gate potential VGH to the gate bus line (scan line) SCL(m) during the write period of each of the pixels PX in the mth row. The gate driver 22*b* supplies the negative-polarity gate potential VGL to the gate bus line (scan line) SCL(m) during the hold period except the write period. The gate driver 22*b* supplies the positive-polarity gate potential VGH to the gate bus line (scan line) SCL(m-1) during the reset period of each of the pixels PX in the mth row. The gate driver 22*b* supplies the negative-polarity gate potential VGL to the gate bus line (scan line) SCL(m-1) during the periods except the reset period of each of the pixels PX in the mth row.

In the present embodiment, the reset period of each of the pixels PX in the mth row is defined as the period corresponding to the write period of each of the pixel PX in the (m-1)th row. However, an aspect of the present disclosure may be such that a reset line(m) is provided in addition to the gate bus line (scan line) SCL(m), and the reset line(m) is supplied with the positive-polarity gate potential VGH during the reset period corresponding to the write period of each of the pixel PX in the (m-1)th row, and supplied with the negative-polarity gate potential VGL during the periods except the reset period.

First, the following describes the case where the source drive signal (pixel signal) SIG(n) is set to the positive-polarity source potential VSH (at +15 V, for example), with reference to FIGS. 13A and 13B.

During the hold period before the reset period, the negative-polarity gate potential VGL (at −17 V, for example) is supplied to the gate bus lines (scan lines) SCL(m-1) and SCL(m). At this time, the first pixel transistor TR1 and the fourth pixel transistor TR4 illustrated with dashed lines in FIG. 14C are controlled to be turned off. At this time, the third pixel transistor TR3 illustrated with a long dashed short dashed line serves as a constant-current source driven by a gate-source potential Vgs (=VGL−VRST) (for example, −17 V−(−18 V)=1 V).

When the positive-polarity gate potential VGH (at +19 V, for example) is supplied to the gate bus line (scan line) SCL(m-1) during the subsequent holding period, the third and the fourth pixel transistors TR3 and TR4 are controlled to be turned on. This operation resets the potential V(m, n) of the first holding capacitor C1 to the negative-polarity source potential VSL as illustrated in FIG. 14A, and as a result, the second pixel transistor TR2 is controlled to be turned off to reset the potential Vpix(m, n) of the second holding capacitor C2 to the reset potential VRST.

During the write period, when the negative-polarity gate potential VGL (at −17 V, for example) is supplied to the gate bus line (scan line) SCL(m-1) and the positive-polarity gate potential VGH (at +19 V, for example) is supplied to the gate bus line (scan line) SCL(m), the first pixel transistor TR1 is controlled to be turned on, and the fourth pixel transistor TR4 is controlled to be turned off.

As a result, as illustrated in FIG. 14B, the source drive signal (pixel signal) SIG(n) (at the positive-polarity source potential VSH (at +15 V, for example) in the examples illustrated in FIGS. 13A and 13B) is applied as the potential V(m, n) of the first holding capacitor C1. This operation charges the first holding capacitor C1 with a difference between the potential of the source drive signal (pixel signal) SIG(n) and the negative-polarity source potential VSL (in this case, VSH−VSL=+15 V−(−15 V)=30 V), and as a result, the second pixel transistor TR2 is controlled to be turned on.

At this time, the third pixel transistor TR3 illustrated with a long dashed short dashed line serves as a constant-current source driven by the gate-source potential Vgs (=VGL−VRST) (for example, −17 V−(−18 V)=1 V), and a potential obtained by subtracting Vth of the second transistor TR2 from the potential V(m, n) of the first holding capacitor C1 (in this case, source drive signal (pixel signal) SIG(n) =positive-polarity source potential VSH (at +15 V, for example)) is applied as the potential Vpix(m, n) of the second holding capacitor C2, as illustrated in FIG. 14B. As a result, the second holding capacitor C2 is charged with a potential (VSH−Vth) obtained by subtracting Vth of the second transistor TR2 from the source drive signal (pixel signal) SIG(n)=the positive-polarity source potential VSH (at +15 V, for example).

During the hold period following the write period, when the negative-polarity gate potential VGL (at −17 V, for example) is supplied to the gate bus line (scan line) SCL(m), the first pixel transistor TR1 is controlled to be turned off. As a result, as illustrated in FIG. 14C, the on-control state of the second transistor TR2 is maintained by a potential (SIG(n)−α−Vth) obtained by subtracting the potential drop α caused by the feedthrough that occurs when the first pixel transistor TR1 is turned off and Vth of the second transistor TR2 from the potential of the source drive signal (pixel signal) SIG(n) (at the positive-polarity source potential VSH (at +15 V, for example) in the examples illustrated in FIGS. 13A and 13B) that has charged the first holding capacitor C1 as the potential V(m, n).

As a result, the potential of the second holding capacitor C2, that is, the potential Vpix(m, n) of the pixel electrode Pix is statically held in the state of being supplied with a potential (VSH−α−Vth) obtained by subtracting the potential drop α caused by the feedthrough that occurs when the first pixel transistor TR1 is tuned off and Vth of the second transistor TR2 from the potential of the source drive signal (pixel signal) SIG(n) (in this case, the positive-polarity source potential VSH (at +15 V, for example)).

The following describes the case where the source drive signal (pixel signal) SIG(n) is set to the GND potential, with reference to FIGS. 13C and 13D. The following describes differences from the case where the source drive signal (pixel signal) SIG(n) is set to the positive-polarity source potential VSH (at +15 V, for example) (refer to FIGS. 13A and 13B).

When the source drive signal (pixel signal) SIG(n) is set to the GND potential, the GND potential is applied as the potential V(m, n) of the first holding capacitor C1 during the write period. This operation charges the first holding capacitor C1 with a difference between the GND potential and the negative-polarity source potential VSL (GND−VSL=0−(−15 V)=15 V), and as a result, the second pixel transistor TR2 is controlled to be turned on.

At this time, a potential obtained by subtracting Vth of the second transistor TR2 from the GND potential is applied as the potential Vpix(m, n) of the second holding capacitor C2. This operation charges the second holding capacitor C2 with a potential (GND−Vth) obtained by subtracting Vth of the second transistor TR2 from the GND potential.

When the first pixel transistor TR1 is controlled to be turned off during the hold period following the write period, the potential Vpix(m, n) of the pixel electrode Pix is statically held in the state of being supplied with a potential (GND−α−Vth) obtained by subtracting the potential drop α caused by the feedthrough that occurs when the first pixel transistor TR1 is tuned off and Vth of the second transistor TR2 from the GND potential that has charged the first holding capacitor C1 as the potential V(m, n).

The following describes the case where the source drive signal (pixel signal) SIG(n) is set to the negative-polarity source potential VSL (at −15 V, for example), with reference to FIGS. 13E and 13F. The following describes differences from the case where the source drive signal (pixel signal) SIG(n) is set to the positive-polarity source potential VSH (at +15 V, for example) (refer to FIGS. 13A and 13B) and the case where the source drive signal (pixel signal) SIG(n) is set to the GND potential (refer to FIGS. 13C and 13D).

When the source drive signal (pixel signal) SIG(n) is set to the negative-polarity source potential VSL (at −15 V, for example), the negative-polarity source potential VSL (at −15 V, for example) is applied as the potential V(m, n) of the first holding capacitor C1 during the write period. This operation controls to turn on the second pixel transistor TR2.

At this time, a potential obtained by subtracting Vth of the second transistor TR2 from the negative-polarity source potential VSL (at −15 V, for example) is applied as the potential Vpix(m, n) of the second holding capacitor C2. This operation charges the second holding capacitor C2 with a potential (VSL−Vth) obtained by subtracting Vth of the second transistor TR2 from the negative-polarity source potential VSL (at −15 V, for example).

When the first pixel transistor TR1 is controlled to be turned off during the hold period following the write period, the potential Vpix(m, n) of the pixel electrode Pix is statically held in the state of being supplied with a potential (VSL−α−Vth) obtained by subtracting the potential drop α caused by the feedthrough that occurs when the first pixel transistor TR1 is turned off and Vth of the second transistor TR2 from the negative-polarity source potential VSL (at −15 V, for example) that has charged the first holding capacitor C1 as the potential V(m, n).

In the present embodiment, the first holding capacitor C1 only needs to have capacitance required to maintain the on-state of the second transistor TR2 during the hold period. Specifically, the first holding capacitor C1 has capacitance of approximately 0.1 pF, for example. This capacitance can reduce the potential drop α caused by the feedthrough that occurs when the first pixel transistor TR1 is turned off.

The potential of the second holding capacitor C2, that is, the potential Vpix(m, n) of the pixel electrode Pix is statically held in the state of being supplied with the positive-polarity source potential VSH (at +15 V, for example), the GND potential, or the negative-polarity source potential VSL (at −15 V, for example) during the hold period. This operation can restrain the reduction in display quality caused by the potential variation.

Third Embodiment

Figure 15:
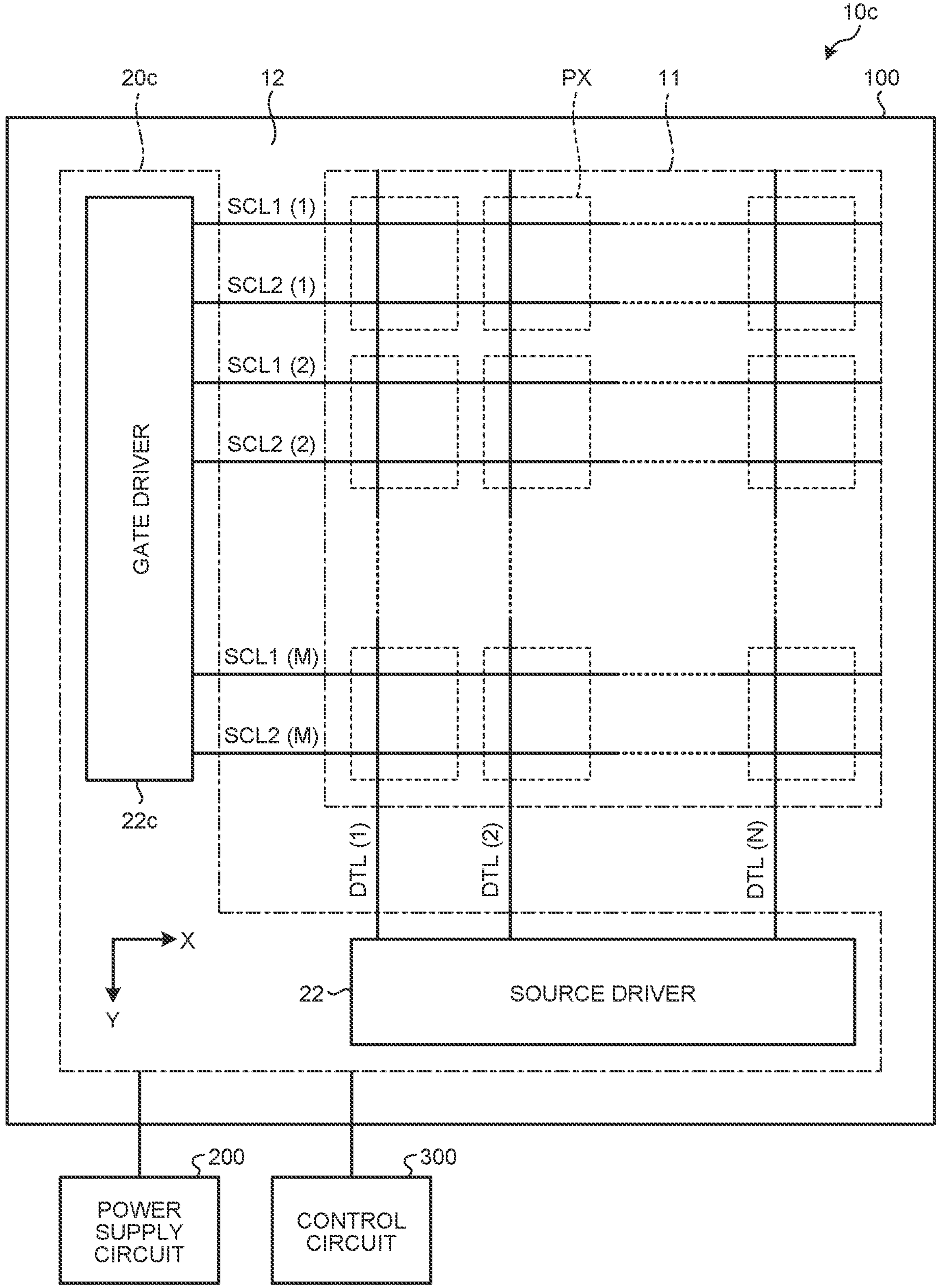
FIG. 15 is a block diagram illustrating a configuration example of a display device according to a third embodiment of the present disclosure.
Figure 16:
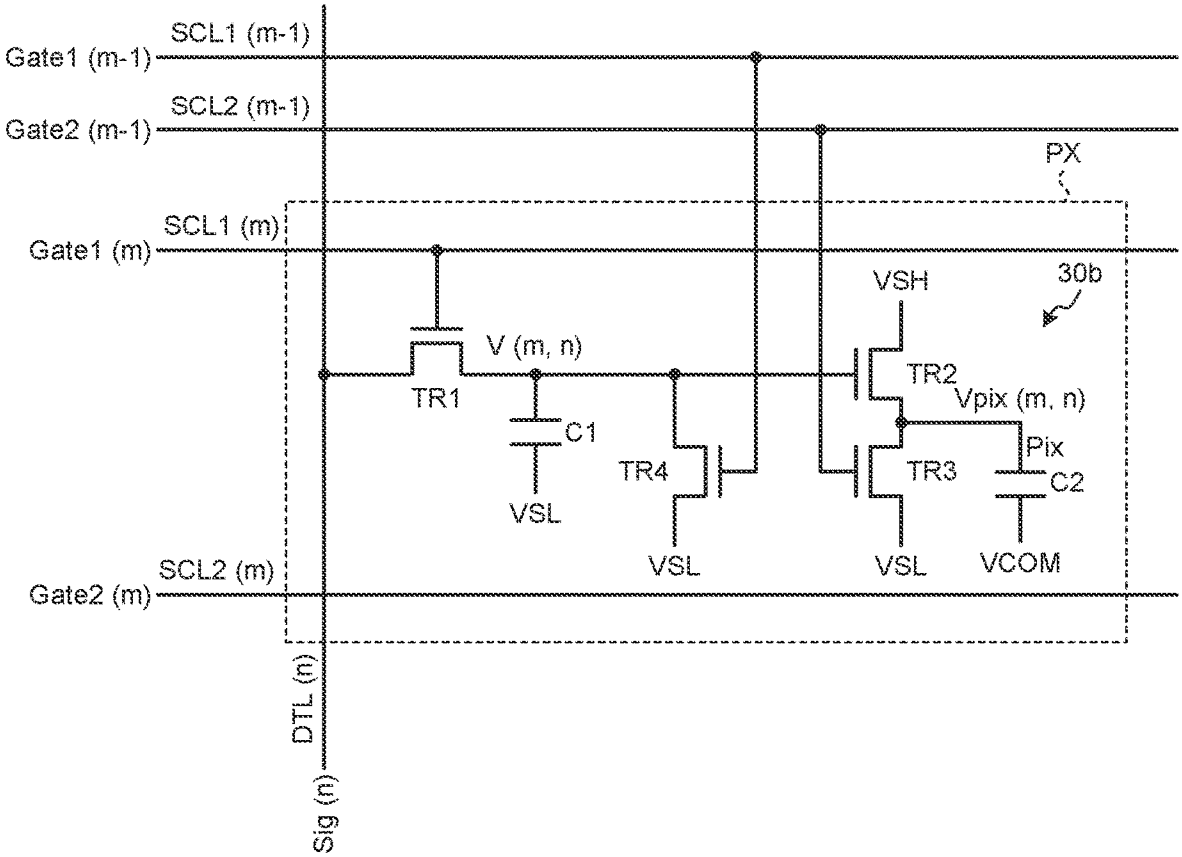
FIG. 16 is a diagram illustrating an exemplary configuration of one pixel of the display device according to the third embodiment.

FIG. 15 is a block diagram illustrating a configuration example of a display device according to a third embodiment of the present disclosure. FIG. 16 is a diagram illustrating an exemplary configuration of one pixel of the display device according to the third embodiment. FIGS. 17A, 17B, 17C, 17D, 17E, and 17F are timing diagrams for explaining operations in the third embodiment. FIGS. 18A, 18B, and 18C are conceptual diagrams illustrating specific examples of operations of a potential maintenance circuit according to the third embodiment. In the following description, the same components as those described in the second embodiment above will be denoted by the same reference numerals without being described again, and only differences from the second embodiment will be described.

In a display device 10*c* according to the third embodiment, a gate driver 22*c* (second driver) of a display panel driver 20*c* is electrically coupled to the pixels PX arranged in the X-direction in the display region 11 through the first gate bus line (first scan line) SCL1(*m*), and transmits the first gate drive signal (first scan signal) Gate1(*m*) to the first gate bus line (first scan line) SCL1(*m*). The gate driver 22*c* supplies the first positive-polarity gate potential VGH1 to the first gate bus line (first scan line) SCL1(*m*) during the write period. The gate driver 22*c* supplies the first negative-polarity gate potential VGL1 to the first gate bus line (first scan line) SCL1(*m*) during the hold period. In the present embodiment, the first positive-polarity gate potential VGH1 is set to +19 V, for example. In the present embodiment, the first negative-polarity gate potential VGL1 is set to −17 V, for example.

The gate driver 22*c* is also electrically coupled to the pixels PX arranged in the X-direction in the display region 11 through the second gate bus line (second scan line) SCL2(*m*), and transmits the second gate drive signal (second scan signal) Gate2(*m*) to the second gate bus line (second scan line) SCL2(*m*). The gate driver 22*c* supplies the second positive-polarity gate potential VGH2 to the second gate bus line (second scan line) SCL2(*m*) during the write period. The gate driver 22*c* supplies the second negative-polarity gate potential VGL2 to the second gate bus line (second scan line) SCL2(*m*) during the hold period. In the present embodiment, the second positive-polarity gate potential VGH2 is set to −10 V, for example. In the present embodiment, the second negative-polarity gate potential VGL2 is set to −14 V, for example.

In a potential maintenance circuit 30*b* according to the third embodiment, the second and the third pixel transistors TR2 and TR3 are coupled in series between the positive-polarity source potential VSH and the negative-polarity source potential VSL. The gate of the third pixel transistor TR3 is coupled to a second gate bus line (second scan line) SCL2(*m*-1) coupled to each of the pixels PX in the (m-1)th row, that is, in the row before the mth row.

In the pixel PX according to the third embodiment, the gate of the fourth pixel transistor TR4 is coupled to a first gate bus line (first scan line) SCL1(*m*-1) coupled to each of the pixels PX in the (m-1)th row.

Figure 17A:
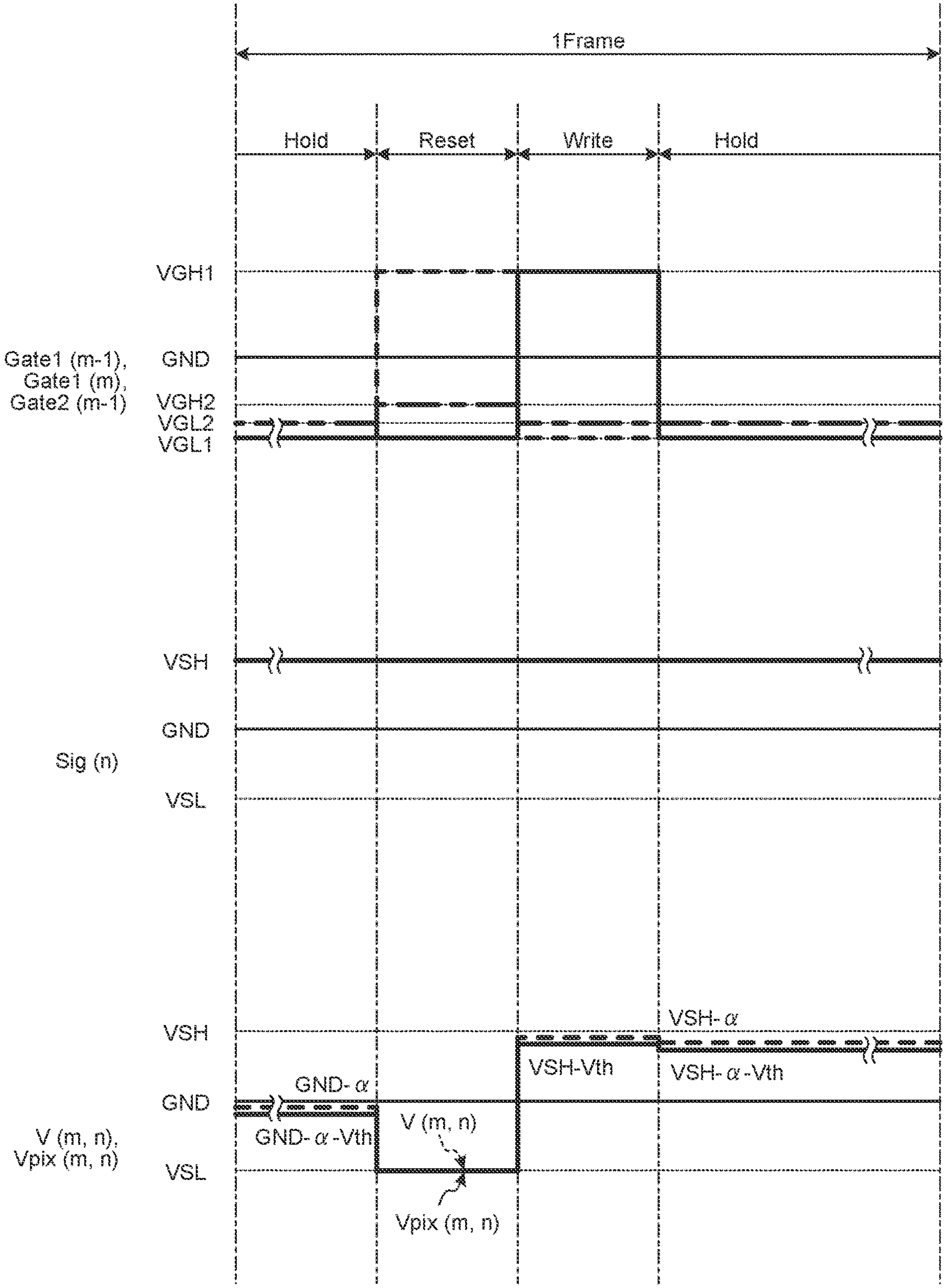
FIG. 17A is a timing diagram for explaining an operation in the third embodiment.
Figure 17B:
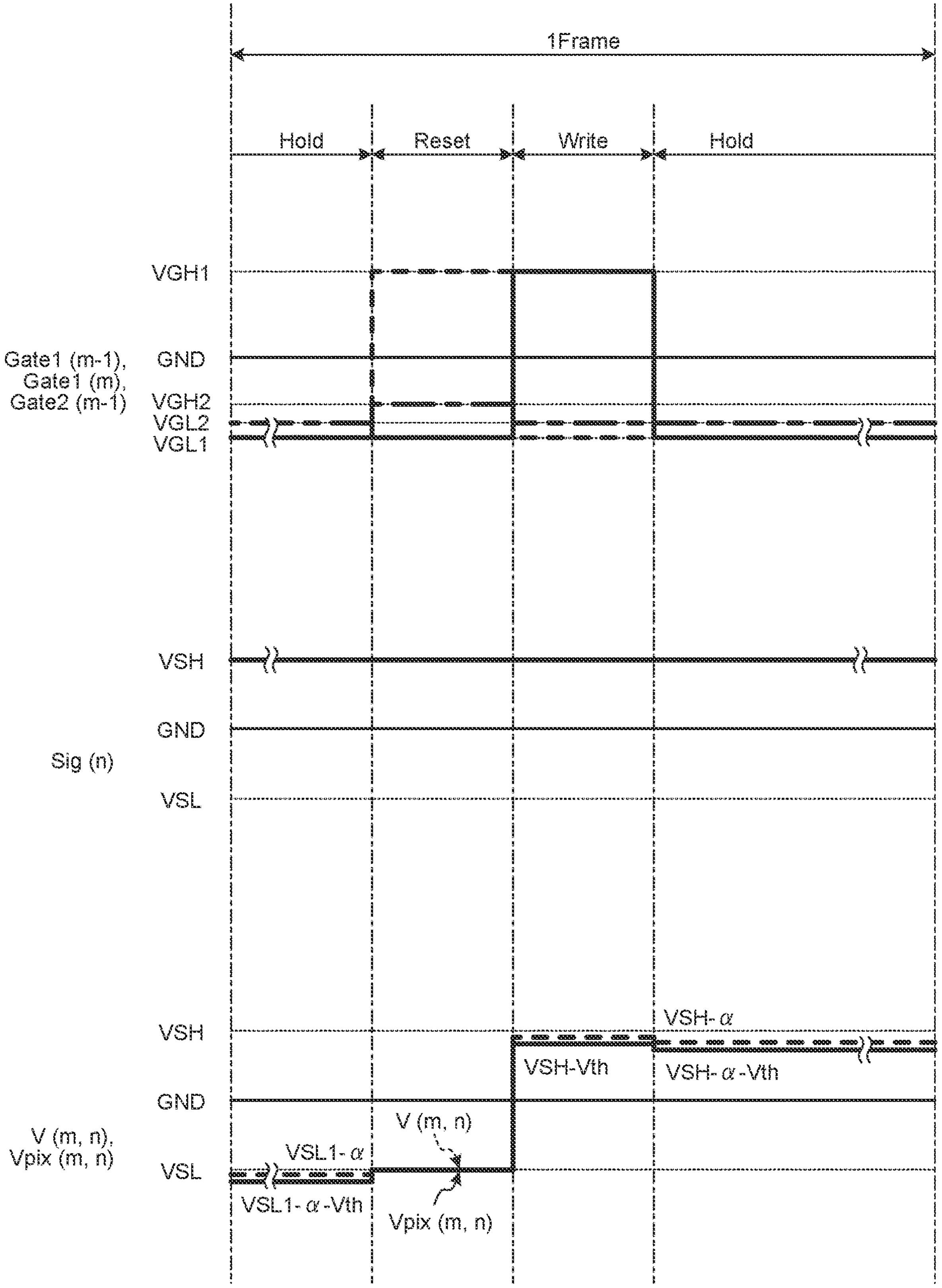
FIG. 17B is a timing diagram for explaining another operation in the third embodiment.
Figure 18A:
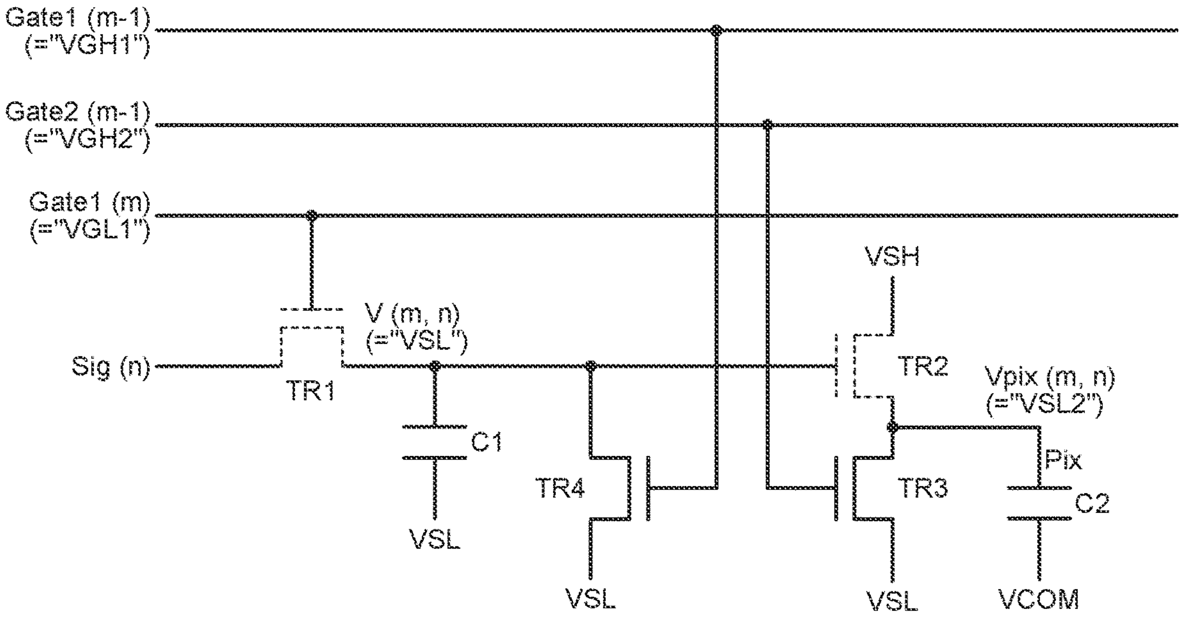
FIG. 18A is a conceptual diagram illustrating a specific example of an operation of a potential maintenance circuit according to the third embodiment.
Figure 18B:
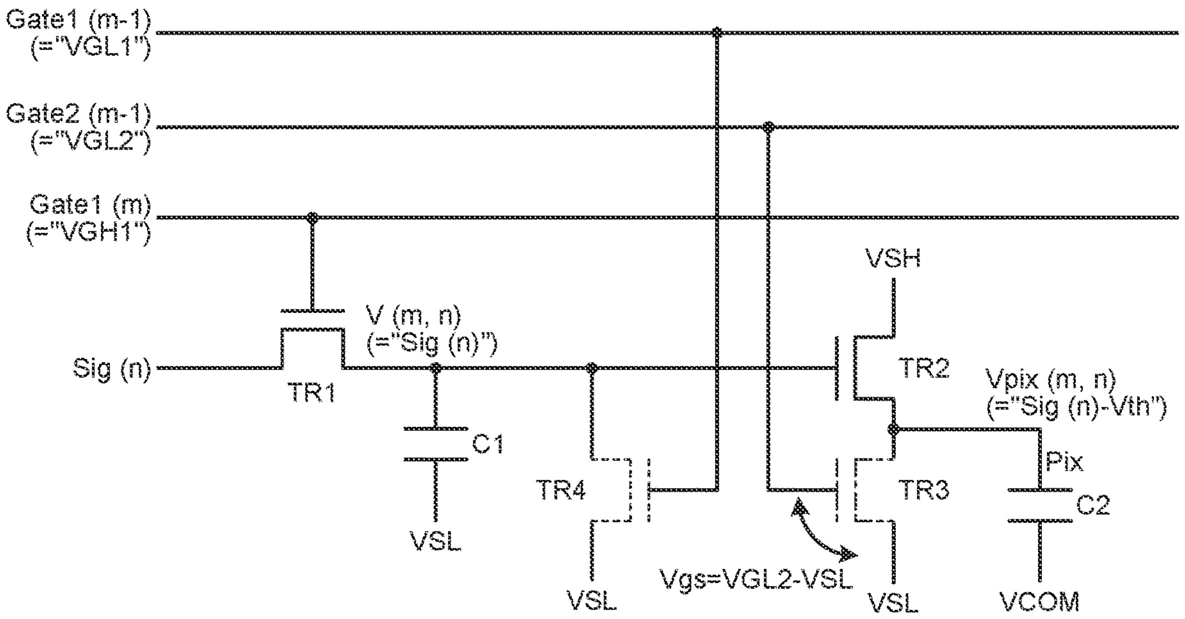
FIG. 18B is a conceptual diagram illustrating another specific example of the operation of the potential maintenance circuit according to the third embodiment.
Figure 18C:
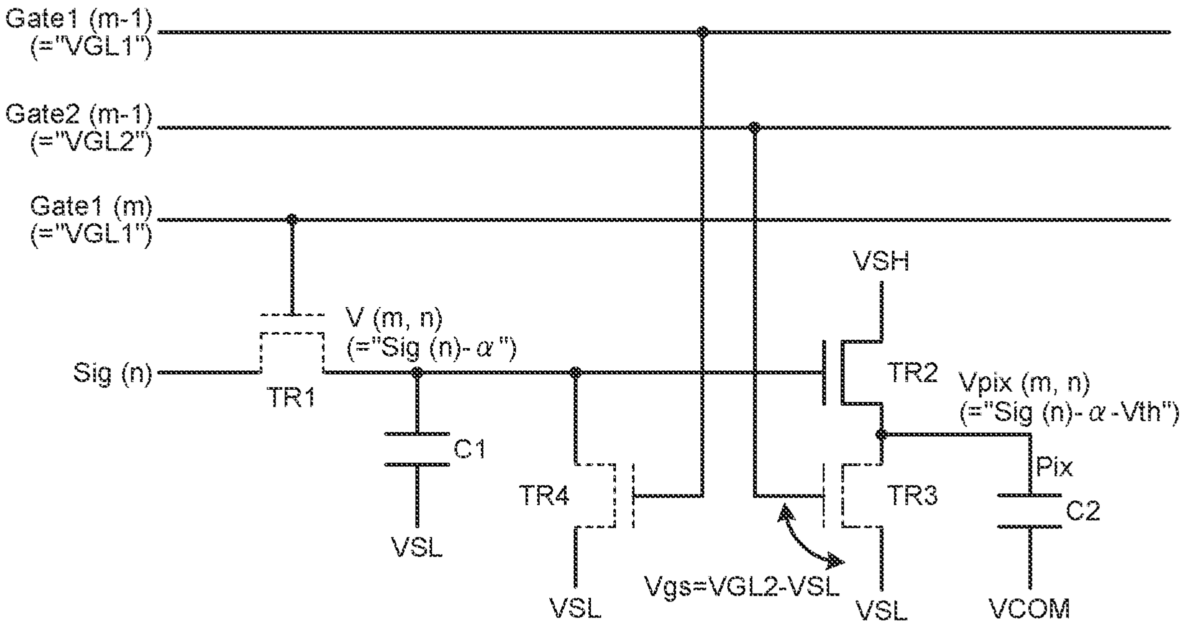
FIG. 18C is a conceptual diagram illustrating still another specific example of the operation of the potential maintenance circuit according to the third embodiment.

FIG. 17A illustrates a timing diagram when the potential of the source drive signal (pixel signal) SIG(n) has changed from the GND potential in the previous frame to the positive-polarity source potential VSH (at +15 V, for example). FIG. 17B illustrates a timing diagram when the potential of the source drive signal (pixel signal) SIG(n) has changed from the negative-polarity source potential VSL (at −15 V, for example) in the previous frame to the positive-polarity source potential VSH (at +15 V, for example).

Figure 17C:
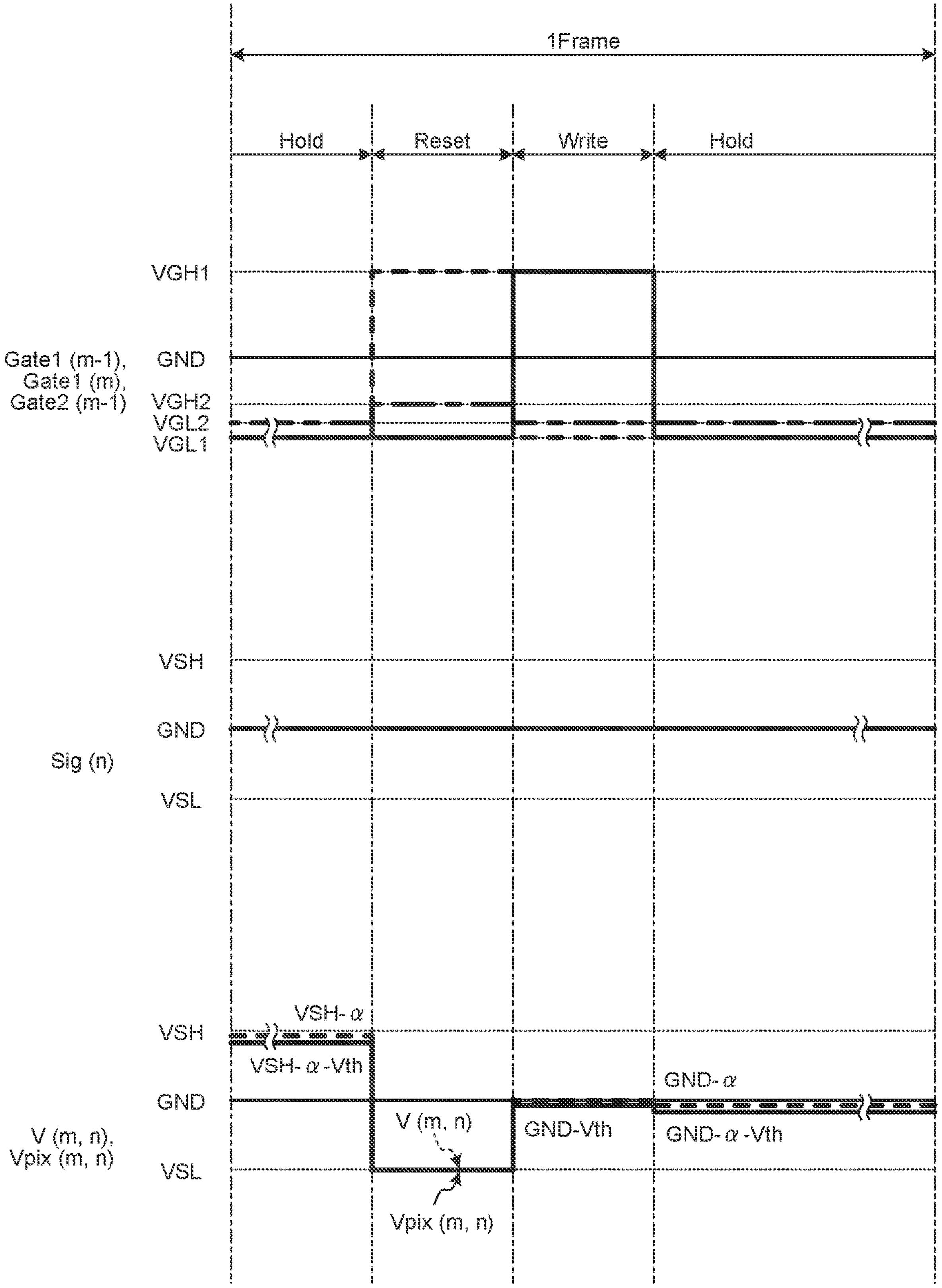
FIG. 17C is a timing diagram for explaining still another operation in the third embodiment.
Figure 17D:
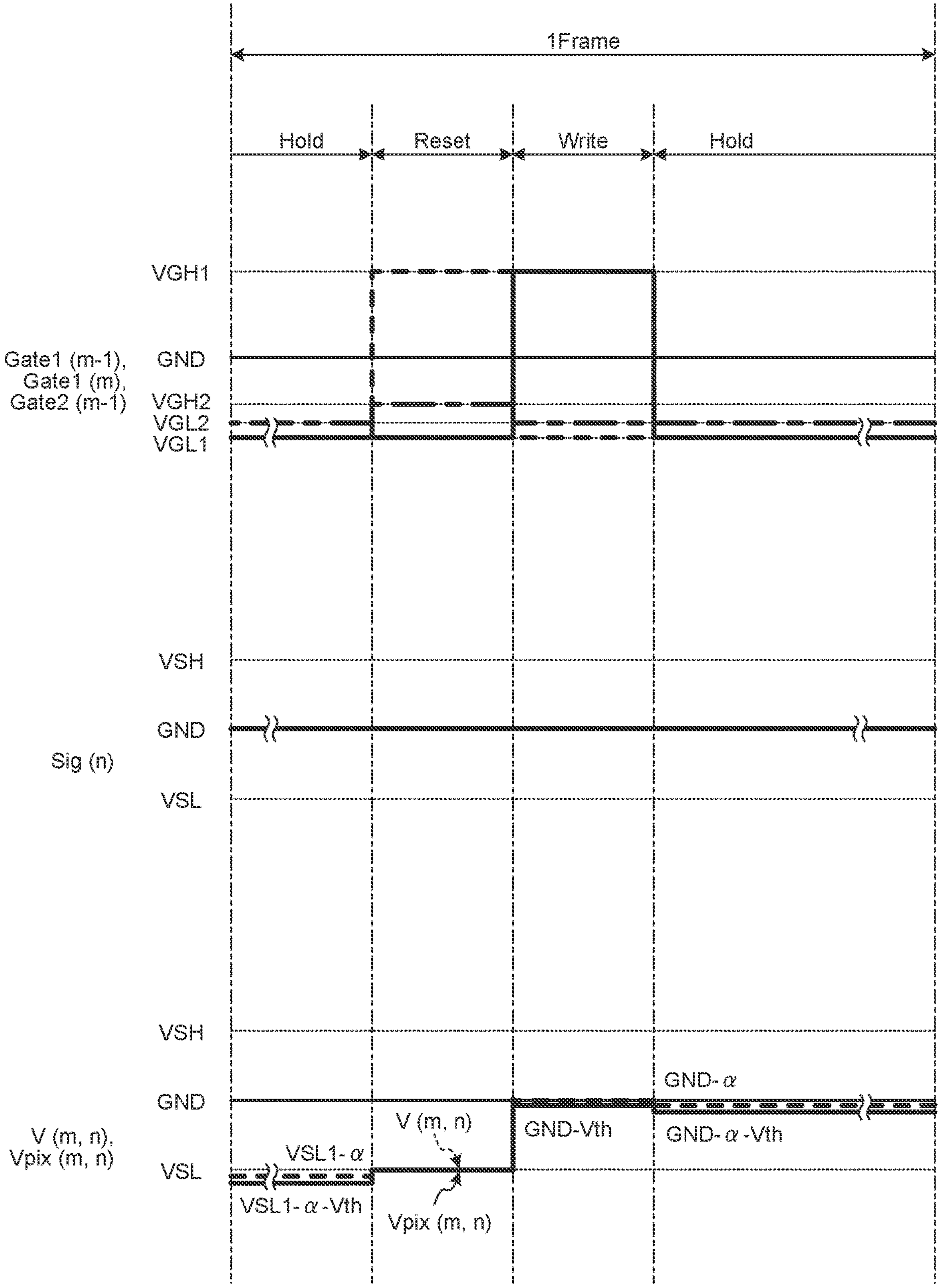
FIG. 17D is a timing diagram for explaining still another operation in the third embodiment.

FIG. 17C illustrates a timing diagram when the potential of the source drive signal (pixel signal) SIG(n) has changed from the positive-polarity source potential VSH (at +15 V, for example) in the previous frame to the GND potential. FIG. 17D illustrates a timing diagram when the potential of the source drive signal (pixel signal) SIG(n) has changed from the negative-polarity source potential VSL (at −15 V, for example) in the previous frame to the GND potential.

Figure 17E:
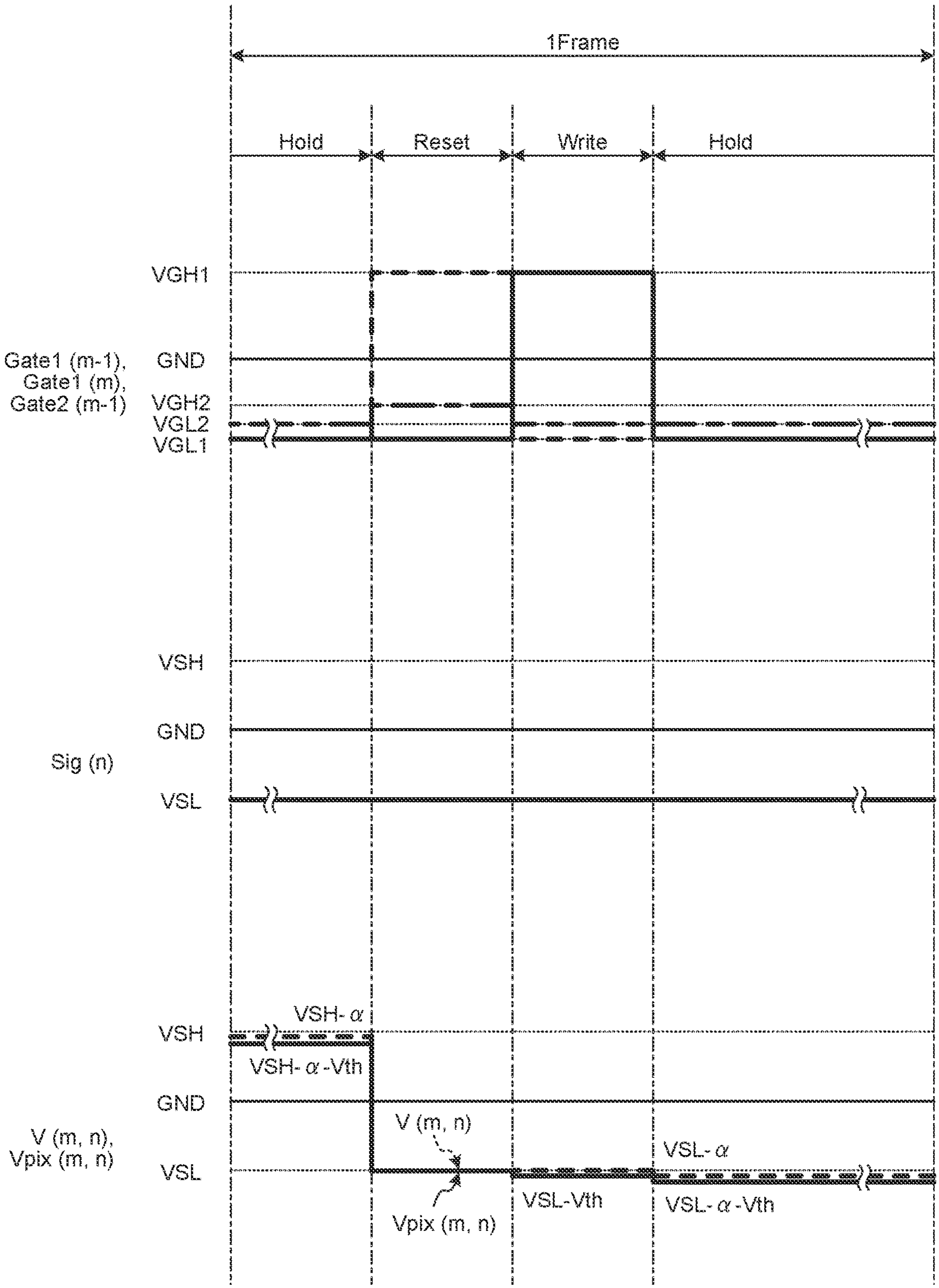
FIG. 17E is a timing diagram for explaining still another operation in the third embodiment.
Figure 17F:
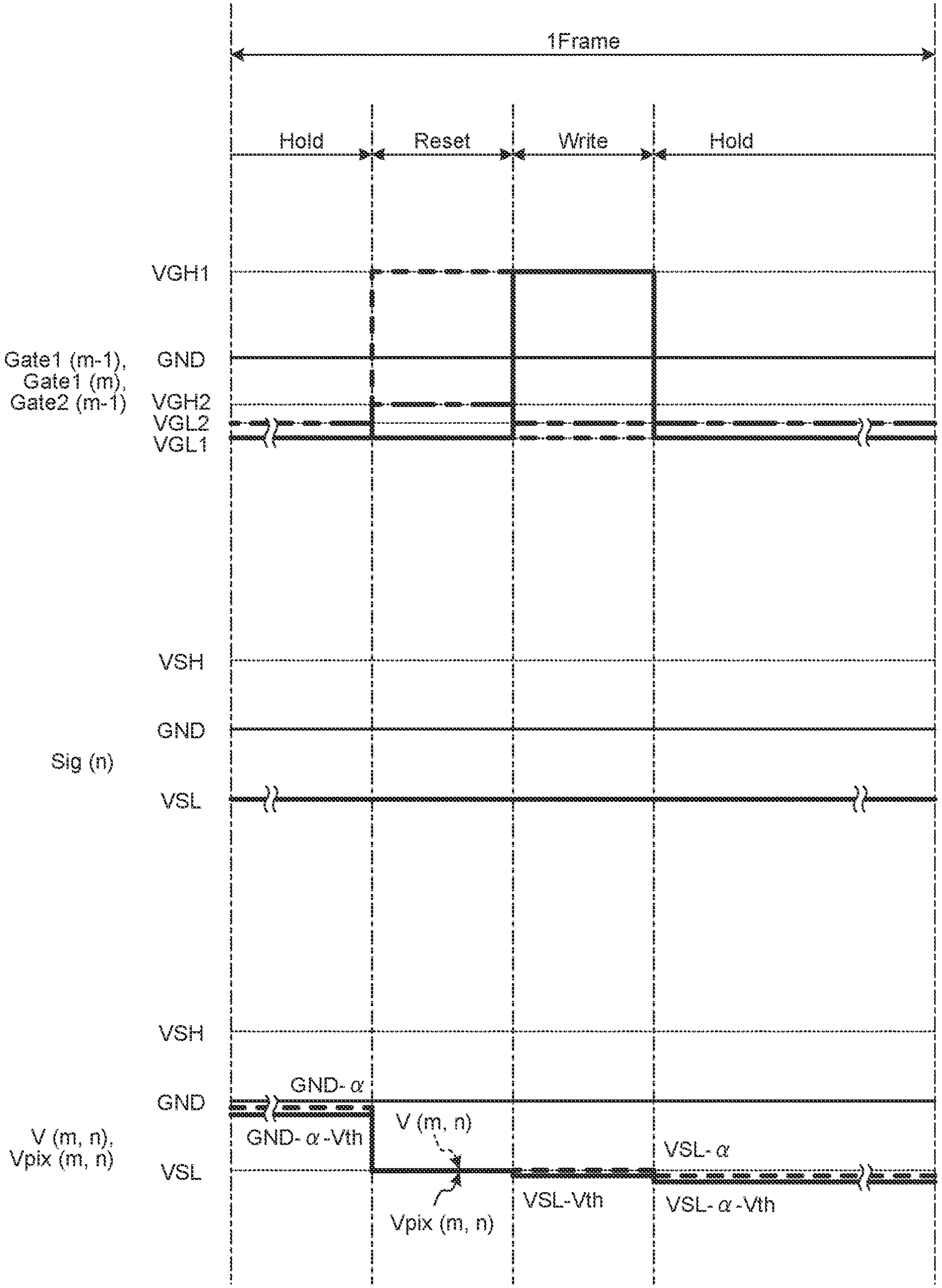
FIG. 17F is a timing diagram for explaining still another operation in the third embodiment.

FIG. 17E illustrates a timing diagram when the potential of the source drive signal (pixel signal) SIG(n) has changed from the positive-polarity source potential VSH (at +15 V, for example) in the previous frame to the negative-polarity source potential VSL (at −15 V, for example). FIG. 17F illustrates a timing diagram when the potential of the source drive signal (pixel signal) SIG(n) has changed from the GND potential in the previous frame to the negative-polarity source potential VSL (at −15 V, for example).

FIG. 18A illustrates an operation example of the potential maintenance circuit 30*b* during the reset period. FIG. 18B illustrates an operation example of the potential maintenance circuit 30*b* during the write period. FIG. 18C illustrates an operation example of the potential maintenance circuit 30*b* during the hold period.

As illustrated in FIGS. 17A, 17B, 17C, 17D, 17E, and 17F, during the write period of each of the pixels PX in the mth row, the gate driver 22*c* supplies the first positive-polarity gate potential VGH1 to the first gate bus line (first scan line) SCL1(*m*), and supplies the second positive-polarity gate potential VGH2 to the second gate bus line (second scan line) SCL2(*m*). During the hold period except the write period, the gate driver 22*c* supplies the negative-polarity gate potential VGL1 to the first gate bus line (first scan line) SCL1(*m*), and supplies the negative-polarity gate potential VGL2 to the second gate bus line (second scan line) SCL2(*m*).

During the reset period of each of the pixels PX in the mth row, the gate driver 22*c* supplies the first positive-polarity gate potential VGH1 to the first gate bus line (first scan line) SCL1(*m*-1), and supplies the second positive-polarity gate potential VGH2 to the second gate bus line (second scan line) SCL2(*m*-1). During the periods except the reset period of each of the pixels PX in the mth row, the gate driver 22*c* supplies the first negative-polarity gate potential VGL1 to the first gate bus line (first scan line) SCL1(*m*-1), and supplies the second negative-polarity gate potential VGL2 to the second gate bus line (second scan line) SCL2(*m*-1).

In the same manner as in the second embodiment, an aspect of the present disclosure may be such that a first reset line(m) and a second reset line(m) are provided in addition to the first gate bus line (first scan line) SCL1(*m*) and the second gate bus line (second scan line) SCL2(*m*), and such that the first reset line(m) is supplied with the gate driver 22*c* supplies the first positive-polarity gate potential VGH1 and the second reset line(m) is supplied with the second positive-polarity gate potential VGH2 during the reset period corresponding to the write period of each of the pixel PX in the (m-1)th row, and the first reset line(m) is supplied with the first negative-polarity gate potential VGL1 and the second reset line(m) is supplied with the second negative-polarity gate potential VGL2 during the periods except the reset period.

First, the following describes the case where the source drive signal (pixel signal) SIG(n) is set to the positive-polarity source potential VSH (at +15 V, for example), with reference to FIGS. 17A and 17B.

During the hold period before the reset period, the first negative-polarity gate potential VGL1 (at −17 V, for example) is supplied to the first gate bus line (first scan line) SCL1(*m*-1) and the first gate bus line (first scan line) SCL1(*m*), and the first negative-polarity gate potential VGL2 (at −14 V, for example) is supplied to the second gate bus line (second scan line) SCL2(*m*-1). At this time, the first pixel transistor TR1 and the fourth pixel transistor TR4 illustrated with dashed lines in FIG. 18C are controlled to be turned off. At this time, the third pixel transistor TR3 illustrated with a long dashed short dashed line serves as a constant-current source driven by the gate-source potential Vgs (=VGL2−VSL) (for example, −14 V−(−15 V)=1 V).

During the subsequent reset period, when the first positive-polarity gate potential VGH1 (at +19 V, for example) is supplied to the first gate bus line (first scan line) SCL1(*m*-1) and the second positive-polarity gate potential VGH2 (at −10 V, for example) is supplied to the second gate bus line (second scan line) SCL2(*m*-1), the third and the fourth pixel transistors TR3 and TR4 are controlled to be turned on. This operation resets the potential V(m, n) of the first holding capacitor C1 to the negative-polarity source potential VSL as illustrated in FIG. 18A, and as a result, the second pixel transistor TR2 is controlled to be turned off to reset the potential Vpix(m, n) of the second holding capacitor C2 to the negative-polarity source potential VSL.

In the write period, when the first negative-polarity gate potential VGL1 (at −17 V, for example) is supplied to the first gate bus line (first scan line) SCL1(*m*-1), the second negative-polarity gate potential VGL2 (at −14 V, for example) to the second gate bus line (second scan line) SCL2(*m*-1), and the first positive-polarity gate potential VGH1 (at +19 V, for example) to the first gate bus line (first scan line) SCL1(*m*), the first pixel transistor TR1 is controlled to be turned on, and the fourth pixel transistor TR4 is controlled to be turned off.

As a result, as illustrated in FIG. 18B, the source drive signal (pixel signal) SIG(n) (at the positive-polarity source potential VSH (at +15 V, for example) in the examples illustrated in FIGS. 17A and 17B) is applied as the potential V(m, n) of the first holding capacitor C1. This operation charges the first holding capacitor C1 with a difference between the potential of the source drive signal (pixel signal) SIG(n) and the negative-polarity source potential VSL (in this case, VSH−VSL=+15 V−(−15 V)=30 V), and as a result, the second pixel transistor TR2 is controlled to be turned on.

At this time, the third pixel transistor TR3 illustrated with a long dashed short dashed line serves as a constant-current source driven by the gate-source potential Vgs (=VGL2−VSL) (for example, −14 V−(−15 V)=1 V), and a potential obtained by subtracting Vth of the second transistor TR2 from the potential V(m, n) of the first holding capacitor C1 (in this case, source drive signal (pixel signal) SIG(n) =positive-polarity source potential VSH (at +15 V, for example)) is applied as the potential Vpix(m, n) of the second holding capacitor C2, as illustrated in FIG. 18B. As a result, the second holding capacitor C2 is charged with the potential (VSH−Vth) obtained by subtracting Vth of the second transistor TR2 from the source drive signal (pixel signal) SIG(n)=the positive-polarity source potential VSH (at +15 V, for example).

During the hold period following the write period, when the first negative-polarity gate potential VGL1 (at −17 V, for example) is supplied to the first gate bus line (first scan line) SCL1(*m*), the first pixel transistor TR1 is controlled to be turned off. As a result, as illustrated in FIG. 18C, the on-control state of the second transistor TR2 is maintained by a potential (SIG(n)−α−Vth) obtained by subtracting the potential drop α caused by the feedthrough that occurs when the first pixel transistor TR1 is turned off and Vth of the second transistor TR2 from the potential of the source drive signal (pixel signal) SIG(n) (at the positive-polarity source potential VSH (at +15 V, for example) in the examples illustrated in FIGS. 17A and 17B) that has charged the first holding capacitor C1 as the potential V(m, n).

As a result, the potential of the second holding capacitor C2, that is, the potential Vpix(m, n) of the pixel electrode Pix is statically held in the state of being supplied with the potential (VSH−α−Vth) obtained by subtracting the potential drop α caused by the feedthrough that occurs when the first pixel transistor TR1 is turned off and Vth of the second transistor TR2 from the potential of the source drive signal (pixel signal) SIG(n) (in this case, the positive-polarity source potential VSH (at +15 V, for example)).

The following describes the case where the source drive signal (pixel signal) SIG(n) is set to the GND potential, with reference to FIGS. 17C and 17D. The following describes differences from the case where the source drive signal (pixel signal) SIG(n) is set to the positive-polarity source potential VSH (at +15 V, for example) (refer to FIGS. 17A and 17B).

When the source drive signal (pixel signal) SIG(n) is set to the GND potential, the GND potential is applied as the potential V(m, n) of the first holding capacitor C1 during the write period. This operation charges the first holding capacitor C1 with the difference between the GND potential and the negative-polarity source potential VSL (GND−VSL=0−(−15 V)=15 V), and as a result, the second pixel transistor TR2 is controlled to be turned on.

At this time, the potential obtained by subtracting Vth of the second transistor TR2 from the GND potential is applied as the potential Vpix(m, n) of the second holding capacitor C2. This operation charges the second holding capacitor C2 with the potential (GND−Vth) obtained by subtracting Vth of the second transistor TR2 from the GND potential.

When the first pixel transistor TR1 is controlled to be turned off during the hold period following the write period, the potential Vpix(m, n) of the pixel electrode Pix is statically held in the state of being supplied with the potential (GND−α−Vth) obtained by subtracting the potential drop α caused by the feedthrough that occurs when the first pixel transistor TR1 is turned off and Vth of the second transistor TR2 from the GND potential that has charged the first holding capacitor C1 as the potential V(m, n).

The following describes the case where the source drive signal (pixel signal) SIG(n) is set to the negative-polarity source potential VSL (at −15 V, for example), with reference to FIGS. 17E and 17F. The following describes differences from the case where the source drive signal (pixel signal) SIG(n) is set to the positive-polarity source potential VSH (at +15 V, for example) (refer to FIGS. 17A and 17B) and the case where the source drive signal (pixel signal) SIG(n) is set to the GND potential (refer to FIGS. 17C and 17D).

When the source drive signal (pixel signal) SIG(n) is set to the negative-polarity source potential VSL (at −15 V, for example), the negative-polarity source potential VSL (at −15 V, for example) is applied as the potential V(m, n) of the first holding capacitor C1 during the write period. This operation controls to turn on the second pixel transistor TR2.

At this time, the potential obtained by subtracting Vth of the second transistor TR2 from the negative-polarity source potential VSL (at −15 V, for example) is applied as the potential Vpix(m, n) of the second holding capacitor C2. This operation charges the second holding capacitor C2 with the potential (VSL−Vth) obtained by subtracting Vth of the second transistor TR2 from the negative-polarity source potential VSL (at −15 V, for example).

When the first pixel transistor TR1 is controlled to be turned off during the hold period following the write period, the potential Vpix(m, n) of the pixel electrode Pix is statically held in the state of being supplied with a potential (VSL−α−Vth) obtained by subtracting the potential drop α caused by the feedthrough that occurs when the first pixel transistor TR1 is turned off and Vth of the second transistor TR2 from the negative-polarity source potential VSL (at −15 V, for example) that has charged the first holding capacitor C1 as the potential V(m, n).

In the present embodiment, in the same manner as in the second embodiment, the first holding capacitor C1 only needs to have capacitance required to maintain the on-state of the second transistor TR2 during the hold period. Specifically, the first holding capacitor C1 has capacitance of approximately 0.1 pF, for example. This capacitance can reduce the potential drop α caused by the feedthrough that occurs when the first pixel transistor TR1 is turned off.

The potential of the second holding capacitor C2, that is, the potential Vpix(m, n) of the pixel electrode Pix is statically held in the state of being supplied with the positive-polarity source potential VSH (at +15 V, for example), the GND potential, or the negative-polarity source potential VSL (at −15 V, for example) during the hold period. This operation can restrain the reduction in display quality caused by the potential variation.

In the second embodiment, the second and the third pixel transistors TR2 and TR3 are coupled in series between the positive-polarity source potential VSH and the reset potential VRST. However, in the third embodiment, the second and the third pixel transistors TR2 and TR3 are coupled in series between the positive-polarity source potential VSH and the negative-polarity source potential VSL. This configuration can reduce the number of power supply potentials supplied to the pixel PX.

In the second embodiment, the gates of the third pixel transistor TR3 and the fourth pixel transistor TR4 are coupled to the first gate bus line (first scan line) SCL1(*m*-1) coupled to each of the pixels PX in the (m-1)th row. However, in the third embodiment, the gate of the third pixel transistor TR3 is coupled to the second gate bus line (second scan line) SCL2(*m*-1) that is supplied with different potentials during the periods except the reset period. This configuration facilitates adjustment of the gate-source potential Vgs when operating the third pixel transistor TR3 as the constant-current source during the periods except the reset period. Specifically, the gate-source potential Vgs when operating the third pixel transistor TR3 as the constant-current source can be adjusted by adjusting the second negative-polarity gate potential VGL2 (at, for example, −14 V in the present embodiment) supplied to the second gate bus line (second scan line) SCL2(*m*-1) during the periods except the reset period.

Fourth Embodiment

Figure 19:
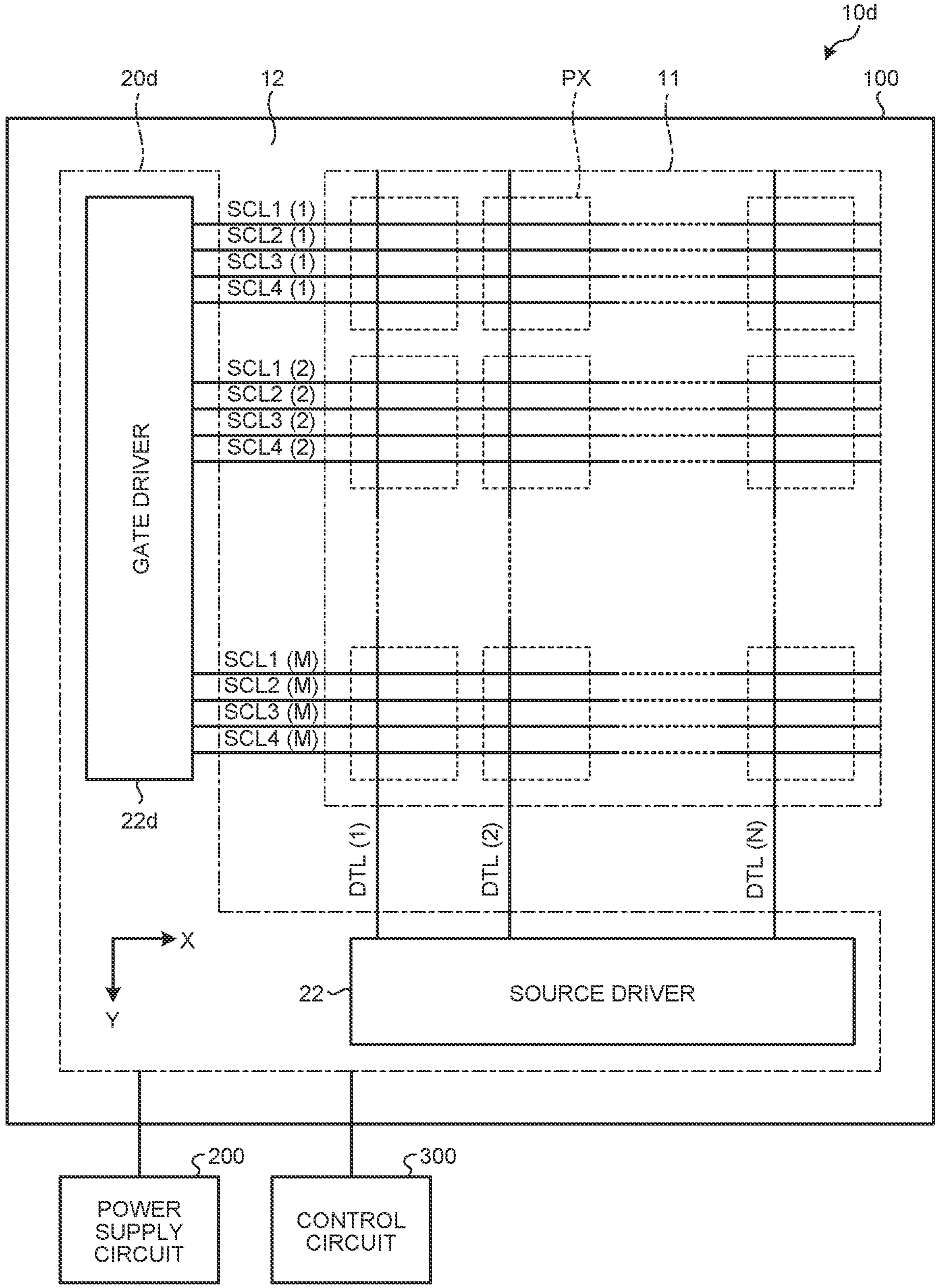
FIG. 19 is a block diagram illustrating a configuration example of a display device according to a fourth embodiment of the present disclosure.
Figure 20:
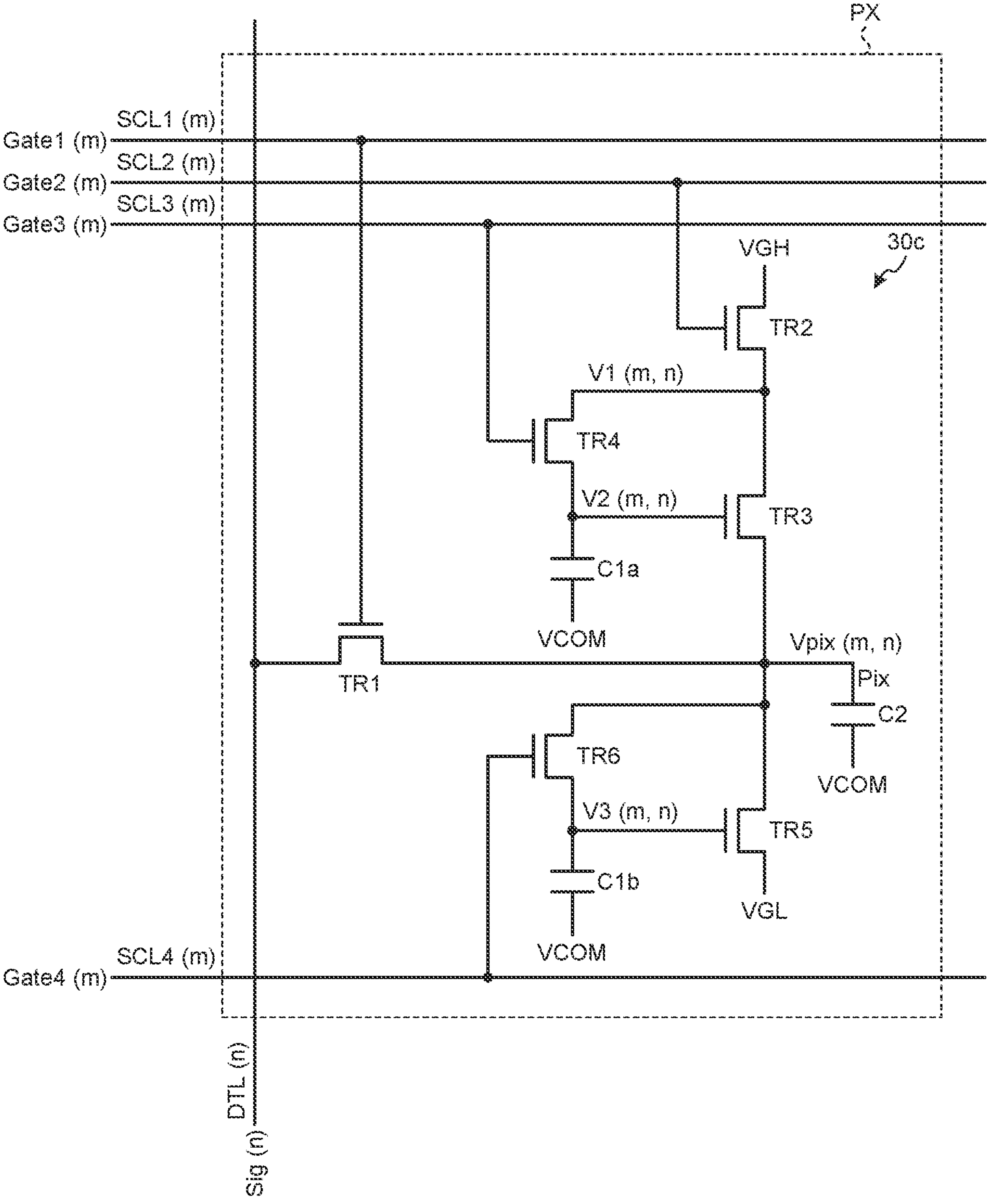
FIG. 20 is a diagram illustrating an exemplary configuration of one pixel of the display device according to the fourth embodiment.

FIG. 19 is a block diagram illustrating a configuration example of a display device according to a fourth embodiment of the present disclosure. FIG. 20 is a diagram illustrating an exemplary configuration of one pixel of the display device according to the fourth embodiment. FIGS. 21A, 21B, 21C, 21D, 21E, and 21F are timing diagrams for explaining operations in the fourth embodiment. FIGS. 22A, 22B, 22C, and 22D are conceptual diagrams illustrating specific examples of operations of a potential maintenance circuit according to the fourth embodiment. In the following description, the same components as those described in any of the embodiments above will be denoted by the same reference numerals without being described again, and only differences from the embodiments described above will be described.

In a display device 10*d* according to the fourth embodiment, a gate driver 22*d* of a display panel driver 20*d* is electrically coupled to the pixels PX arranged in the X-direction in the display region 11 through the first gate bus line (first scan line) SCL1(*m*), and transmits the first gate drive signal (first scan signal) Gate1(*m*) to the first gate bus line (first scan line) SCL1(*m*).

The gate driver 22*d* is also electrically coupled to the pixels PX arranged in the X-direction in the display region 11 through the second gate bus line (second scan line) SCL2(*m*), and transmits the second gate drive signal (second scan signal) Gate2(*m*) to the second gate bus line (second scan line) SCL2(*m*).

The gate driver 22*d* is also electrically coupled to the pixels PX arranged in the X-direction in the display region 11 through a third gate bus line (third scan line) SCL3(*m*), and transmits a third gate drive signal (third scan signal) Gate3(*m*) to the third gate bus line (third scan line) SCL3 (*m*).

The gate driver 22*d* is also electrically coupled to the pixels PX arranged in the X-direction in the display region 11 through a fourth gate bus line (fourth scan line) SCL4(*m*), and transmits a fourth gate drive signal (fourth scan signal) Gate1(*m*) to the fourth gate bus line (fourth scan line) SCL4(*m*).

As illustrated in FIG. 20, a potential maintenance circuit 30*c* according to the fourth embodiment includes the first pixel transistor TR1, the second pixel transistor TR2, the third pixel transistor TR3, the fourth pixel transistor TR4, a fifth pixel transistor TR5, and a sixth pixel transistor TR6.

In the present embodiment, the first pixel transistor TR1 is an NMOS transistor corresponding to the pixel transistor TR of the comparative example described above. In the present embodiment, the second holding capacitor C2 (pixel electrode Pix) is supplied with the source drive signal (pixel signal) SIG(n) from the source bus line (signal line) DTL(n) through the first pixel transistor TR1 in the same manner as in the comparative example described above.

In the present embodiment, the second pixel transistor TR2, the third pixel transistor TR3, the fourth pixel transistor TR4, the fifth pixel transistor TR5, and the sixth pixel transistor TR6 are NMOS transistors.

The second and the third pixel transistors TR2 and TR3 are coupled in series between the positive-polarity gate potential VGH and the second holding capacitor C2 (pixel electrode Pix). The gate of the second pixel transistor TR2 is coupled to the second gate bus line (second scan line) SCL2(*m*). The gate of the third pixel transistor TR3 is supplied with a potential V2(m, n) of the high-potential-side first holding capacitor C1*a*.

The fourth pixel transistor TR4 is coupled between a coupling point of the second pixel transistor TR2 to the third pixel transistor TR3 and the gate of the third pixel transistor TR3. The gate of the fourth pixel transistor TR4 is coupled to the third gate bus line (third scan line) SCL3(*m*).

The fifth pixel transistor TR5 is coupled between the second holding capacitor C2 (pixel electrode Pix) and the negative-polarity gate potential VGL. The gate of the fifth pixel transistor TR5 is supplied with a potential V3(m, n) of the low-potential-side first holding capacitor C1*b*.

The sixth pixel transistor TR6 is coupled between the second holding capacitor C2 (pixel electrode Pix) and the gate of the fifth pixel transistor TR5. The gate of the sixth pixel transistor TR6 is coupled to the fourth gate bus line (fourth scan line) SCL4(*m*).

Figure 21A:
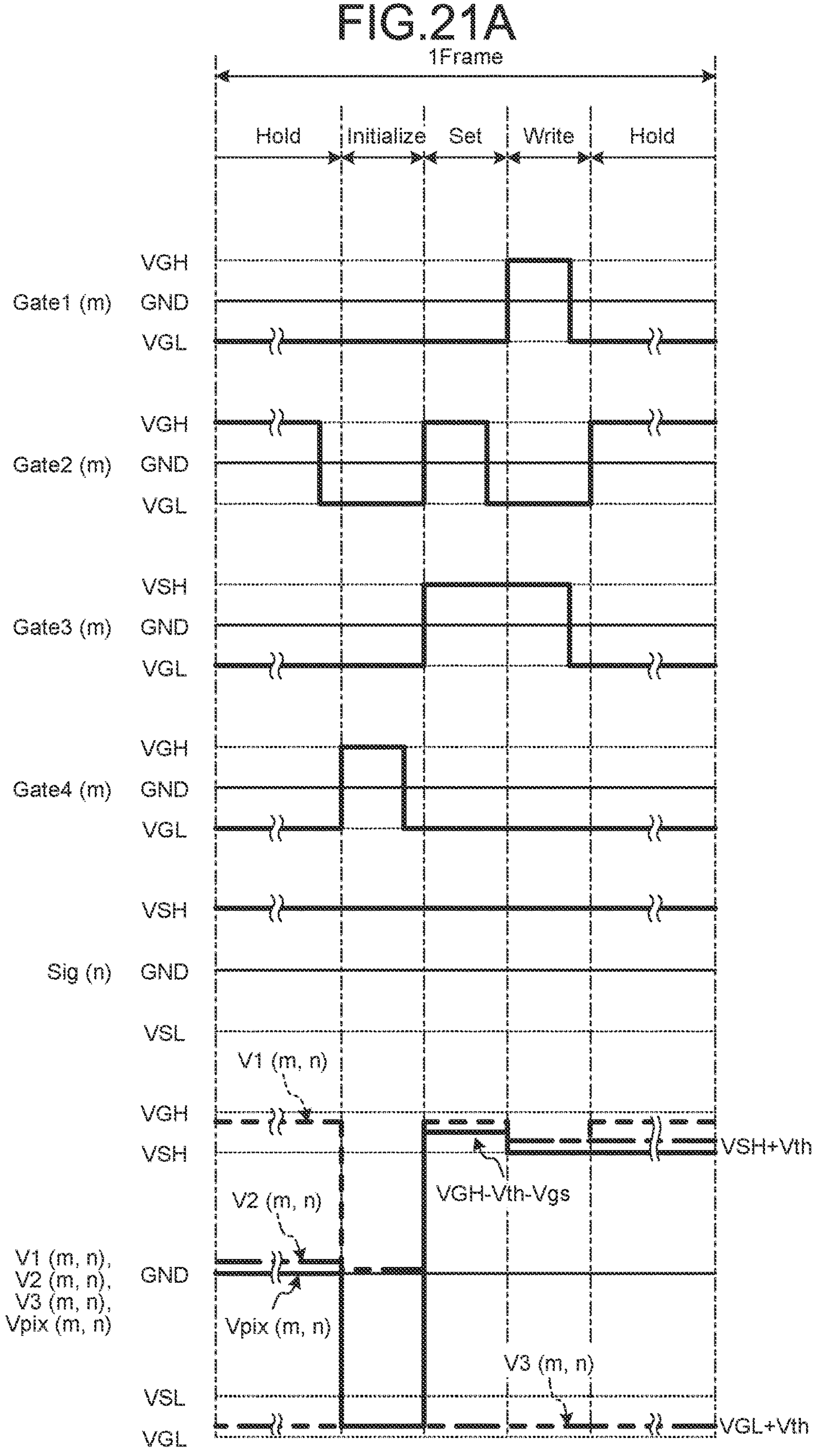
FIG. 21A is a timing diagram for explaining an operation in the fourth embodiment.
Figure 21B:
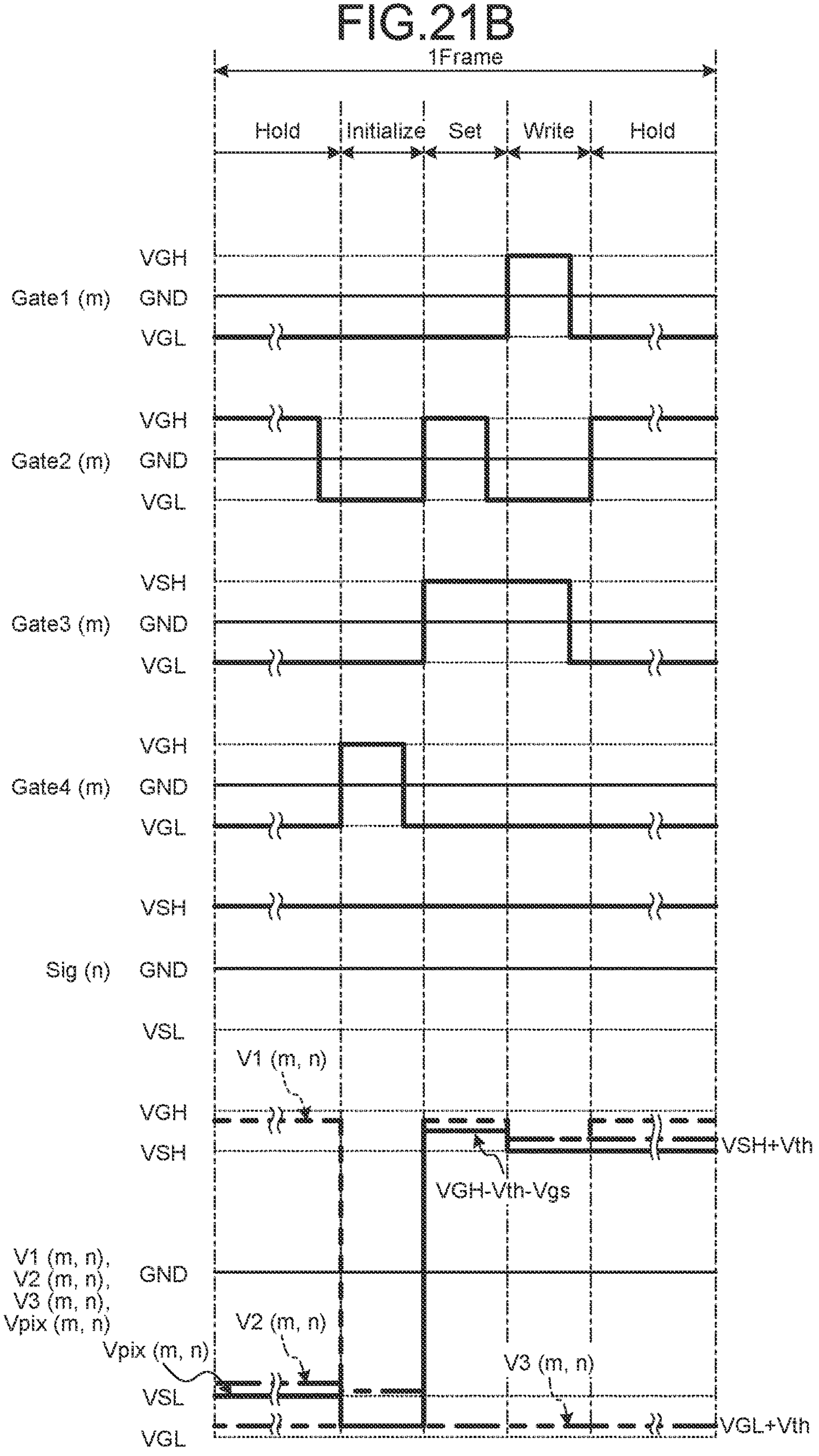
FIG. 21B is a timing diagram for explaining another operation in the fourth embodiment.

FIG. 21A illustrates a timing diagram when the potential of the source drive signal (pixel signal) SIG(n) has changed from the GND potential in the previous frame to the positive-polarity source potential VSH (at +15 V, for example). FIG. 21B illustrates a timing diagram when the potential of the source drive signal (pixel signal) SIG(n) has changed from the negative-polarity source potential VSL (at −15 V, for example) in the previous frame to the positive-polarity source potential VSH (at +15 V, for example).

Figure 21C:
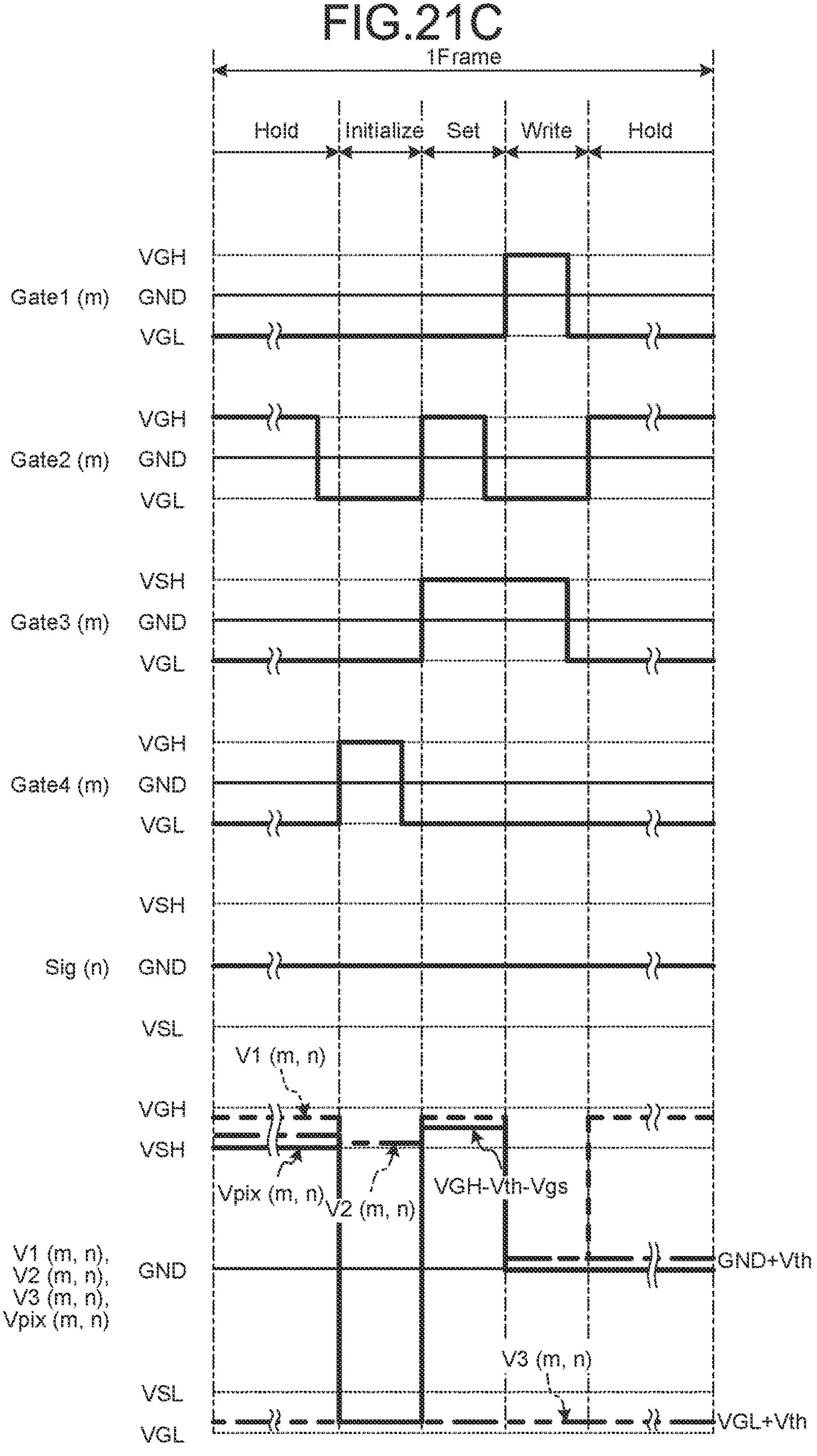
FIG. 21C is a timing diagram for explaining another operation in the fourth embodiment.
Figure 21D:
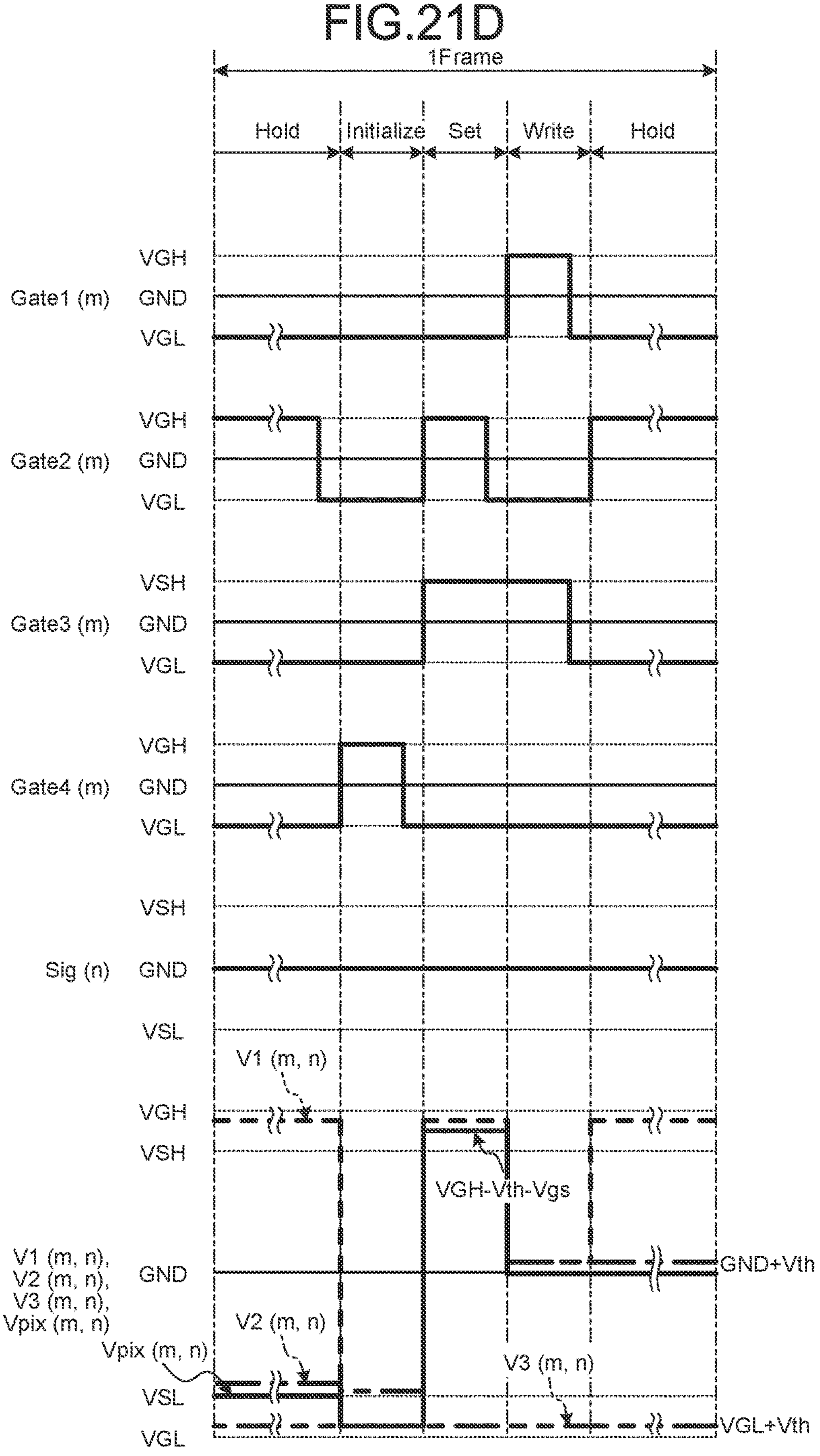
FIG. 21D is a timing diagram for explaining still another operation in the fourth embodiment.

FIG. 21C illustrates a timing diagram when the potential of the source drive signal (pixel signal) SIG(n) has changed from the positive-polarity source potential VSH (at +15 V, for example) in the previous frame to the GND potential. FIG. 21D illustrates a timing diagram when the potential of the source drive signal (pixel signal) SIG(n) has changed from the negative-polarity source potential VSL (at −15 V, for example) in the previous frame to the GND potential.

Figure 21E:
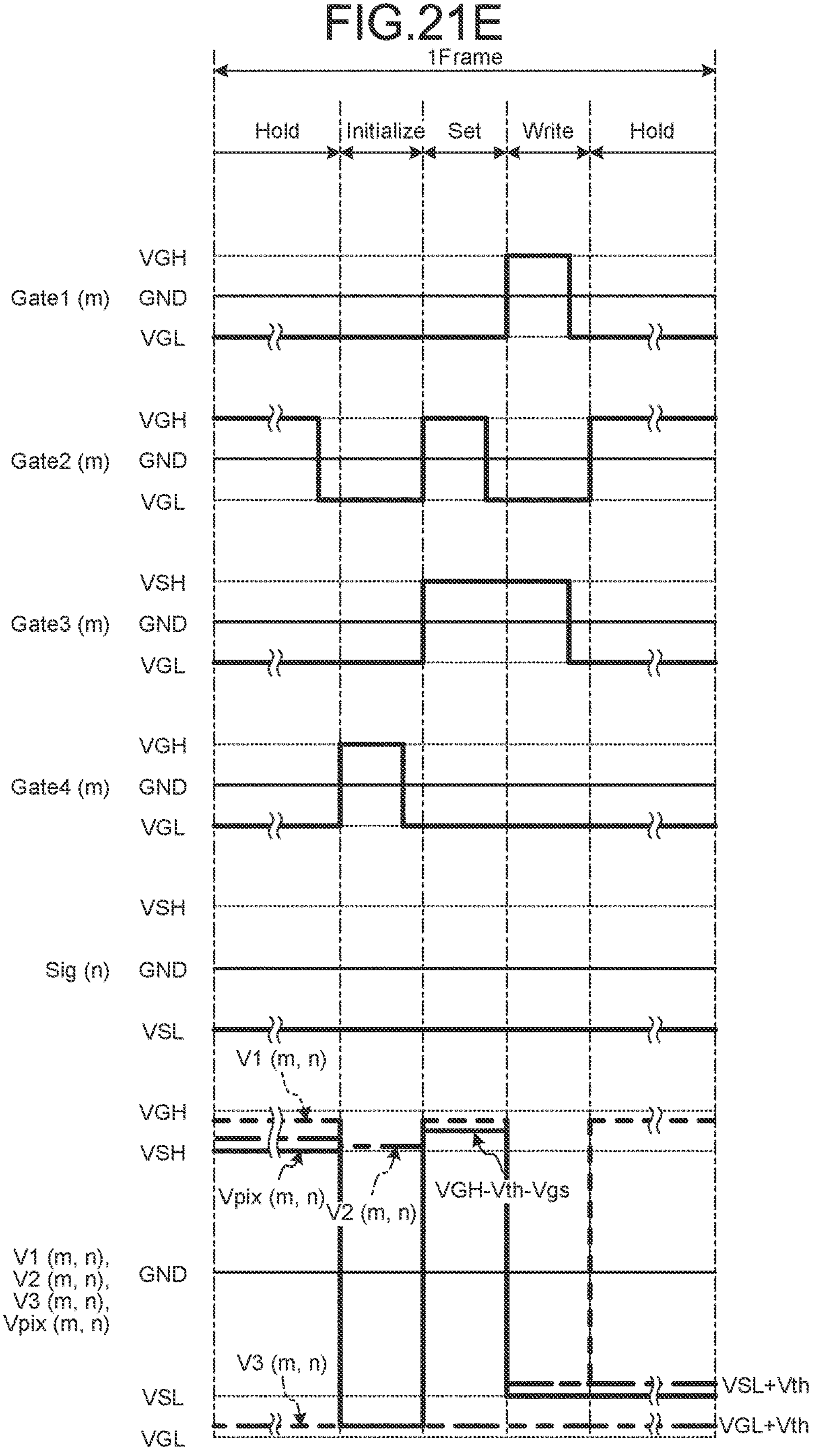
FIG. 21E is a timing diagram for explaining still another operation in the fourth embodiment.
Figure 21F:
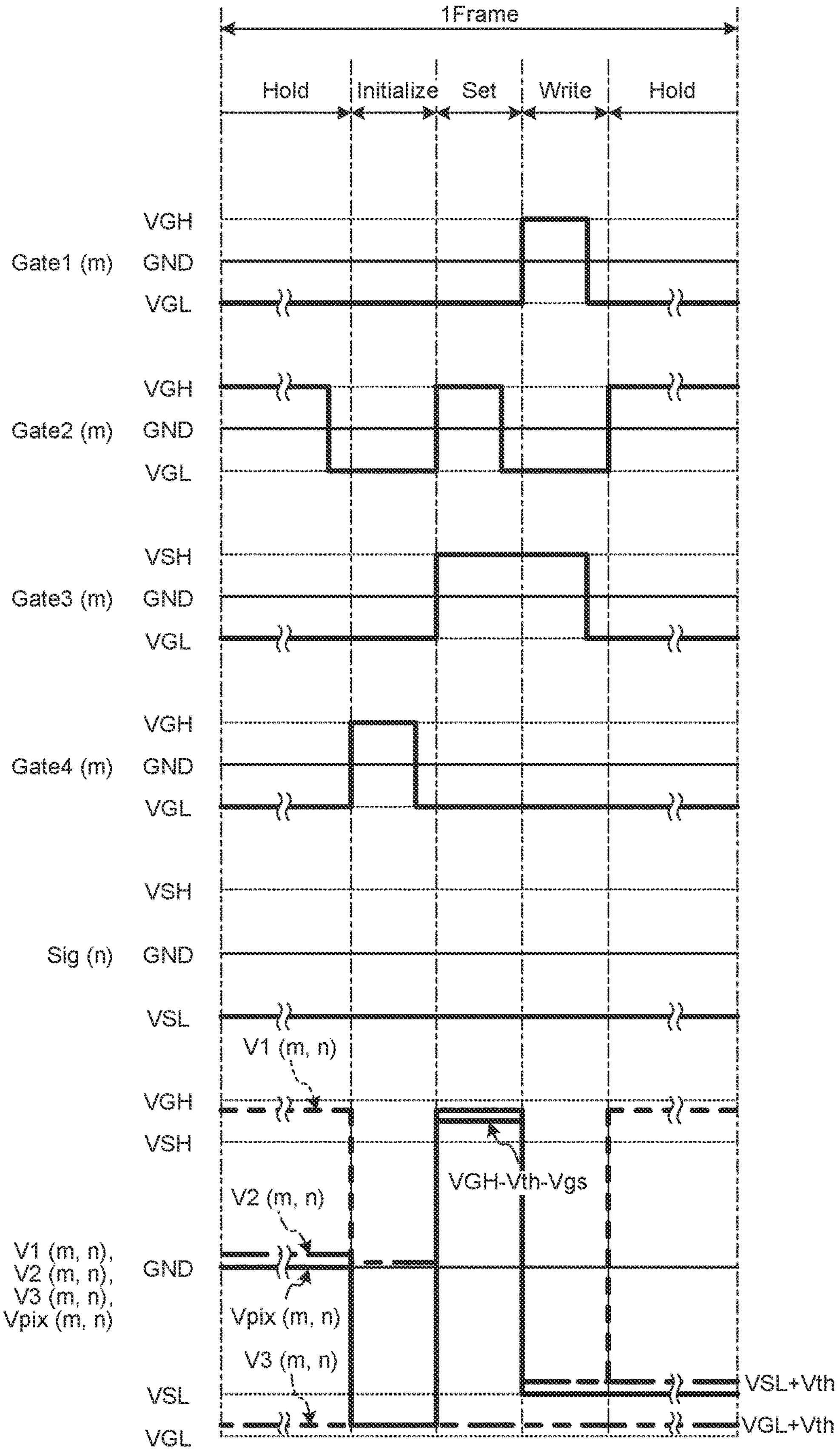
FIG. 21F is a timing diagram for explaining still another operation in the fourth embodiment.

FIG. 21E illustrates a timing diagram when the potential of the source drive signal (pixel signal) SIG(n) has changed from the positive-polarity source potential VSH (at +15 V, for example) in the previous frame to the negative-polarity source potential VSL (at −15 V, for example). FIG. 21F illustrates a timing diagram when the potential of the source drive signal (pixel signal) SIG(n) has changed from the GND potential in the previous frame to the negative-polarity source potential VSL (at −15 V, for example).

As illustrated in FIGS. 21A, 21B, 21C, 21D, 21E, and 21F, the configuration of the fourth embodiment is provided with an initialization period (Initialize) and an initial potential setting period (Set) before the write period (Write) of each of the pixels PX in the mth row.

Figure 22A:
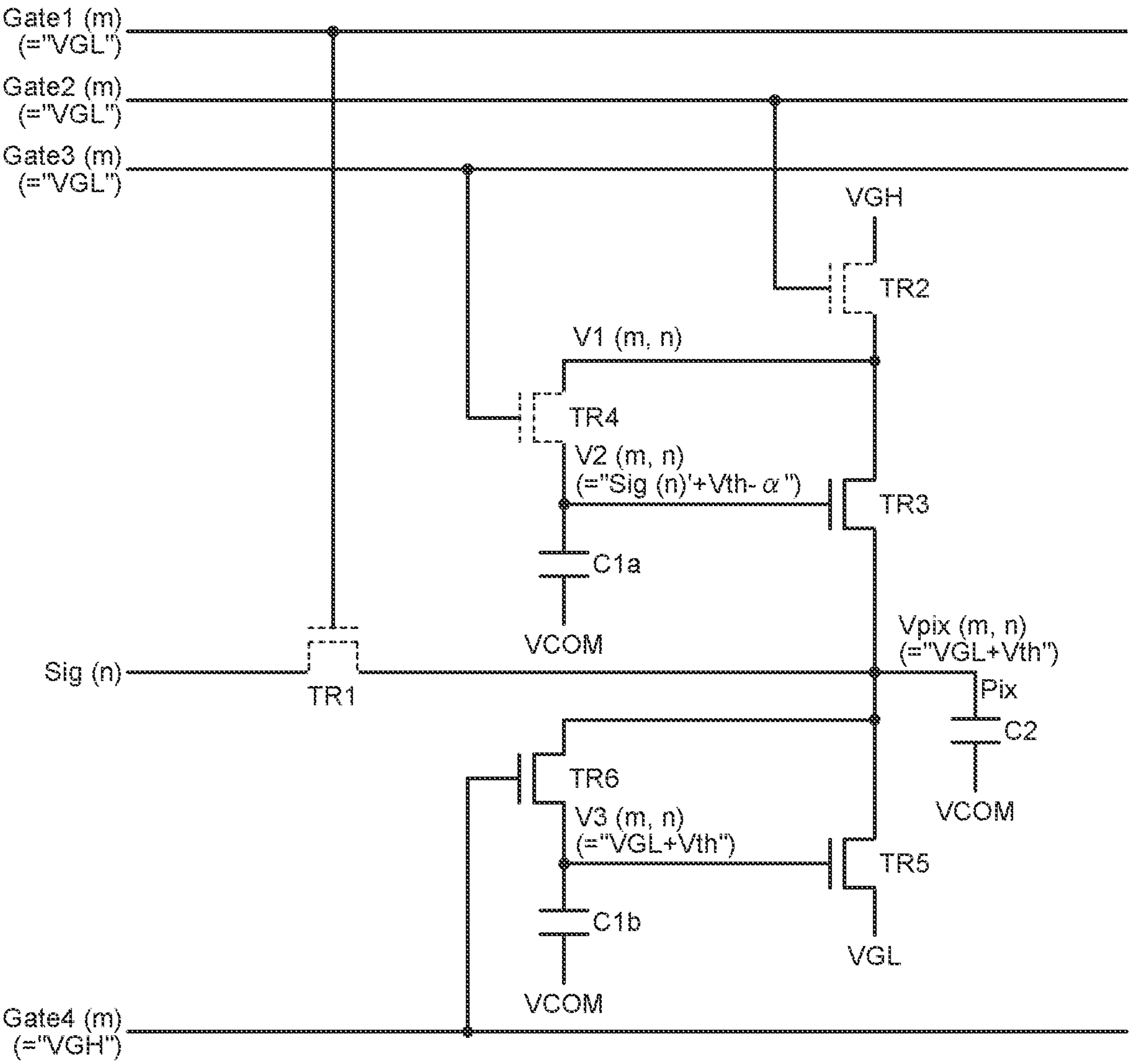
FIG. 22A is a conceptual diagram illustrating a specific example of an operation of a potential maintenance circuit according to the fourth embodiment.
Figure 22B:
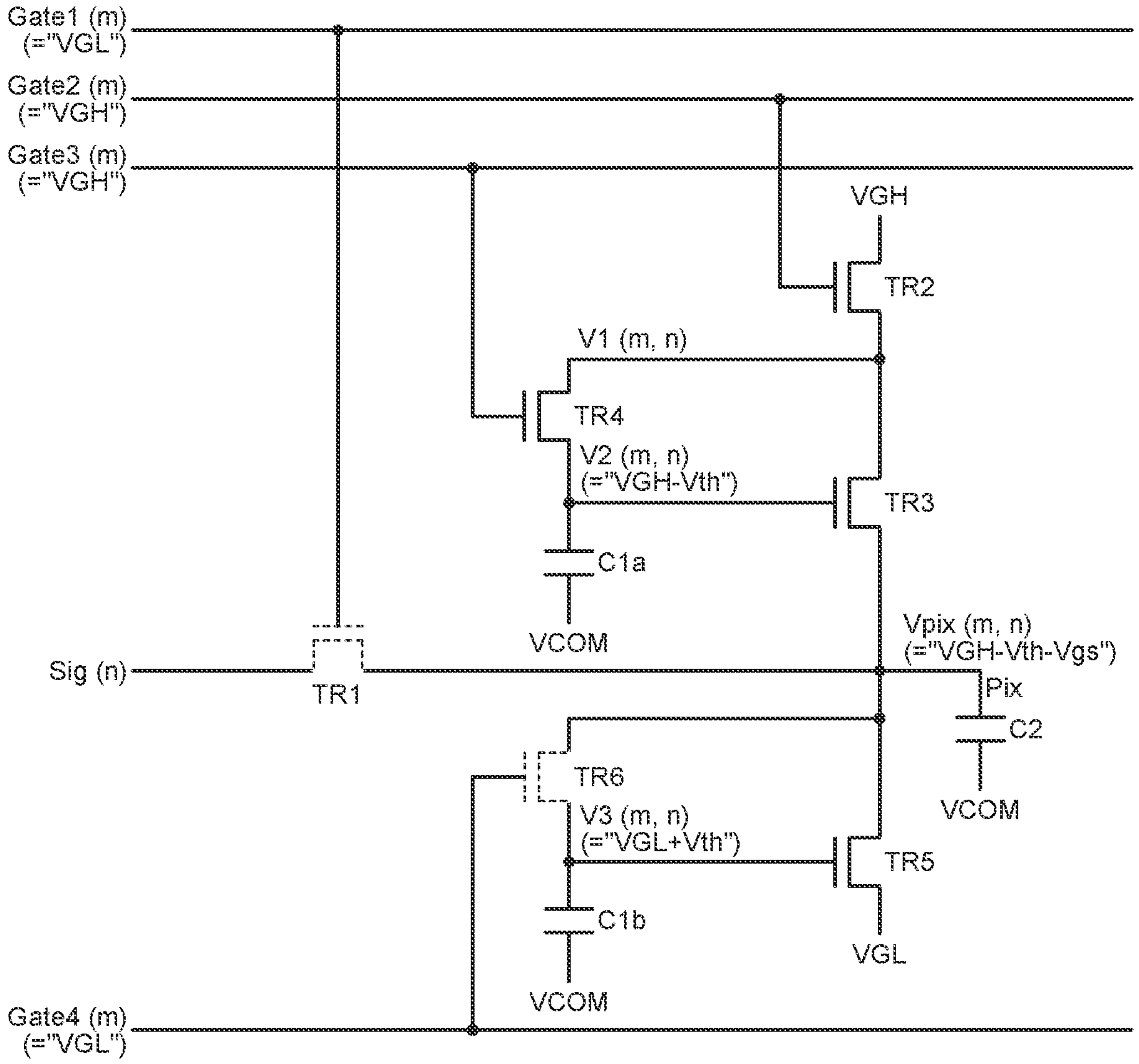
FIG. 22B is a conceptual diagram illustrating another specific example of the operation of the potential maintenance circuit according to the fourth embodiment.
Figure 22C:
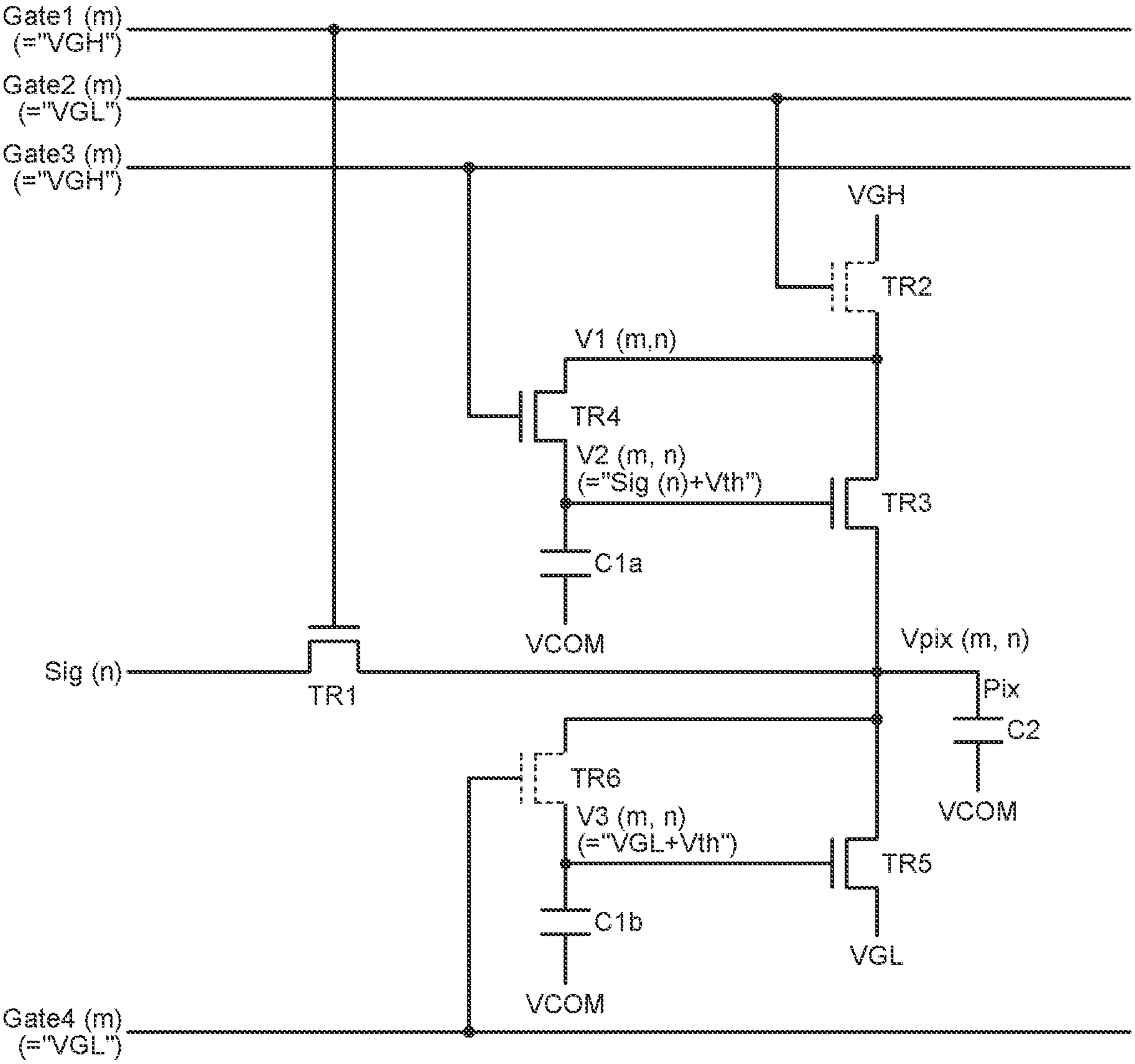
FIG. 22C is a conceptual diagram illustrating still another specific example of the operation of the potential maintenance circuit according to the fourth embodiment.
Figure 22D:
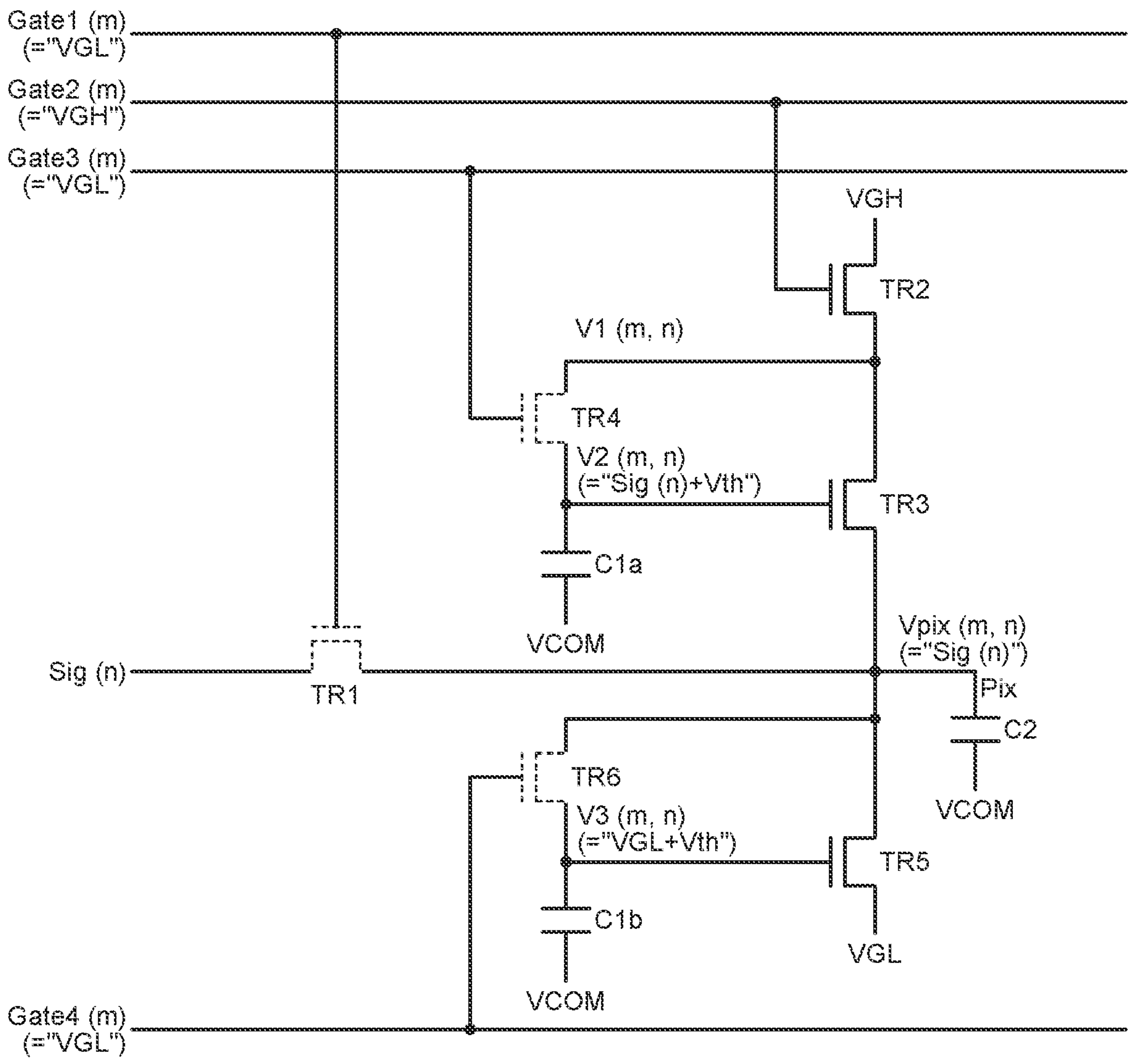
FIG. 22D is a conceptual diagram illustrating still another specific example of the operation of the potential maintenance circuit according to the fourth embodiment.

FIG. 22A illustrates an operation example of the potential maintenance circuit 30*c* during the initialization period. FIG. 22B illustrates an operation example of the potential maintenance circuit 30*c* during the initial potential setting period. FIG. 22C illustrates an operation example of the potential maintenance circuit 30*c* during the write period. FIG. 22D illustrates an operation example of the potential maintenance circuit 30*c* during the hold period.

During the initialization period of each of the pixels PX in the mth row, the gate driver 22*d* supplies the positive-polarity gate potential VGH to the fourth gate bus line (fourth scan line) SCL4(*m*), and supplies the negative-polarity gate potential VGL to the first gate bus line (first scan line) SCL1(*m*), the second gate bus line (second scan line) SCL2(*m*), and the third gate bus line (third scan line) SCL3(*m*).

During the initial potential setting period of each of the pixels PX in the mth row, the gate driver 22*d* supplies the positive-polarity gate potential VGH to the second gate bus line (second scan line) SCL2(*m*) and the third gate bus line (third scan line) SCL3(*m*), and supplies the negative-polarity gate potential VGL to the first gate bus line (first scan line) SCL1(*m*) and the fourth gate bus line (fourth scan line) SCL4(*m*).

During the write period of each of the pixels PX in the mth row, the gate driver 22*d* supplies the positive-polarity gate potential VGH to the first gate bus line (first scan line) SCL1(*m*) and the third gate bus line (third scan line) SCL3(*m*), and supplies the negative-polarity gate potential VGL to the second gate bus line (second scan line) SCL2(*m*) and the fourth gate bus line (fourth scan line) SCL4(*m*).

During the hold period except the initialization period, the initial potential setting period, and the write period of each of the pixels PX in the mth row, the gate driver 22*d* supplies the positive-polarity gate potential VGH to the second gate bus line (second scan line) SCL2(*m*), and supplies the negative-polarity gate potential VGL to the first gate bus line (first scan line) SCL1(*m*), the third gate bus line (third scan line) SCL3(*m*), and the fourth gate bus line (fourth scan line) SCL4(*m*).

In the present embodiment, the positive-polarity gate potential VGH (high-potential positive-polarity potential) is set to, for example, +20 V higher than the positive-polarity source potential VSH (at +15 V, for example). In the present embodiment, the negative gate potential VGL (low-potential negative-polarity potential) is set to, for example, −20 V lower than the negative-polarity source potential VSL (at −15 V, for example).

First, the following describes the case where the source drive signal (pixel signal) SIG(n) is set to the positive-polarity source potential VSH (at +15 V, for example), with reference to FIGS. 21A and 21B.

During the hold period before the initialization period, the positive-polarity gate potential VGH (at +20 V, for example) is supplied to the second gate bus line (second scan line) SCL2(*m*), and the negative-polarity gate potential VGL (at −20 V, for example) is supplied to the first gate bus line (first scan line) SCL1(*m*), the third gate bus line (third scan line) SCL3(*m*), and the fourth gate bus line (fourth scan line) SCL4(*m*). At this time, the fourth and the sixth pixel transistors TR4 and TR6 illustrated with dashed lines in FIG. 22D are controlled to be turned off.

When the negative-polarity gate potential VGL (at −20 V, for example) is supplied to the second gate bus line (second scan line) SCL2(*m*) before the initialization period, the second pixel transistor TR2 is controlled to be turned off. When the positive-polarity gate potential VGH (at +20 V, for example) is supplied to the fourth gate bus line (fourth scan line) SCL4(*m*) during the subsequent initialization period, the sixth pixel transistor TR6 is controlled to be turned on. As a result, the fifth pixel transistor TR5 is turned on, and the potential V3(m, n) of the low-potential-side first holding capacitor C1*b* becomes equal to the potential Vpix(m, n) of the second holding capacitor C2 (pixel electrode Pix), and at the same time, is initialized to a potential (VGL+Vth) obtained by adding Vth of the fifth pixel transistor TR5 to the negative-polarity gate potential VGL. Accordingly, the potential Vpix(m, n) of the second holding capacitor C2 (pixel electrode Pix) is also initialized to the potential (VGL+Vth) (FIG. 22A).

When the negative-polarity gate potential VGL (at −20 V, for example) is supplied to the fourth gate bus line (fourth scan line) SCL4(*m*) before the initial potential setting period, the sixth pixel transistor TR6 is controlled to be turned off. When the positive-polarity gate potential VGH (at +20 V, for example) is supplied to the second gate bus line (second scan line) SCL2(*m*) and the third gate bus line (third scan line) SCL3(*m*) during the subsequent initial potential setting period, the second and the fourth pixel transistors TR2 and TR4 are controlled to be turned on. As a result, the potential V2(m, n) of the high-potential-side first holding capacitor C1*a* is initially set to a potential (VGH−Vth) that is a potential V1(m, n) of the coupling point of the second pixel transistor TR2 to the third pixel transistor TR3 obtained by subtracting Vth of the second transistor TR2 from the positive-polarity gate potential VGH. Accordingly, the third pixel transistor TR3 is controlled to be turned on, and the potential Vpix(m, n) of the second holding capacitor C2 (pixel electrode Pix) is initially set to a potential (VGH−Vth−Vgs) obtained by subtracting the gate-source potential Vgs of the third pixel transistor TR3 from the potential (VGH−Vth) that is the potential V2(m, n) of the high-potential-side first holding capacitor C1*a* (FIG. 22B).

When the negative-polarity gate potential VGL (at −20 V, for example) is supplied to the second gate bus line (second scan line) SCL2(*m*) before the write period, the second pixel transistor TR2 is controlled to be turned off. When the positive-polarity gate potential VGH (at +20 V, for example) is supplied to the first gate bus line (first scan line) SCL1(*m*) in the subsequent write period, the first pixel transistor TR1 is controlled to be turned on. As a result, the source drive signal (pixel signal) SIG(n) is supplied to the second holding capacitor C2, and the potential Vpix(m, n) of the second holding capacitor C2 (pixel electrode Pix) is charged with the potential of the source drive signal (pixel signal) SIG(n) (positive-polarity source potential VSH (at +15 V, for example) in the examples illustrated in FIGS. 21A and 21B). At this time, the potential V2(m, n) of the high-potential-side first holding capacitor C1*a* is charged with a potential (SIG(n)+Vth) (VSH+Vth in the examples illustrated in FIGS. 21A and 21B) obtained by adding Vth of the third pixel transistor TR3 to the potential of the source drive signal (pixel signal) SIG(n) (positive-polarity source potential VSH (at +15 V, for example) in the examples illustrated in FIGS. 21A and 21B) that charges the potential Vpix(m, n) of the second holding capacitor C2 (pixel electrode Pix) (FIG. 22C).

When the negative-polarity gate potential VGL (at −20 V, for example) is supplied to the first gate bus line (first scan line) SCL1(*m*) and the third gate bus line (third scan line) SCL3(*m*) before the shift to the hold period, the first and the fourth pixel transistors TR1 and TR4 are controlled to be turned off. In the subsequent hold period, when the positive-polarity gate potential VGH (at +20 V, for example) is supplied to the second gate bus line (second scan line) SCL2(*m*), a current flows through the second pixel transistor TR2, the third pixel transistor TR3, and the fifth pixel transistor TR5. However, in the state where Vpix=SIG(n) when the gate-source potential Vgs of the third pixel transistor TR3 is at the same Vth as the gate-source potential Vgs of the fifth pixel transistor TR5, currents flowing through the second pixel transistor TR2, the third pixel transistor TR3, and the fifth pixel transistor TR5 are balanced. Therefore, the potential Vpix(m, n) of the second holding capacitor C2 (pixel electrode Pix) is statically held in the state where the potential SIG(n) (positive-polarity source potential VSH in the examples illustrated in FIGS. 21A and 21B) is supplied (FIG. 22D).

The following describes the case where the source drive signal (pixel signal) SIG(n) is set to the GND potential, with reference to FIGS. 21C and 21D. The following describes differences from the case where the source drive signal (pixel signal) SIG(n) is set to the positive-polarity source potential VSH (at +15 V, for example) (refer to FIGS. 21A and 21B).

After the negative-polarity gate potential VGL (at −20 V, for example) is supplied to the second gate bus line (second scan line) SCL2(*m*) before the write period, and the positive-polarity gate potential VGH (at +20 V, for example) is supplied to the first gate bus line (first scan line) SCL1(*m*) in the subsequent write period, the potential Vpix(m, n) of the second holding capacitor C2 (pixel electrode Pix) is charged with the GND potential serving as the potential of the source drive signal (pixel signal) SIG(n). At this time, the potential V2(m, n) of the high-potential-side first holding capacitor C1*a* is charged with a potential (GND+Vth) obtained by adding Vth of the third pixel transistor TR3 to the GND potential serving as the potential Vpix(m, n) of the second holding capacitor C2 (pixel electrode Pix).

Then, after the negative-polarity gate potential VGL (at −20 V, for example) is supplied to the first gate bus line (first scan line) SCL1(*m*) and the third gate bus line (third scan line) SCL3(*m*) before the shift to the hold period, and the positive-polarity gate potential VGH (at +20 V, for example) is supplied to the second gate bus line (second scan line) SCL2(*m*) in the subsequent hold period, the currents flowing through the second pixel transistor TR2, the third pixel transistor TR3, and the fifth pixel transistor TR5 are balanced, so that the potential Vpix(m, n) of the second holding capacitor C2 (pixel electrode Pix) is statically held in the state of being supplied with the GND potential.

The following describes the case where the source drive signal (pixel signal) SIG(n) is set to the negative-polarity source potential VSL (at −15 V, for example), with reference to FIGS. 21E and 21F. The following describes differences from the case where the source drive signal (pixel signal) SIG(n) is set to the positive-polarity source potential VSH (at +15 V, for example) (refer to FIGS. 21A and 21B) and the case where the source drive signal (pixel signal) SIG(n) is set to the GND potential (refer to FIGS. 21C and 21D).

After the negative-polarity gate potential VGL (at −20 V, for example) is supplied to the second gate bus line (second scan line) SCL2(*m*) before the write period, and the positive-polarity gate potential VGH (at +20 V, for example) is supplied to the first gate bus line (first scan line) SCL1(*m*) in the subsequent write period, the potential Vpix(m, n) of the second holding capacitor C2 (pixel electrode Pix) is charged with the negative-polarity source potential VSL serving as the potential of the source drive signal (pixel signal) SIG(n). At this time, the potential V2(m, n) of the high-potential-side first holding capacitor C1*a* is charged with a potential (VSL+Vth) obtained by adding Vth of the third pixel transistor TR3 to the negative-polarity source potential VSL serving as the potential Vpix(m, n) of the second holding capacitor C2 (pixel electrode Pix).

Then, after the negative-polarity gate potential VGL (at −20 V, for example) is supplied to the first gate bus line (first scan line) SCL1(*m*) and the third gate bus line (third scan line) SCL3(*m*) before the shift to the hold period, and the positive-polarity gate potential VGH (at +20 V, for example) is supplied to the second gate bus line (second scan line) SCL2(*m*) in the subsequent hold period, the currents flowing through the second pixel transistor TR2, the third pixel transistor TR3, and the fifth pixel transistor TR5 are balanced, so that the potential Vpix(m, n) of the second holding capacitor C2 (pixel electrode Pix) is statically held in the state of being supplied with the negative-polarity source potential VSL.

In the present embodiment, the high-potential-side first holding capacitor C1*a* only needs to have capacitance required to maintain the control state of the third transistor TR3. The low-potential-side first holding capacitor C1*b* only needs to have capacitance required to maintain the control state of the fifth transistor TR5. Specifically, the high-potential-side first holding capacitor C1*a* and the low-potential-side first holding capacitor C1*b* have capacitance of approximately 0.1 pF, for example.

In the present embodiment, the potential of the second holding capacitor C2, that is, the potential Vpix(m, n) of the pixel electrode Pix is statically held in the state of being supplied with the potential SIG(n) obtained by subtracting Vth of the third pixel transistor TR3 from the potential (SIG(n)+Vth) that has charged the high-potential-side first holding capacitor C1*a* before the shift to the hold period. This operation can eliminate the influence of the potential drop $\alpha$ caused by the feedthrough that occurs when the first pixel transistor TR1 is turned off, and thus, can restrain the reduction in display quality caused by the potential variation.

Each of the embodiments described above can provide a display device capable of restraining the reduction in image quality caused by the potential variation.

The components in the embodiments described above can be combined as appropriate. Other operational advantages accruing from the aspects described in the embodiments of the present disclosure that are obvious from the description herein, or that are conceivable as appropriate by those skilled in the art will naturally be understood as accruing from the embodiments of the present disclosure.

What is claimed is:

1. A display device having a write period of charging a holding capacitor included in each of pixels arranged in a first direction and a second direction different from the first direction in a display region, and having a hold period of holding capacitance of the holding capacitor charged during the write period, the display device comprising a potential maintenance circuit configured to maintain, during the hold period, one of three potential values of a positive-polarity potential, a ground (GND) potential, and a negative-polarity potential having charged the holding capacitor during the write period, the display device further comprising a plurality of first and second signal lines electrically coupled to the pixels arranged in the second direction in the display region, wherein the holding capacitor comprises a high-potential-side first holding capacitor, a low-potential-side first holding capacitor, and a second holding capacitor, the potential maintenance circuit comprises:

a high-potential-side first pixel transistor electrically coupling the high-potential-side first holding capacitor to each of the first signal lines;

a high-potential-side second pixel transistor and a high-potential-side third pixel transistor coupled in series between the positive-polarity potential and the GND potential;

a low-potential-side first pixel transistor electrically coupling the low-potential-side first holding capacitor to each of the second signal lines;

a low-potential-side second pixel transistor and a low-potential-side third pixel transistor coupled in series between a coupling point of the high-potential-side second pixel transistor to the high-potential-side third pixel transistor and the negative-polarity potential; and a driver configured to supply one of the three potential values to the first signal line and the second signal line, the second holding capacitor is coupled to a coupling point of the low-potential-side second pixel transistor to the low-potential-side third pixel transistor, gates of the high-potential-side second pixel transistor and the high-potential-side third pixel transistor are configured to be supplied with a potential of the high-potential-side first holding capacitor, gates of the low-potential-side second pixel transistor and the low-potential-side third pixel transistor are configured to be supplied with a potential of the low-potential-side first holding capacitor, the driver is configured to:

convert the positive-polarity potential into the GND potential, and supply the result to the first signal line;

convert the positive-polarity potential into the negative-polarity potential, and supply the result to the second signal line;

convert the GND potential into the positive-polarity potential, and supply the result to the first signal line;

convert the GND potential into the negative-polarity potential, and supply the result to the second signal line;

convert the negative-polarity potential into the positive-polarity potential, and supply the result to the first signal line; and convert the negative-polarity potential into the GND potential, and supply the result to the second signal line, the high-potential-side first pixel transistor, the low-potential-side first pixel transistor, the high-potential-side third pixel transistor, and the low-potential-side third pixel transistor are each an n-channel metal oxide semiconductor (NMOS) transistor, the high-potential-side second pixel transistor and the low-potential-side second pixel transistor are each a p-channel metal oxide semiconductor (PMOS) transistor, the high-potential-side second pixel transistor is provided on the positive-polarity potential side, the high-potential-side third pixel transistor is provided on the GND potential side, the low-potential-side second pixel transistor is provided on a side of the coupling point of the high-potential-side second pixel transistor to the high-potential-side third pixel transistor, the high-potential-side third pixel transistor is provided on the negative-polarity potential side, and the high-potential-side first pixel transistor and the low-potential-side first pixel transistor are configured to be brought into an on-state during the write period, and into an off-state during the hold period.

2. A display device having a write period of charging a holding capacitor included in each of pixels arranged in a first direction and a second direction different from the first direction in a display region, and having a hold period of holding capacitance of the holding capacitor charged during the write period, the display device comprising a potential maintenance circuit configured to maintain, during the hold period, one of three potential values of a positive-polarity potential, a ground (GND) potential, and a negative-polarity potential having charged the holding capacitor during the write period, wherein a reset period is provided before the write period, a plurality of signal lines electrically coupled to the pixels arranged in the second direction are provided in the display region, the holding capacitor comprises a first holding capacitor and a second holding capacitor, the potential maintenance circuit comprises:

a first pixel transistor electrically coupling the first holding capacitor to each of the signal lines;

a second pixel transistor and a third pixel transistor coupled in series between the positive-polarity potential and a reset potential;

a fourth pixel transistor coupled between a gate of the second pixel transistor and the negative-polarity potential; and a first driver configured to supply one of the three potential values to the signal line, the gate of the second pixel transistor is configured to be supplied with a potential of the first holding capacitor, the second holding capacitor is coupled to a coupling point of the second pixel transistor to the third pixel transistor, the third pixel transistor and the fourth pixel transistor are configured to be brought into an on-state and the first pixel transistor is configured to be brought into an off-state during the reset period, the first pixel transistor is configured to be brought into the on-state and the third pixel transistor and the fourth pixel transistor are configured to be brought into the off-state during the write period, and the first pixel transistor, the third pixel transistor, and the fourth pixel transistor are configured to be brought into the off-state during the hold period.

3. The display device according to claim 2, further comprising:

a plurality of scan lines coupled to gates of the first pixel transistors of the pixels arranged in the first direction in the display region; and a second driver configured to sequentially select each of the scan lines arranged in the second direction, and apply the positive-polarity potential to the selected scan line during the write period, wherein gates of the third pixel transistor and the fourth pixel transistor of each of the pixels in which the gates of the first pixel transistors are coupled to the scan line selected by the second driver are coupled to a scan line selected immediately before the selected scan line.

4. The display device according to claim 2, wherein the reset potential is the negative-polarity potential, and a gate of the third pixel transistor is configured to be supplied with a potential higher than a potential supplied to a gate of the fourth pixel transistor during the write period and the hold period.

5. The display device according to claim 2, further comprising:

a plurality of first scan lines coupled to gates of the first pixel transistors of the pixels arranged in the first direction in the display region;

a plurality of second scan lines coupled to gates of the third pixel transistors of the pixels arranged in the first direction in the display region; and a second driver configured to sequentially select each of the first scan lines arranged in the second direction, and apply the positive-polarity potential to the selected first scan line during the write period, and to sequentially select each of the second scan lines together with the first scan line, and apply a potential different from the positive-polarity potential to the selected second scan line during the write period, wherein a gate of the fourth pixel transistor of each of the pixels in which the gates of the first pixel transistors are coupled to the first scan line selected by the second driver is coupled to a first scan line selected immediately before the selected first scan line, and a gate of the third pixel transistor of each of the pixels in which the gates of the first pixel transistors are coupled to the first scan line selected by the second driver is coupled to a second scan line selected immediately before the selected first scan line.

6. A display device having a write period of charging a holding capacitor included in each of pixels arranged in a first direction and a second direction different from the first direction in a display region, and having a hold period of holding capacitance of the holding capacitor charged during the write period, the display device comprising a potential maintenance circuit configured to maintain, during the hold period, one of three potential values of a positive-polarity potential, a ground (GND) potential, and a negative-polarity potential having charged the holding capacitor during the write period, wherein an initialization period and an initial potential setting period are provided before the write period, a plurality of signal lines electrically coupled to the pixels arranged in the second direction are provided in the display region, the holding capacitor comprises a high-potential-side first holding capacitor, a low-potential-side first holding capacitor, and a second holding capacitor, the potential maintenance circuit comprises:

a first pixel transistor electrically coupling the second holding capacitor to each of the signal lines;

a second pixel transistor and a third pixel transistor coupled in series between a high-potential positive-polarity potential higher than the positive-polarity potential and the second holding capacitor;

a fourth pixel transistor coupled between a coupling point of the second pixel transistor to the third pixel transistor and a gate of the third pixel transistor;

a fifth pixel transistor coupled between the second holding capacitor and a low-potential negative-polarity potential lower than the negative-polarity potential;

a sixth pixel transistor coupled between the second holding capacitor and a gate of the fifth pixel transistor; and a driver configured to supply one of the three potential values to the signal line, the gate of the third pixel transistor is configured to be supplied with a potential of the high-potential-side first holding capacitor, the gate of the fifth pixel transistor is configured to be supplied with a potential of the low-potential-side first holding capacitor, the second pixel transistor is provided on the high-potential positive-polarity potential side, the third pixel transistor is provided on the second holding capacitor side, the first pixel transistor, the second pixel transistor, and the fourth pixel transistor are configured to be brought into an off-state and the sixth pixel transistor is configured to be brought into an on-state during the initialization period, the first pixel transistor and the sixth pixel transistor are configured to be brought into the off-state and the second pixel transistor and the fourth pixel transistor are configured to be brought into the on-state during the initial potential setting period following the initialization period, the second pixel transistor and the sixth pixel transistor are configured to be brought into the off-state, and the first pixel transistor and the fourth pixel transistor are configured to be brought into the on-state during the write period following the initial potential setting period, and the first pixel transistor, the fourth pixel transistor, and the sixth pixel transistor are configured to be brought into the off-state and the second pixel transistor is configured to be brought into the on-state during the hold period.

7. The display device according to claim 6, wherein the first pixel transistor is configured to be controlled to be turned off before the second pixel transistor is controlled to be turned on, the second pixel transistor is configured to be controlled to be turned off before the first pixel transistor or the fourth pixel transistor is controlled to be turned on, the fourth pixel transistor is configured to be controlled to be turned off before the second pixel transistor and the third pixel transistor are controlled to be turned on, and the sixth pixel transistor is configured to be controlled to be turned off before the second pixel transistor and the fourth pixel transistor are controlled to be turned on.

* * * * *